US011963075B1

(12) United States Patent
Bahr et al.

(10) Patent No.: US 11,963,075 B1
(45) Date of Patent: Apr. 16, 2024

(54) MESH WIRELESS ACCESS POINTS

(71) Applicant: Cable Television Laboratories, Inc., Louisville, CO (US)

(72) Inventors: John C. Bahr, Superior, CO (US); David Daniel Smith, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 266 days.

(21) Appl. No.: 17/332,613

(22) Filed: May 27, 2021

Related U.S. Application Data

(63) Continuation-in-part of application No. 16/530,677, filed on Aug. 2, 2019, now abandoned.
(Continued)

(51) Int. Cl.
| | |
|---|---|
| *G16Y 10/75* | (2020.01) |
| *H04L 12/28* | (2006.01) |
| *H04W 4/33* | (2018.01) |
| *H04W 12/03* | (2021.01) |
| *H04W 48/20* | (2009.01) |
| *H04W 76/15* | (2018.01) |
| *H04W 84/12* | (2009.01) |

(Continued)

(52) U.S. Cl.
CPC ............ *H04W 4/33* (2018.02); *H04L 12/283* (2013.01); *H04W 12/03* (2021.01); *H04W 48/20* (2013.01); *H04W 76/15* (2018.02); *G16Y 10/75* (2020.01); *H04L 2012/2841* (2013.01); *H04W 84/12* (2013.01); *H04W 84/18* (2013.01); *H04W 88/08* (2013.01); *H04W 88/10* (2013.01); *H04W 92/02* (2013.01); *H04W 92/10* (2013.01); *H04W 92/20* (2013.01); *Y02D 30/70* (2020.08)

(58) Field of Classification Search
CPC ....... G16Y 10/05–90; G16Y 20/10–40; G16Y 30/10; G16Y 40/10–60; H04L 12/2803–2838; H04L 2012/284–285; H04L 63/02–308; H04L 67/12–125; H04L 69/18–26; H04L 2463/041–146; H04W 4/30–80; H04W 12/009–80; H04W 16/02–32; H04W 28/02–26; H04W 36/0005–385; H04W 40/005–38; H04W 48/02–20; H04W 60/005–06; H04W 64/003–006; H04W 76/10–50; H04W 80/02–12; H04W 84/005–22; H04W 88/005–188; H04W 92/02–24; H05B 47/10–195; Y02D 30/70
See application file for complete search history.

(56) References Cited

U.S. PATENT DOCUMENTS

| | | |
|---|---|---|
| 5,640,454 A | 6/1997 | Lipner et al. |
| 6,965,605 B1 | 11/2005 | Amos et al. |

(Continued)

*Primary Examiner* — Timothy J Weidner
(74) *Attorney, Agent, or Firm* — PdZ Patent Law, PLLC

(57) ABSTRACT

A mesh wireless access point (WAP) includes a housing, a first radio assembly, a second radio assembly, and an internal communication link between the first and second radio assemblies. The housing is configured to be affixed to, or integrated with, a feature of a building. The first radio assembly is incorporated with the housing and configured to support a first wireless communication link, and the second radio assembly is incorporated with the housing and configured to support a second wireless communication link. The internal communication link is configured to transfer data packets between the first and second radio assemblies.

7 Claims, 30 Drawing Sheets

Related U.S. Application Data

(60) Provisional application No. 63/030,380, filed on May 27, 2020, provisional application No. 62/713,686, filed on Aug. 2, 2018.

(51) Int. Cl.
| | |
|---|---|
| *H04W 84/18* | (2009.01) |
| *H04W 88/08* | (2009.01) |
| *H04W 88/10* | (2009.01) |
| *H04W 92/02* | (2009.01) |
| *H04W 92/10* | (2009.01) |
| *H04W 92/20* | (2009.01) |

(56) References Cited

U.S. PATENT DOCUMENTS

| | | | |
|---|---|---|---|
| 2004/0107343 | A1 | 6/2004 | Kokubo |
| 2004/0143681 | A1 | 7/2004 | Benveniste |
| 2007/0201540 | A1* | 8/2007 | Berkman ............... H05B 47/19 |
| 2010/0115272 | A1* | 5/2010 | Batta .................... H04W 88/08 |
| 2012/0159159 | A1 | 6/2012 | Messerges et al. |
| 2012/0216036 | A1 | 8/2012 | Barsoum et al. |
| 2014/0252958 | A1* | 9/2014 | Subotnick .............. H05B 47/19 |
| 2015/0350925 | A1* | 12/2015 | Hammett ............. H04W 88/08 |
| 2016/0112518 | A1 | 4/2016 | Haleem et al. |
| 2017/0078810 | A1* | 3/2017 | Lee ....................... H04W 88/08 |
| 2017/0223807 | A1* | 8/2017 | Recker .................. H05B 47/19 |
| 2018/0007013 | A1 | 1/2018 | Wang |
| 2018/0288670 | A1 | 10/2018 | Li et al. |
| 2019/0268389 | A1 | 8/2019 | Govindarajan et al. |
| 2019/0335317 | A1 | 10/2019 | Zhou et al. |

\* cited by examiner

MESH WIRELESS ACCESS POINTS

RELATED APPLICATIONS

This application is a continuation in part of U.S. patent application Ser. No. 16/530,677, filed on Aug. 2, 2019, which claims benefit of priority to U.S. Provisional Patent Application Ser. No. 62/713,686, filed on Aug. 2, 2018. This application also claims benefit of priority to U.S. Provisional Patent Application Ser. No. 63/030,380, filed on May 27, 2020. Each of the aforementioned applications is incorporated herein by reference.

BACKGROUND

Wireless communication networks have become very common. For example, wireless communication networks operating according to an Institute of Electrical and Electronics Engineers (IEEE) 802.11 standard, often referred to as "Wi-Fi" networks, are frequently found in homes and in businesses.

However, data transmitted by a wireless communication network can potentially be intercepted by a third party, which may present a security risk. Consequently, data transmitted by a wireless communication network is typically encrypted to prevent unauthorized access to the data. For example, data transmitted between a station and a wireless access point (WAP) is typically encrypted, such as according to a Wi-Fi Protected Access 2 (WPA2) protocol or a Wi-Fi Protected Access 3 (WPA3) protocol. Specifically, data to be transmitted from the station to the WAP is encrypted before leaving the station, and the data is decrypted upon arrival at the WAP. Similarly, data to be transmitted from the WAP to the station is encrypted before leaving the WAP, and the data is decrypted upon arrival at the station. It has also been proposed to encrypt data flowing between a station and a cloud virtual network function (VNF) outside of a local area network (LAN) of the station and the WAP.

DETAILED DESCRIPTION OF THE EMBODIMENTS

Conventional Wi-Fi networks may have significant drawbacks. For example, conventional Wi-Fi networks often provide inadequate coverage, particularly in larger buildings or in buildings constructed of materials that block wireless signal transmission. Wi-Fi coverage can be improved by deploying multiple WAPs, such as in a mesh network configuration, but conventional WAPs are relatively expensive. Additionally, conventional Wi-Fi mesh networks may be incapable of achieving desired coverage and/or performance.

The present systems and methods help solve one or more of the problems discussed above. Disclosed herein are networks, devices, and methods which distribute wireless encryption operations. For example, in certain embodiments of a LAN, a WAP establishes a wireless communication link with a first device, such as user equipment. The WAP, however, does not necessarily decrypt encrypted data packets that it receives from the first device via the encrypted wireless communication link. Instead, the WAP may forward the encrypted data packets to another node in the LAN, without decrypting the data packets. The encrypted data packets are subsequently decrypted at a destination node in the LAN. Accordingly, wireless encryption operations are distributed in the LAN at least in that establishment of an encrypted wireless communication link and decryption of encrypted data packets may be performed at different nodes of the LAN.

As another example, in some embodiments, a thin WAP receives encrypted data packets from a first device, and the thin WAP forwards the encrypted data packets to an upstream node, without decrypting the data packets. The encrypted data packets are subsequently decrypted by a secure WAP that is different from the thin WAP.

Applicant has found that distributing wireless encryption and decryption operations at specific points in a network, instead of performing all wireless encryption operations at the point of first wireless transmission, may achieve significant advantages, as discussed below.

Figure 1:
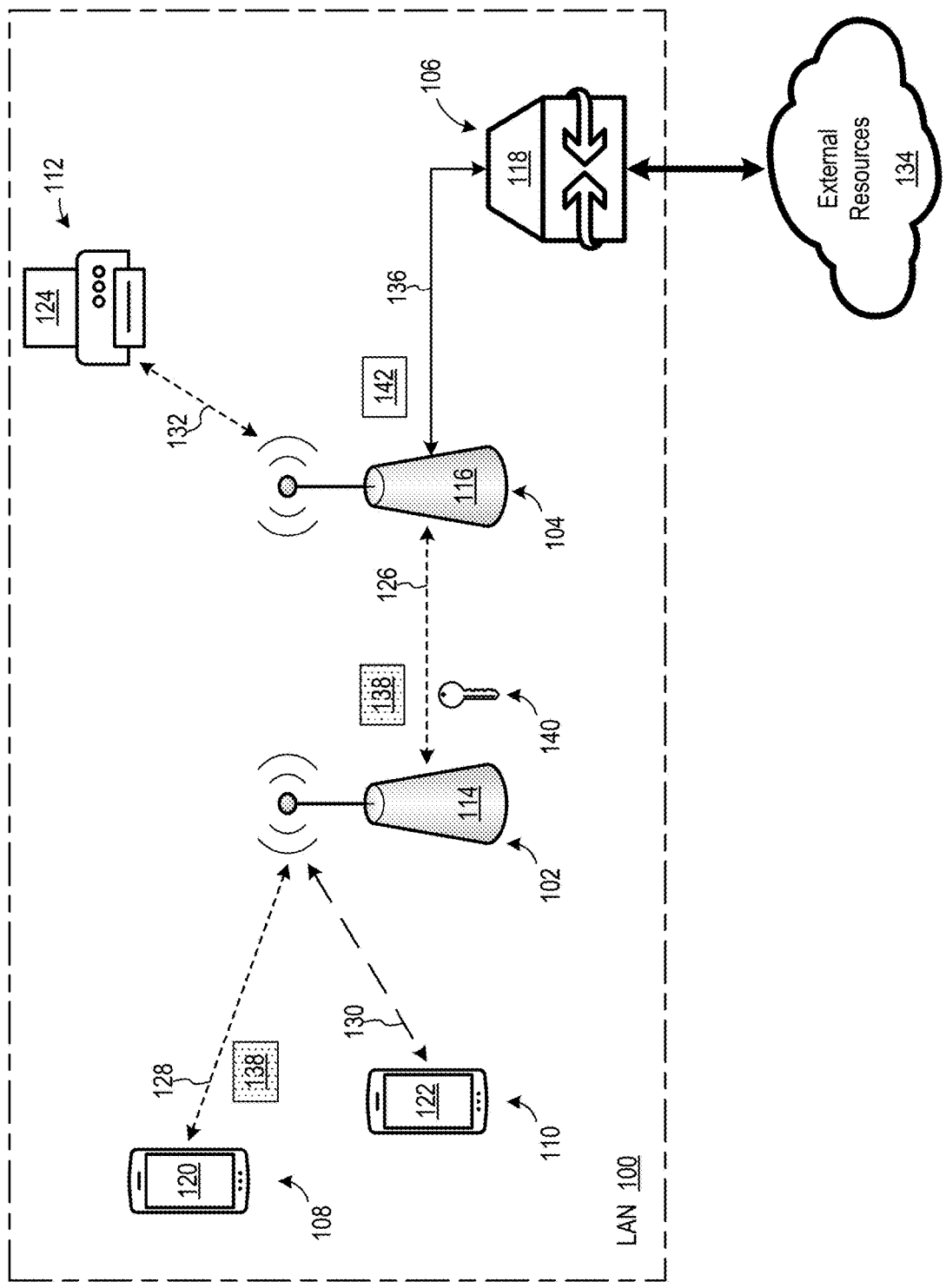
FIG. 1 is a block diagram of a LAN supporting distributed wireless encryption, according to an embodiment.

FIG. 1 is a block diagram of a LAN 100 supporting distributed wireless encryption. LAN 100 includes nodes 102, 104, 106, 108, 110, and 112. Node 102 includes a first WAP 114, node 104 includes a second WAP 116, node 106 includes a gateway device 118, node 108 includes a first device 120, node 110 includes a second device 122, and node 112 includes a third device 124. LAN 100 may include additional or fewer nodes without departing from the scope hereof. Additionally, any of the nodes of LAN 100 may include alternative and/or additional equipment. For example, in one alternate embodiment, second WAP 116 at node 104 is replaced with a network switch (not shown). As another example, in another alternate embodiment, node 106 includes a content server (not shown) along with gateway device 118. Furthermore, the topology of LAN 100 may vary. Moreover, LAN 100 could be modified to be a network other than a local area network, such as a wide area network, without departing from the scope hereof.

In some embodiments, each of first and second WAPs 114 and 116 is configured to operate according an IEEE 802.11 protocol and/or a fifth generation (5G), new radio (NR) protocol. However, first and second WAPs 114 and 116 could be configured to operate according to one or more other wireless communication protocols without departing from the scope hereof. First WAP 114 is illustrated as being communicatively coupled to second WAP 116 via a wireless communication link 126, e.g. as part of a mesh network of WAPs. In some alternate embodiments, though, wireless communication link 126 is replaced with, or by supplemented by, a wired communication link, such as a wired communication link including an electrical cable and/or an optical cable.

First WAP 114 and second WAP 116 are each configured to establish one or more wireless communication links with respective devices. These wireless communication links may be encrypted or unencrypted. In the embodiment of FIG. 1, first WAP 114 is illustrated as establishing (a) a first encrypted wireless communication link 128 with first device 120 and (b) a first unencrypted wireless communication link 130 with second device 122. Additionally, second WAP 116 is illustrated as establishing a second encrypted wireless communication link 132 with third device 124, in the FIG. 1 embodiment. However, the number and types of wireless communication links established by first and second WAPs 114 and 116 may vary. In some embodiments, first and second WAPs 114 and 116 are configured to establish encrypted wireless communication links, e.g. first and second encrypted wireless communication links 128 and 132, according to one of a WPA2 protocol and a WPA3 protocol. However, first and second WAPs 114 and 116 could be configured to establish encrypted wireless communication links according to one or more other protocols without departing from the scope hereof.

Gateway device 118 interfaces LAN 100 with external resources 134. In some embodiments, external resources 134 include one or more of the public Internet and one or more private networks. In some embodiments, gateway device 118 is configured to provide security services, e.g. to prevent unauthorized access to LAN 100 from external resources 134. Additionally, in some embodiments, gateway device 118 is configured to provide routing services, such as to route data packets from a client of LAN 100 to a specific destination in external resources 134, or vice versa. Furthermore, in some embodiments, gateway device 118 is configured to perform switching services, such as to route data packets within LAN 100. Gateway device 118 is communicatively coupled to second WAP 116 via a wired communication link 136 in the FIG. 1 embodiment. Wired communication link 136 includes, for example, an electrical cable and/or an optical cable. In some alternate embodiments, wired communication link 136 is replaced by, or supplemented with, a wireless communication link.

In the embodiment of FIG. 1, first and second devices 120 and 122 are each illustrated as being user equipment (UE), e.g. a mobile telephone, and third device 124 is illustrated as being a printer. However, each of first device 120, second device 122, and third device 124 could be replaced with another type of device without departing from the scope hereof. Examples of possible embodiments of first device 120, second device 122, and third device 124 include, but are not limited to, a computer, a set-top device, a data storage device, an IoT device, an entertainment device, another wireless access point (including, for example, eNB s, gNBs, and Wi-Fi APS acting as UEs), a computer networking device, a mobile telephone, a smartwatch, a wearable device with wireless capability, an output device (including, for example, a monitor, a printer, or a speaker), and a medical device.

First WAP 114 is configured to (a) exchange encrypted data packets with first device 120 via first encrypted wireless communication link 128 and (b) exchange unencrypted data packets with second device 122 via first unencrypted wireless communication link 130. Second WAP 116 is configured to exchange encrypted data packets with third device 124 via second encrypted wireless communication link 132. In contrast to a conventional WAP, first WAP 114 is further configured to forward at least some encrypted data packets to an upstream node, e.g. node 104, without decrypting the encrypted data packets. For example, in one embodiment, first WAP 114 is configured to forward an encrypted data packet 138 received from first device 120 via first encrypted wireless communication link 128 to node 104, without decrypting data packet 138. In some embodiments, first WAP 114 is configured to forward all received data packets to an upstream node without performing encryption or decryption, such as discussed below with respect to FIG. 2. In some other embodiments, first WAP 114 is configured to selectively decrypt received data packets before forwarding them to the upstream node, such as discussed below with respect to FIGS. 5-8.

In some embodiments, first WAP 114 is also configured to forward to an upstream node, e.g. node 104, an encryption key used by first WAP 114 to establish an encrypted wireless communication link. For example, in an embodiment, first WAP 114 is configured to establish first encrypted wireless communication link 128 according to an encryption key 140, and encryption key 140 is therefore needed to decrypt encrypted data packet 138. First WAP 114 is configured to forward encryption key 140 to node 104, and second WAP 116 at node 104 is configured to decrypt encrypted data packet 138 using encryption key 140 to yield an unencrypted data packet 142. In some embodiments, second WAP 116 is further configured to forward decrypted data packet 142 to another node, e.g., node 106 or node 112.

The fact that encrypted data packet 138 travels from node 108 to node 104 without being decrypted may result in significant benefits. For example, first WAP 114 is relieved from decrypting encrypted data packet 138, which potentially reduces processing requirements and/or power consumption of the WAP. Furthermore, the fact that encrypted data packet 138 travels between WAPs 114 and 116 in encrypted form, instead of being decrypted by first WAP 114, promotes security by reducing likelihood of unauthorized access to data of encrypted data packet 138, while the data packet travels between the WAPs.

Figure 2:
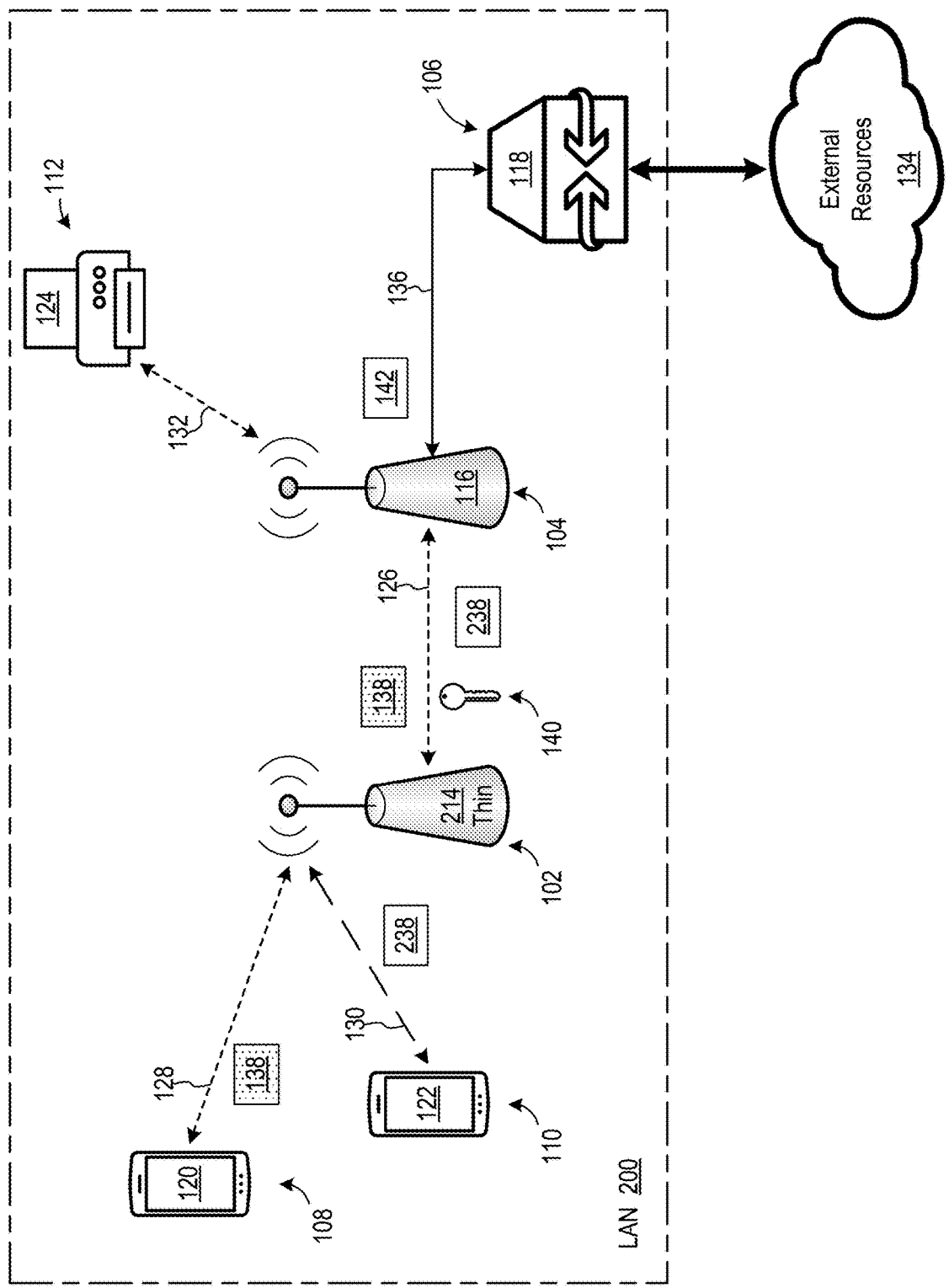
FIG. 2 is a block diagram of an embodiment of the FIG. 1 LAN including a thin WAP.

FIG. 2 is a block diagram of a LAN 200, which is an embodiment of LAN 100 where first WAP 114 is embodied by a thin WAP 214. In this document, a thin WAP is a WAP that is configured to wirelessly receive data packets and wirelessly retransmit the received data packets without performing encryption or decryption of the data packets. Accordingly, thin WAP 214 forwards encrypted data packets it receives without performing encryption or decryption of the data packets, such that the data packets remain encrypted as they flow through thin WAP 214. For example, thin WAP 214 wirelessly forwards encrypted data packet 138 received via first encrypted wireless communication link 128 to node 104 without decrypting the data packet. Additionally, thin WAP 214 forwards unencrypted data packets it receives without performing encryption or decryption of the data packets, such that the data packets remain unencrypted as they flow through thin WAP 214. For example, thin WAP 214 wirelessly forwards an unencrypted data packet 238 received from second device 122 via first unencrypted wireless communication link 130 to node 104, without encrypting the unencrypted data packet. It should be appreciated that thin WAP 214 may be lower cost, smaller, and/or simpler, than conventional WAPs, due to thin WAP 214 not needing to perform encryption operations.

Figure 3:
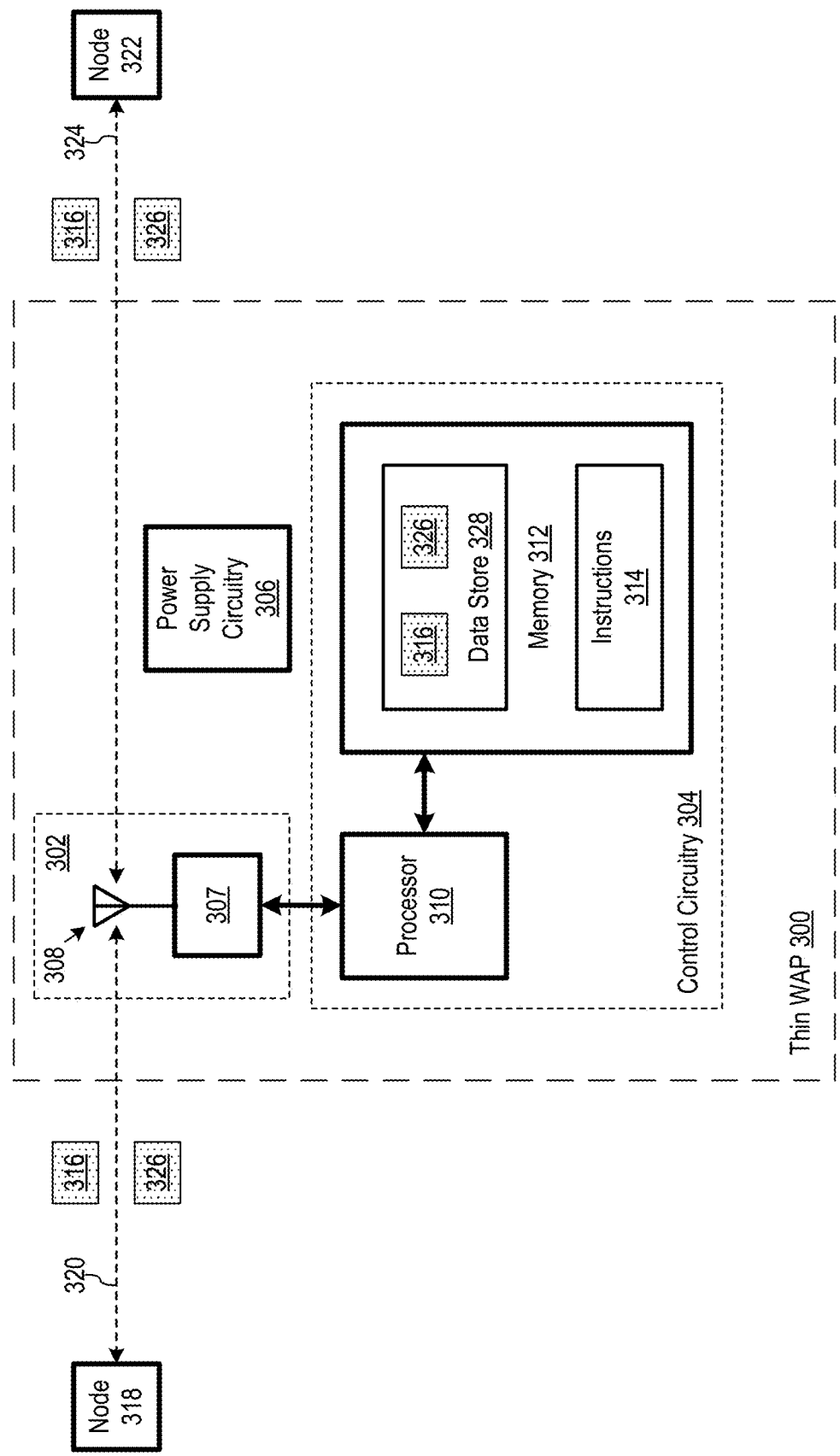
FIG. 3 is a block diagram of a thin WAP, according to an embodiment.

FIG. 3 is block diagram of a thin WAP 300, which is one possible embodiment of thin WAP 214. It should be realized, however, that thin WAP 214 may be embodied in other manners without departing from the scope hereof. Thin WAP 300 includes radio circuitry 302, control circuitry 304, and power supply circuitry 306. Power supply circuitry 306 is configured to provide electrical power to each of radio circuitry 302 and control circuitry 304. Radio circuitry 302 includes a transceiver 307 communicatively coupled to an antenna 308.

Control circuitry 304 includes a processor 310 communicatively coupled to a memory 312. Control circuitry 304 is configured to control radio circuitry 302. For example, in some embodiments, processor 310 is configured to execute instructions 314 stored in memory 312 to control radio circuitry 302 to (a) receive a first encrypted data packet 316 from a first node 318 via a first wireless communication link 320 between thin WAP 300 and first node 318, (b) forward first encrypted data packet 316 from thin WAP 300 to a second node 322 via a second wireless communication link 324 between thin WAP 300 and second node 322, without decrypting the first encrypted data packet, (c) receive a second encrypted data packet 326 from second node 322 via second wireless communication link 324, and (d) forward second encrypted data packet 326 from thin WAP 300 to first node 318 via first wireless communication link 320, without decrypting second encrypted data packet 326. Instructions 314 are, for example, software and/or firmware stored in memory 312. In some embodiments, transceiver 307 and antenna 308 collectively form a software defined radio that is controlled by control circuitry 304.

In some embodiments, processor 310 is further to configured to execute instructions 314 to store received data packets in a data store 328 of memory 312, before forwarding the data packets. For example, in some embodiments, processor 310 stores in data store 328 first encrypted data packet 316 received from a first node 318, before forwarding first encrypted data packet 316 to second node 322. Similarly, in some embodiments, processor 310 stores in data store 328 second encrypted data packet 326 received from second node 322, before forwarding second encrypted data packet 326 to first node 318. Storing received data packets in data store 328 helps enable thin WAP 300 to function with a single transceiver 307.

In certain embodiments, one or both of nodes 318 and 322 includes a WAP, and in some embodiments, one or more of nodes 318 and 322 includes user equipment. In certain embodiments, control circuitry 304 is configured to control radio circuitry 302 to establish and maintain first and second wireless communication links 320 and 324 according to an IEEE 802.11 standard. First and second wireless communication links 320 and 324 are optionally encrypted. In some embodiments, first and second wireless communication links 320 and 324 operate on different respective wireless channels, e.g. on different respective Wi-Fi channels. In some other embodiments, first and second wireless communication links 320 and 324 operate on a common wireless channel, and thin WAP 300 is configured to remove signals transmitted on one of the first and second wireless communication links from signals received from the other of the first and second wireless communication links, to enable simultaneous data transmission on both of the first and second wireless communication links.

Figure 4:
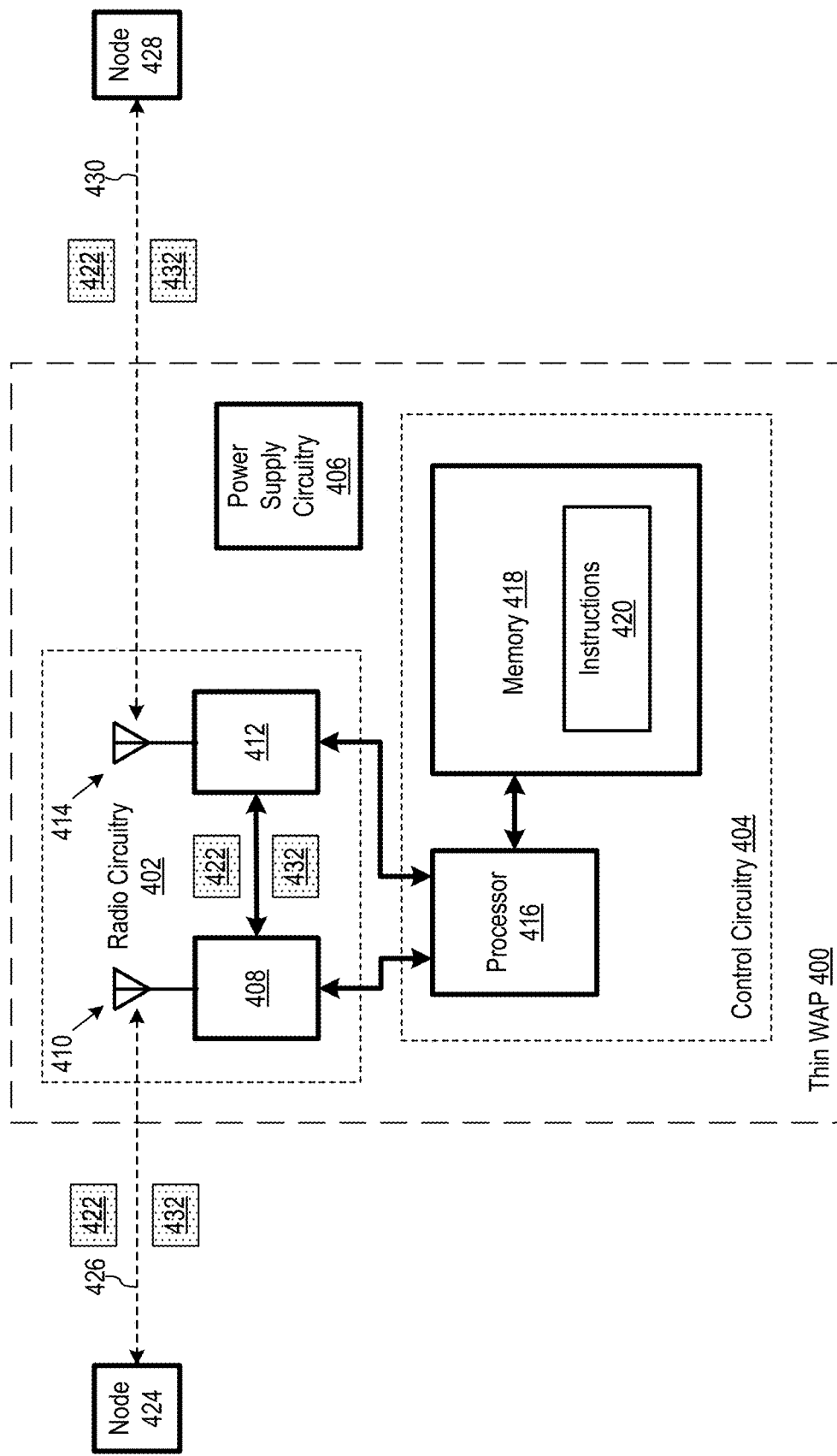
FIG. 4 is a block diagram of another thin WAP, according to an embodiment.

FIG. 4 is a block diagram of a thin WAP 400, which is another possible embodiment of thin WAP 214. Thin WAP 400 includes radio circuitry 402, control circuitry 404, and power supply circuitry 406. Power supply circuitry 406 is configured to provide electrical power to each of radio circuitry 402 and control circuitry 404. Radio circuitry 402 includes (a) a first transceiver 408 communicatively coupled to a first antenna 410 to form a first radio and (b) a second transceiver 412 communicatively coupled to a second antenna 414 to form a second radio. In some embodiments, first transceiver 408 and second transceiver 412 are configured to operate at different respective frequencies such that the two radios of radio circuitry 402 operate at different respective frequencies. In some other embodiments, first transceiver 408 and second transceiver 412 are configured to operate on different respective channels of a common radio frequency band. In yet other embodiments, first transceiver 408 and second transceiver 412 are configured to operate on different respective channels of different respective radio frequency bands.

Control circuitry 404 includes a processor 416 communicatively coupled to a memory 418. Control circuitry 404 is configured to control radio circuitry 402. For example, in some embodiments, processor 416 is configured to execute instructions 420 stored in memory 418 to control radio circuitry 402 to (a) receive a first encrypted data packet 422 from a first node 424 via a first wireless communication link 426 between thin WAP 400 and first node 424, (b) forward first encrypted data packet 422 from thin WAP 400 to a second node 428 via a second wireless communication link 430 between thin WAP 400 and second node 428, without decrypting the first encrypted data packet, (c) receive a second encrypted data packet 432 from second node 428 via second wireless communication link 430, and (d) forward second encrypted data packet 432 from thin WAP 400 to first node 424 via first wireless communication link 426, without decrypting second encrypted data packet 432. First transceiver 408 and first antenna 410 collectively establish first wireless communication link 426, and second transceiver 412 and second antenna 414 collectively establish second wireless communication link 430. In some embodiments, encrypted data packets 422 and 432 are transferred between first transceiver 408 and second transceiver 412, as illustrated in FIG. 4, such that it is unnecessary to buffer the encrypted data packets in memory 418. Instructions 420 are, for example, software and/or firmware stored in memory 418. In some embodiments, at least some of the elements of radio circuitry 402 form a software defined radio that is controlled by control circuitry 404.

In certain embodiments, one or both of nodes 424 and 428 includes a WAP, and in some embodiments, one or more of nodes 424 and 428 includes user equipment. In certain embodiments, control circuitry 404 is configured to control radio circuitry 402 to establish and maintain first and second wireless communication links 426 and 430 according to an IEEE 802.11 standard. First and second wireless communication links 426 and 430 are optionally encrypted.

Figure 5:
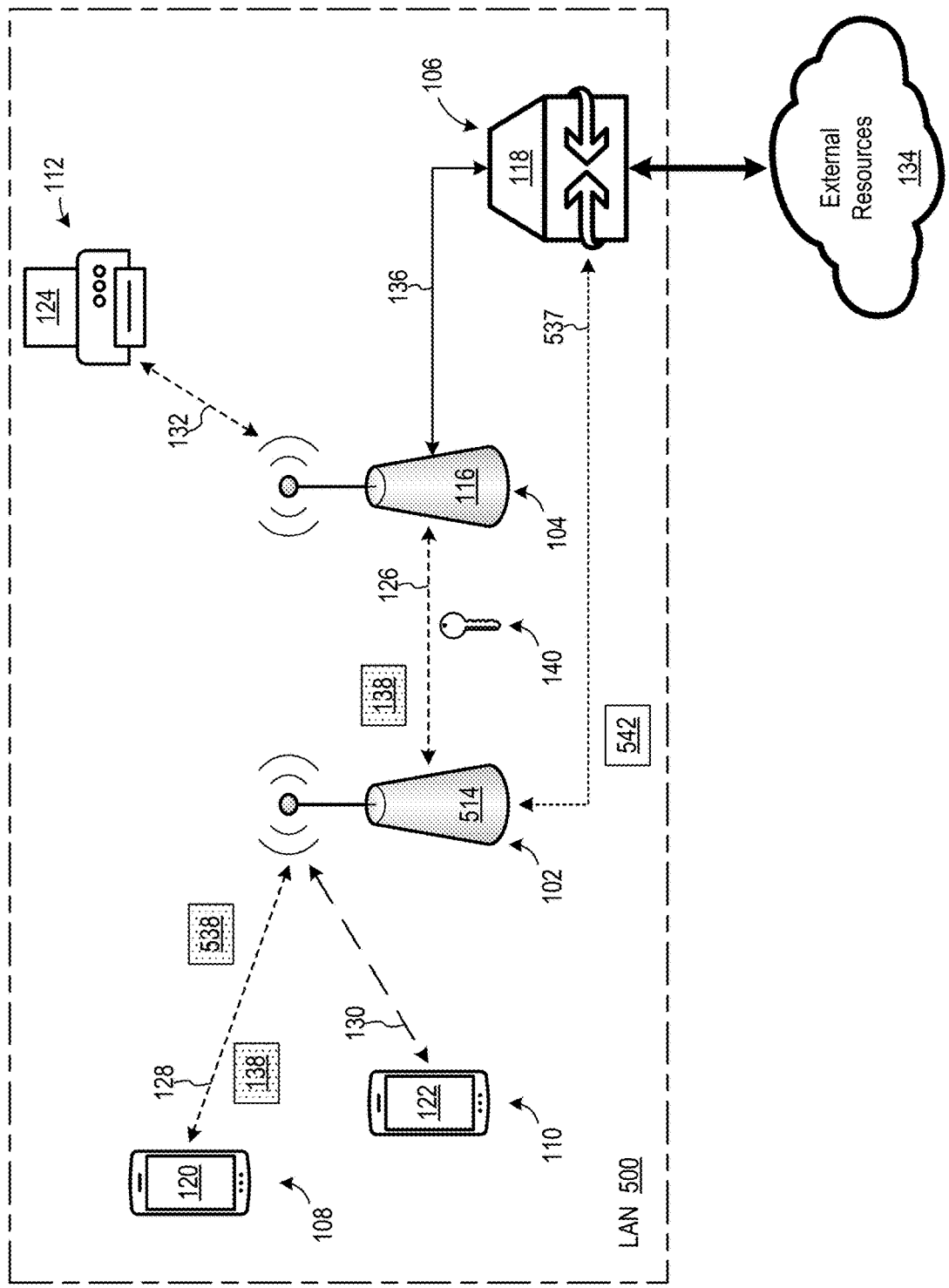
FIG. 5 is a block diagram of an embodiment of the FIG. 1 LAN including a WAP configured to selectively decrypt data packets before forwarding the data packets to an upstream node.

FIG. 5 is a block diagram of a LAN 500, which is an embodiment of LAN 100 where first WAP 114 is embodied by a WAP 514 which is configured to selectively decrypt encrypted data packets before forwarding the data packets to an upstream node (e.g., node 104 or node 106). LAN 500 additionally includes a communication link 537 which directly links nodes 102 and 106. WAP 514 is configured to selectively decrypted an encrypted data packet that it receives, depending on whether the encrypted data packet is destined for a node within LAN 500 or for a node outside of LAN 500. Specifically, if the encrypted data packet is destined for a node within LAN 500, WAP 514 forwards the data packet to an upstream node without decrypting the data packet. Conversely, if the encrypted data is destined for a node outside of LAN 500, WAP 514 decrypts the data packet before forwarding the data packet to an upstream node.

Figure 6:
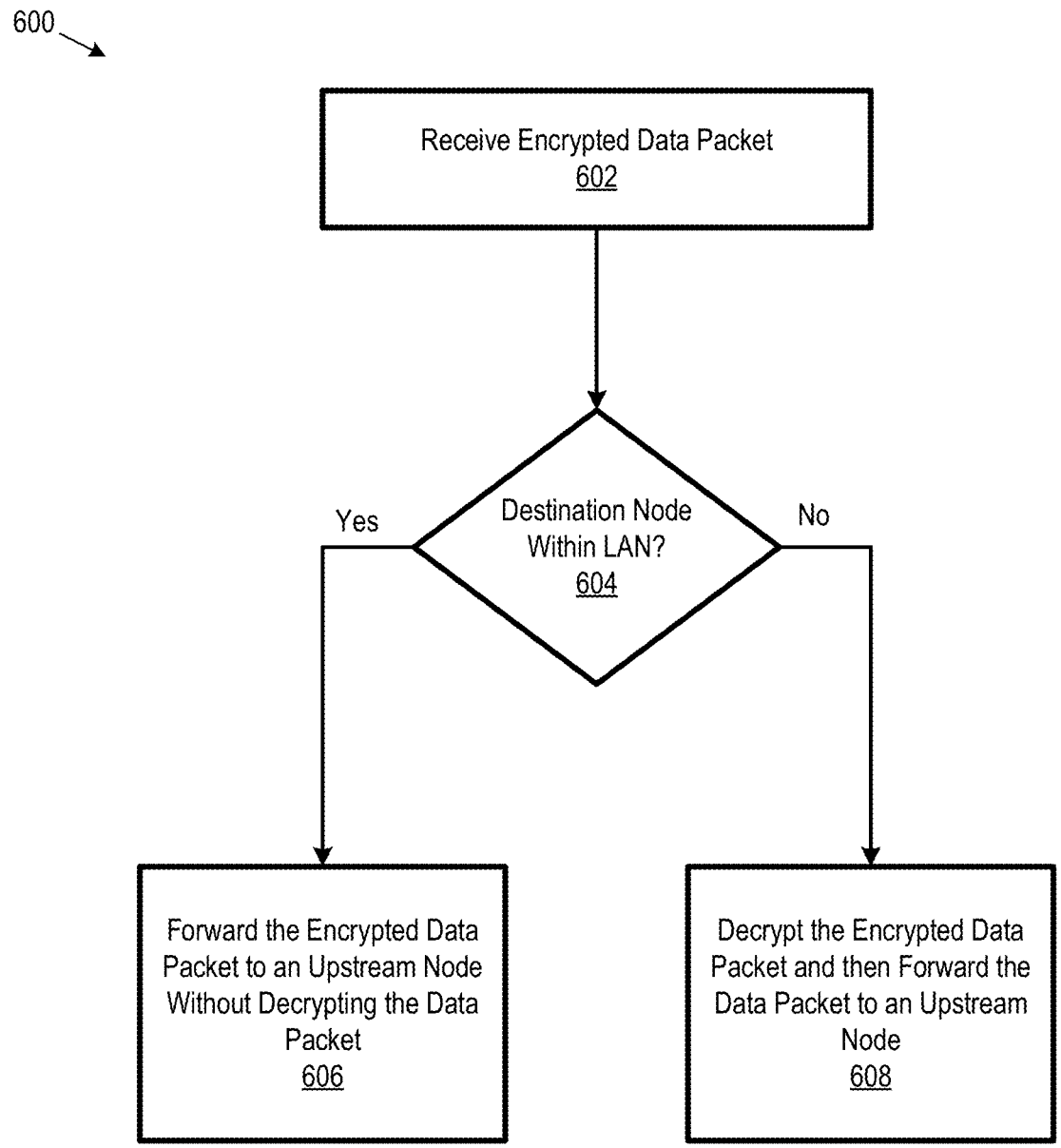
FIG. 6 is a flow chart illustrating a method for selectively decrypting data packets, according to an embodiment.

For example, in some embodiments, WAP 514 is configured to execute a method 600 illustrated in FIG. 6, for selectively decrypting data packets. In a block 602 of method 600, the WAP receives an encrypted data packet. In one example of block 602, WAP 514 receives encrypted data packet 138 via first encrypted wireless communication link 128, and in another example of block 602, WAP 514 receives an additional encrypted data packet 538 via first encrypted wireless communication link 128. In a decision block 604, the WAP determines whether the encrypted data packet received in block 602 is destined for a node within the LAN. In one example of decision block 604, WAP 514 determines that encrypted data packet 138 is destined for node 104 in LAN 200. In another example of decision block 604, WAP 514 determines that encrypted data packet 538 is destined for node outside of LAN 500 in external resources 134, e.g. via communication link 537 and gateway device 118. If the result of decision block 604 is yes, method 600 proceeds to a block 606 where the encrypted data packet is forwarded to an upstream node without decrypting the data packet. In one example of block 606, WAP 514 forwards encrypted data packet 138 to node 104 without decrypting the data packet. If the result of decision block 604 is no, method 600 proceeds to a block 608 where the encrypted data packet is decrypted and then forwarded to an upstream node. In one example of block 608, WAP 514 decrypts encrypted data packet 538 to generate an unencrypted data packet 542, and WAP 514 then forwards unencrypted data packet 542 from node 102 to node 106 via communication link 537, for transfer to its destination node in external resources 134. Some embodiments of WAP 514 are configured similarly to thin WAPs 300 and 400, but with respective instructions 314 and 420 replaced with instructions for performing method 600.

Figure 7:
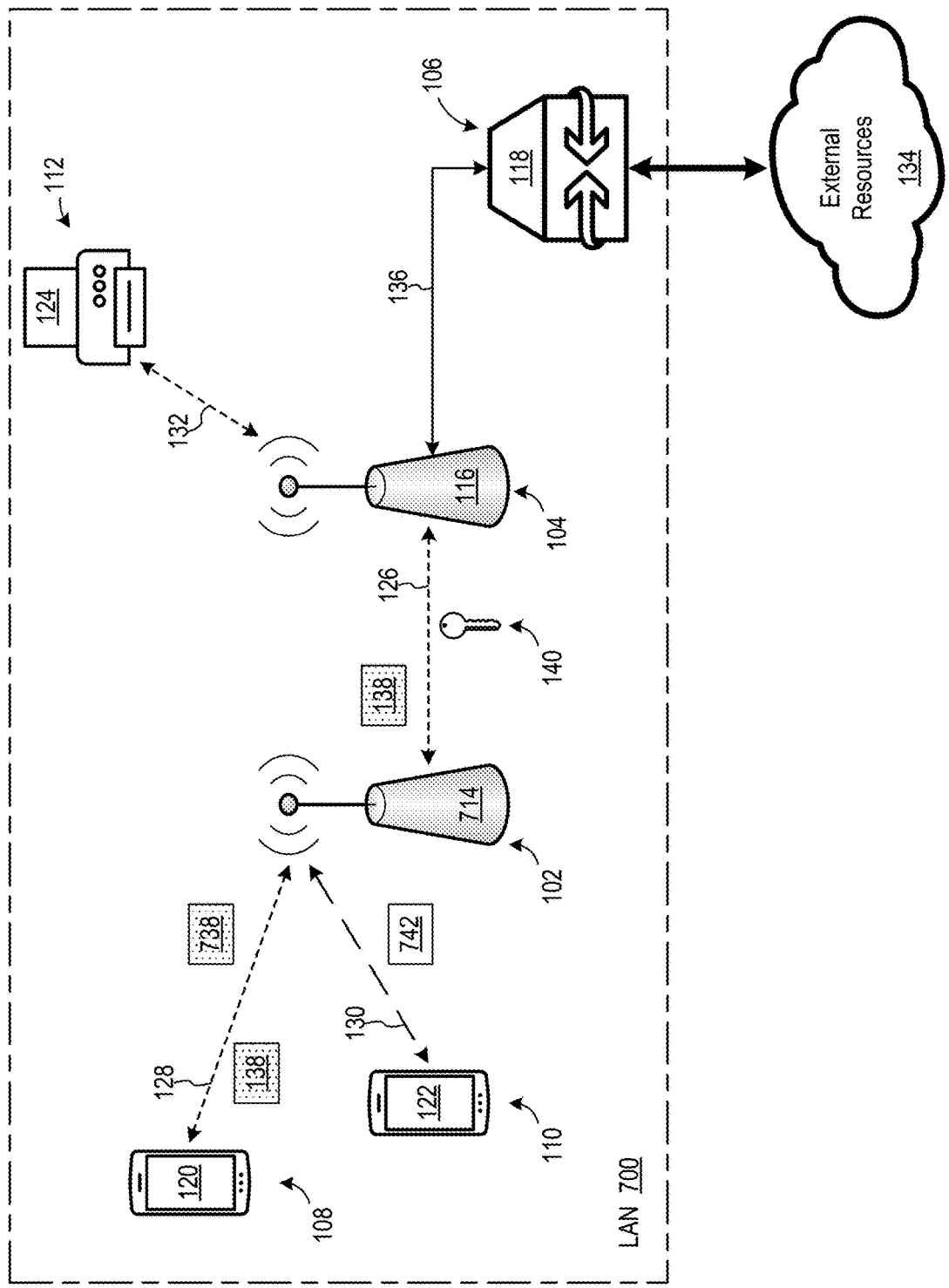
FIG. 7 is a block diagram of another embodiment of the FIG. 1 LAN including a WAP configured to selectively decrypt data packets before forwarding the data packets to an upstream node.

FIG. 7 is a block diagram of a LAN 700, which is an embodiment of LAN 100 where first WAP 114 is embodied by a WAP 714 which is configured to selectively decrypt encrypted data packets before forwarding the data packets to an upstream node (e.g., node 104). WAP 714 is configured to selectively decrypted an encrypted data packet that it receives, depending on whether the encrypted data packet is destined for a node that is capable of performing encryption. Specifically, if the encrypted data packet is destined for a node that is capable of performing decryption, WAP 714 forwards the data packet to an upstream node without decrypting the data packet. Conversely, if the encrypted data packet is destined for a node that is not capable of performing decryption, WAP 714 decrypts the data packet before forwarding the data packet to an upstream node.

Figure 8:
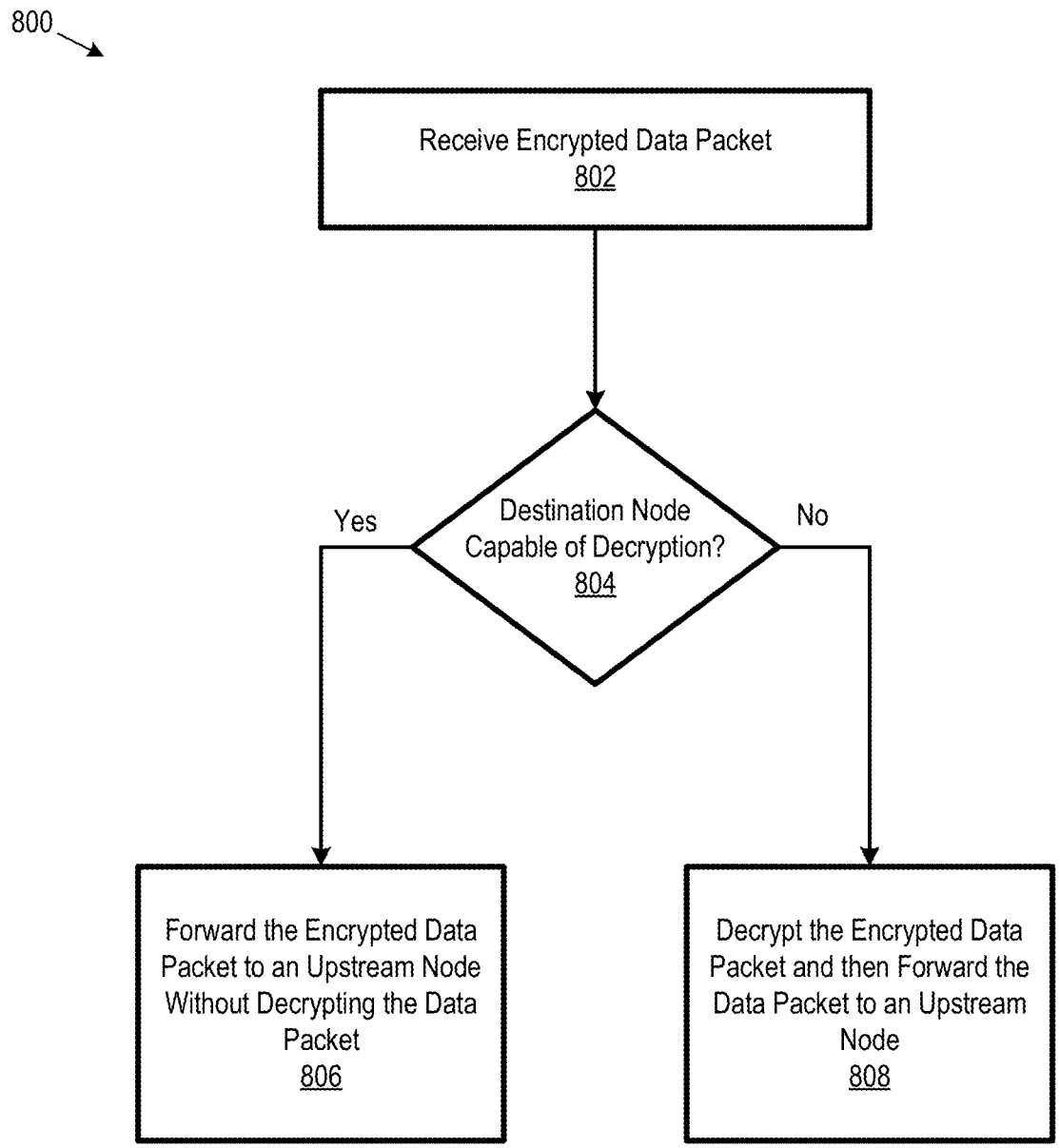
FIG. 8 is a flow chart illustrating another method for selectively decrypting data packets, according to an embodiment.

For example, in some embodiments, WAP 714 is configured to execute a method 800 illustrated in FIG. 8, for selectively decrypting data packets. In a block 802 of method 800, the WAP receives an encrypted data packet. In one example of block 802, WAP 714 receives encrypted data packet 138 via first encrypted wireless communication link 128, and in another example of block 802, WAP 714 receives an additional encrypted data packet 738 via first encrypted wireless communication link 128. In a decision block 804, the WAP determines whether the encrypted data packet received in block 802 is destined for a node that is capable of performing decryption. In one example of decision block 804, WAP 714 determines that encrypted data packet 138 is destined for node 104 which is capable of performing decryption. In another example of decision block 804, WAP 714 determines that encrypted data packet 738 is destined for node 110 which is not capable of performing decryption. If the result of decision block 804 is yes, method 800 proceeds to a block 806 where the encrypted data packet is forwarded to an upstream node without decrypting the data packet. In one example of block 806, WAP 714 forwards encrypted data packet 138 to node 104 without decrypting the data packet. If the result of decision block 804 is no, method 800 proceeds to a block 808 where the encrypted data packet is decrypted and then forwarded to an upstream node. In one example of block 808, WAP 714 decrypts encrypted data packet 738 to generate an unencrypted data packet 742, and WAP 714 then forwards unencrypted data packet 742 from node 102 to node 110. Some embodiments of WAP 714 are configured similarly to thin WAPs 300 and 400, but with respective instructions 314 and 420 replaced with instructions for performing method 800.

In an alternate embodiment of method 800, decision block 804 is modified to determine (a) whether the destination node is capable of decryption and (b) whether the destination node is within LAN 700. In this alternate embodiment, method 800 proceeds to block 806 if both conditions (a) and (b) are true, and method 800 proceeds to block 808 if either of conditions (a) and (b) is false.

In another alternate embodiment of method 800, decision block 804 is replaced with a first alternative decision block (not shown) which determines whether an operating status of WAP 714 meets a predetermined criterium. The predetermined criterium is, for example, that processing load of WAP 714 is below threshold value. If the result of the first alternative decision block is yes, method 800 proceeds to block 808, and if the result of the first alternative decision block is no, method 800 proceeds to block 806. Accordingly, in this alternative embodiment, WAP 714 decrypts received encrypted data packets if processing load of the WAP is below the threshold value, e.g. indicating that the WAP has sufficient processing capacity to perform decryption. On the other hand, if processing load of WAP 714 is above the threshold value, e.g. indicating that WAP 714 does not have significant extra capacity, WAP 714 forwards received encrypted data packets to an upstream node, without decrypting the data packets.

In another alternate embodiment of method 800, decision block 804 is replaced with a second alternative decision block (not shown) which determines whether LAN encryption is required. LAN encryption is required, for example, for security purposes, such as if LAN 700 is carrying sensitive data and/or if LAN 700 may be accessed by untrusted persons. If the result of the second alternative decision block is yes, method 800 proceeds to block 806, and if the result of the second alternative decision block is no, method 800 proceeds to block 808.

In another alternate embodiment of method 800, decision block 804 is replaced with a third alternative decision block (not shown) which determines whether a data packet received by WAP 714 is a low-latency data packet, i.e. whether the data packet must be transmitted by LAN with minimal latency. If the result of the third alternative decision block is yes, method 800 proceeds to block 806, to avoid latency associated with decryption. On the flip side, if the result of the third alternative decision block is no, method 800 proceeds to block 808 to decrypt the data packet.

Decision block 804 could be replaced with other alternative decision blocks without departing from the scope hereof.

Figure 9:
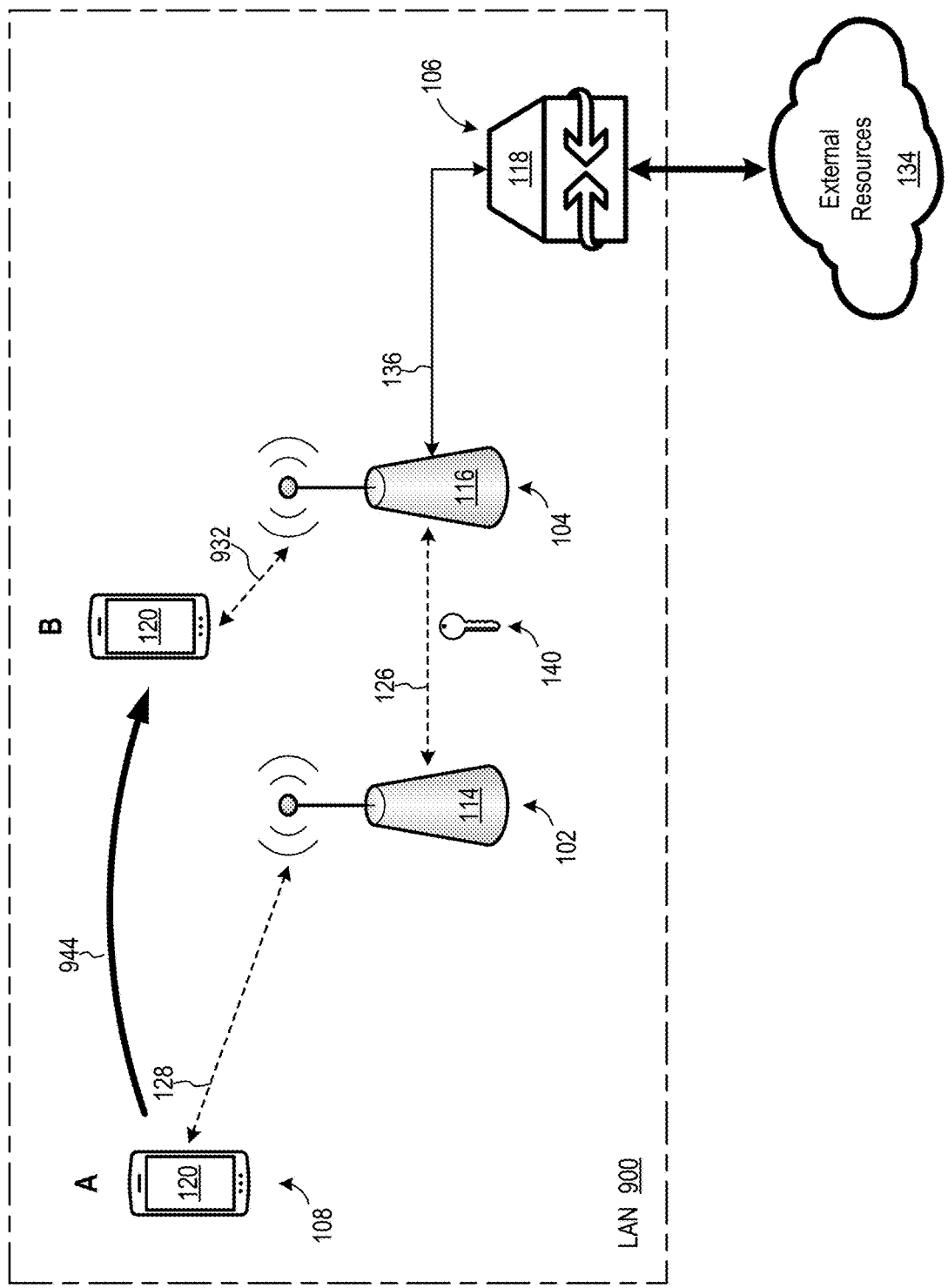
FIG. 9 is a block diagram of an embodiment of the FIG. 1 LAN supporting device roaming by transmitting an encryption key among WAPs.

Some embodiments of LANs 100, 200, 500, and 700 are further configured to support roaming of a device among WAPs by transmitting an encryption key among WAPs, thereby promoting fast transitioning of the device from one WAP to another WAP. For example, FIG. 9 is a block diagram of a LAN 900, which is an embodiment of LAN 100 configured to transmit an encryption key among WAPs for roaming purposes. In the FIG. 9 embodiment, first device 120 is initially located at position A in LAN 900, and first WAP 114 establishes first encrypted wireless communication link 128 according to encryption key 140. First device 120 subsequently moves (roams) to position B in LAN 900, as represented by an arrow 944, where position B is closer to second WAP 116 than to first WAP 114. First WAP 114 and second WAP 116 accordingly cooperate to transfer encryption key 140 from first WAP 114 to second WAP 116, and second WAP 116 subsequently establishes a second encrypted wireless communication link 932 with first device 120 according to encryption key 140. First WAP 114 and second WAP 116 optionally additionally cooperate to transfer a current state of first device 120 from first WAP 114 to second WAP 116 to assist in transitioning first device 120 from first WAP 114 to second WAP 116. Second WAP 116 exchanges data packets with first device 120 via second encrypted wireless communication link 932. The fact that first and second encrypted wireless communication links 128 and 932 use a common encryption key, i.e. encryption key 140, supports fast transitioning of first device 120 from first WAP 114 to second WAP 116.

Discussed below with respect to FIGS. 10-15 are several alternate embodiments of LAN 100. It should be appreciated, however, that LAN 100 could have other alternate configurations without departing from the scope hereof.

Figure 10:
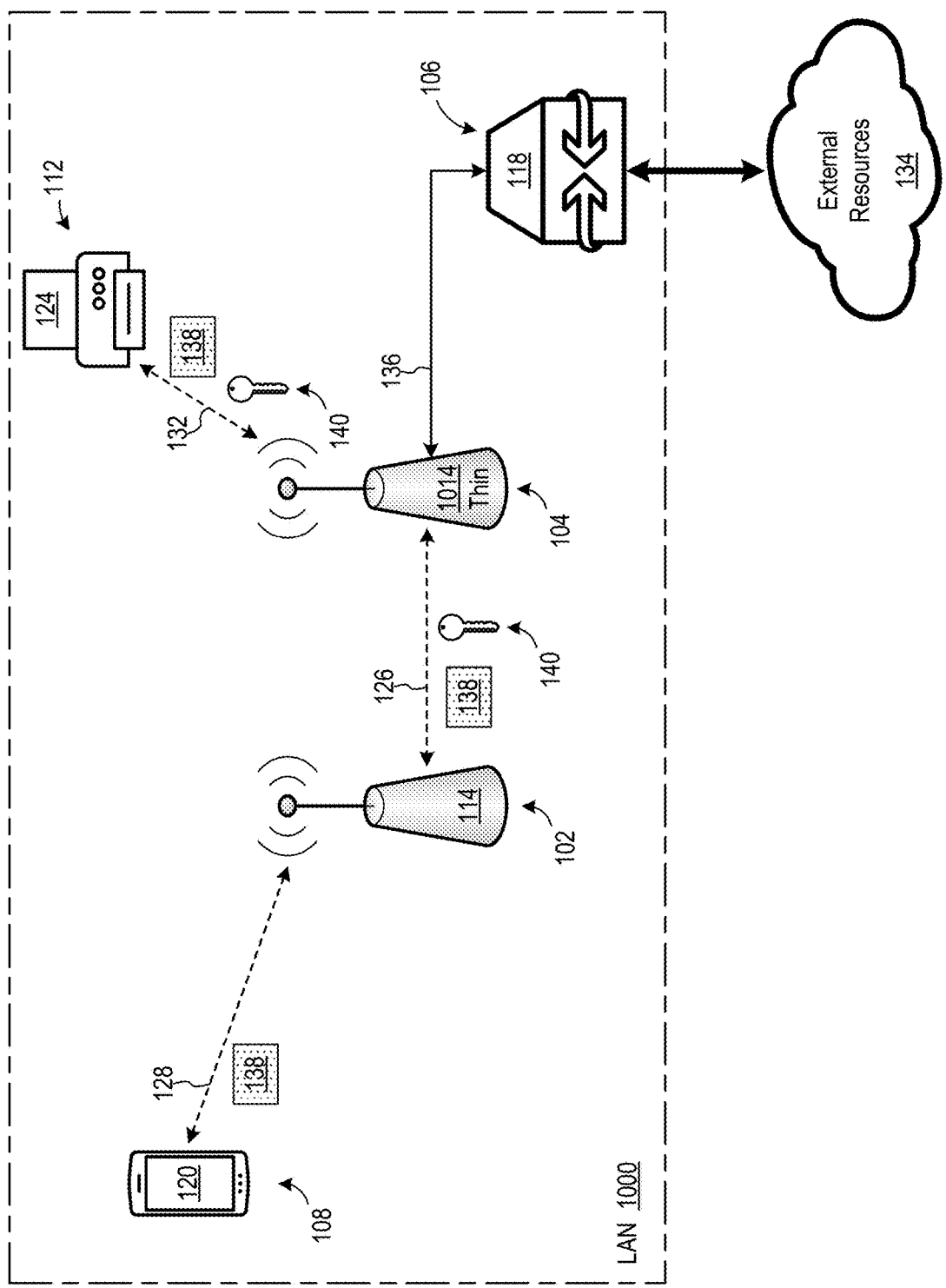
FIG. 10 is a block diagram of an alternate embodiment of the FIG. 1 LAN where a WAP is replaced with a thin WAP.

FIG. 10 is a block diagram of a LAN 1000, which is an alternate embodiment of LAN 100 where second WAP 116 is replaced with a thin WAP 1014. In some embodiments, thin WAP 1014 is embodied similar to thin WAP 300 or thin WAP 400 of FIGS. 3 and 4, respectively. In some embodiments, first WAP 114 is embodied as one of thin WAP 214, WAP 514, or WAP 714. Thin WAP 1014 forwards encrypted data packet 138 received from node 102 to node 112, without decrypting the data packet. Additionally, thin WAP 1014 optionally forwards encryption key 140 received from node 102 to node 112. Third device 124 at node 112 subsequently decrypts data packet 138 using encryption key 140. Accordingly, encrypted data packet 138 travels from node 108 to node 112 without being decrypted, thereby promoting low latency of data packet 138, low processing requirements of WAPs 114 and 1014, low power consumption of WAPs 114 and 1014, and security of data in encrypted data packet 138.

Figure 11:
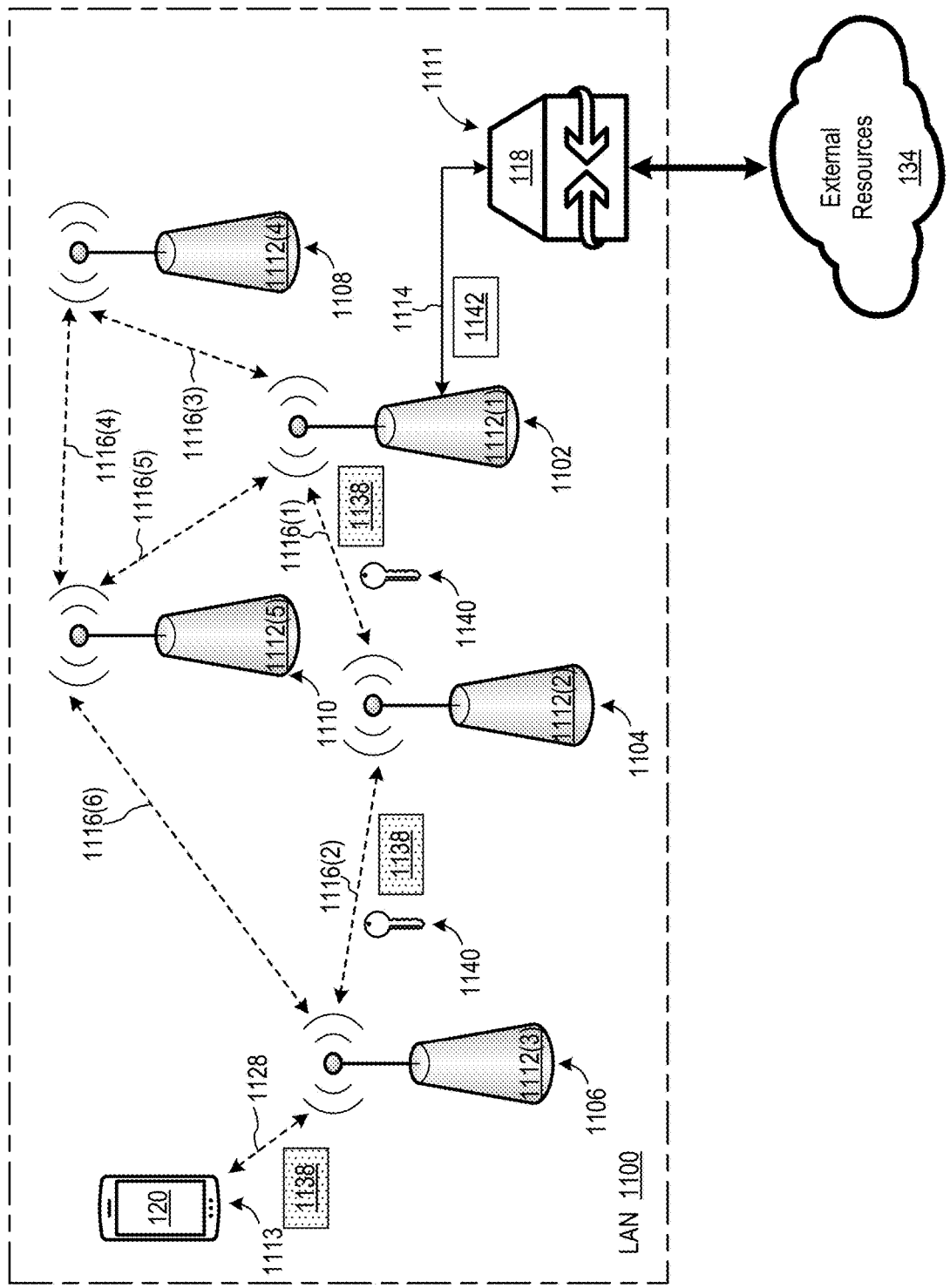
FIG. 11 is block diagram of an alternate embodiment of the FIG. 1 LAN supporting distributed wireless encryption among a plurality of WAPs configured as a mesh network.

FIG. 11 is block diagram of a LAN 1100, which is an alternate embodiment of LAN 100 supporting distributed wireless encryption among a plurality of WAPs configured as a mesh network. LAN includes nodes 1102, 1104, 1106, 1108, 1111, and 1113. Each of nodes 1102, 1104, 1106, 1108, and 1110 includes a respective WAP 1112, node 1111 includes an instance of gateway device 118, and node 1113 includes an instance of first device 120. In this document, specific instances of an item may be referred to by use of a numeral in parentheses (e.g., WAP 1112(1)) while numerals without parentheses refer to any such item (e.g., WAPs 1112). LAN 1100 may include additional nodes without departing from the scope hereof.

In some embodiments, each WAP 1112 is embodied as first WAP 114, second WAP 116, thin WAP 214, WAP 514, or WAP 714. Each WAP 1112, however, need not have the same configuration. For example, in one embodiment, WAP 1112(3) is embodied as WAP 514 or 714, WAP 1112(1) is embodied as second WAP 116, and each other WAP 1112 is embodied as thin WAP 214. WAP 1112(1) is communicatively coupled to gateway device 118 via a communication link 1114, which includes, for example, one or more of an electrical cable, an optical cable, and a wireless communication link. WAPs 1112(2)-1112(5) are communicatively coupled to WAP 1112(1) via wireless communication links 1116, so that WAPs 1112 collectively form a wireless mesh network. Wireless communication links 1116 are optionally encrypted. WAP 1112(3) is configured to establish an encrypted wireless communication link 1128 with first device 120 according to an encryption key 1140, and WAP 1112(3) exchanges data packets with first device 120 via encrypted wireless communication link 1128. In some embodiments, WAP 1112(3) is configured to establish encrypted wireless communication link 1128 according to one of a WPA2 protocol and a WPA3 protocol. However, WAP 1112(3) could be configured to establish encrypted wireless communication link 1128 according to one or more other protocols without departing from the scope hereof.

In an embodiment, WAP 1112(3) receives an encrypted data packet 1138 from first device 120 via encrypted wireless communication link 1128. WAP 1112(3) forwards encrypted data packet 1138 to node 1104 without decrypting the data packet. WAP 1112(2) at node 1104 forwards encrypted data packet 1138 to node 1102 without decrypting the data packet, such that decrypted data packet 1138 arrives at its destination node (node 1102) without being decrypted. WAP 1112(3) also optionally forwards encryption key 1140 to node 1104, and WAP 1112(2) at node 1104 optionally forwards encryption key 1140 to node 1102. WAP 1112(1) at node 1102 decrypts encrypted data packet 1138 using encryption key 1140, to yield decrypted data packet 1142. WAP 1112(1) optionally forwards decrypted data packet 1142 to gateway device 118 via communication link 1114, as illustrated in FIG. 11.

Figure 12:
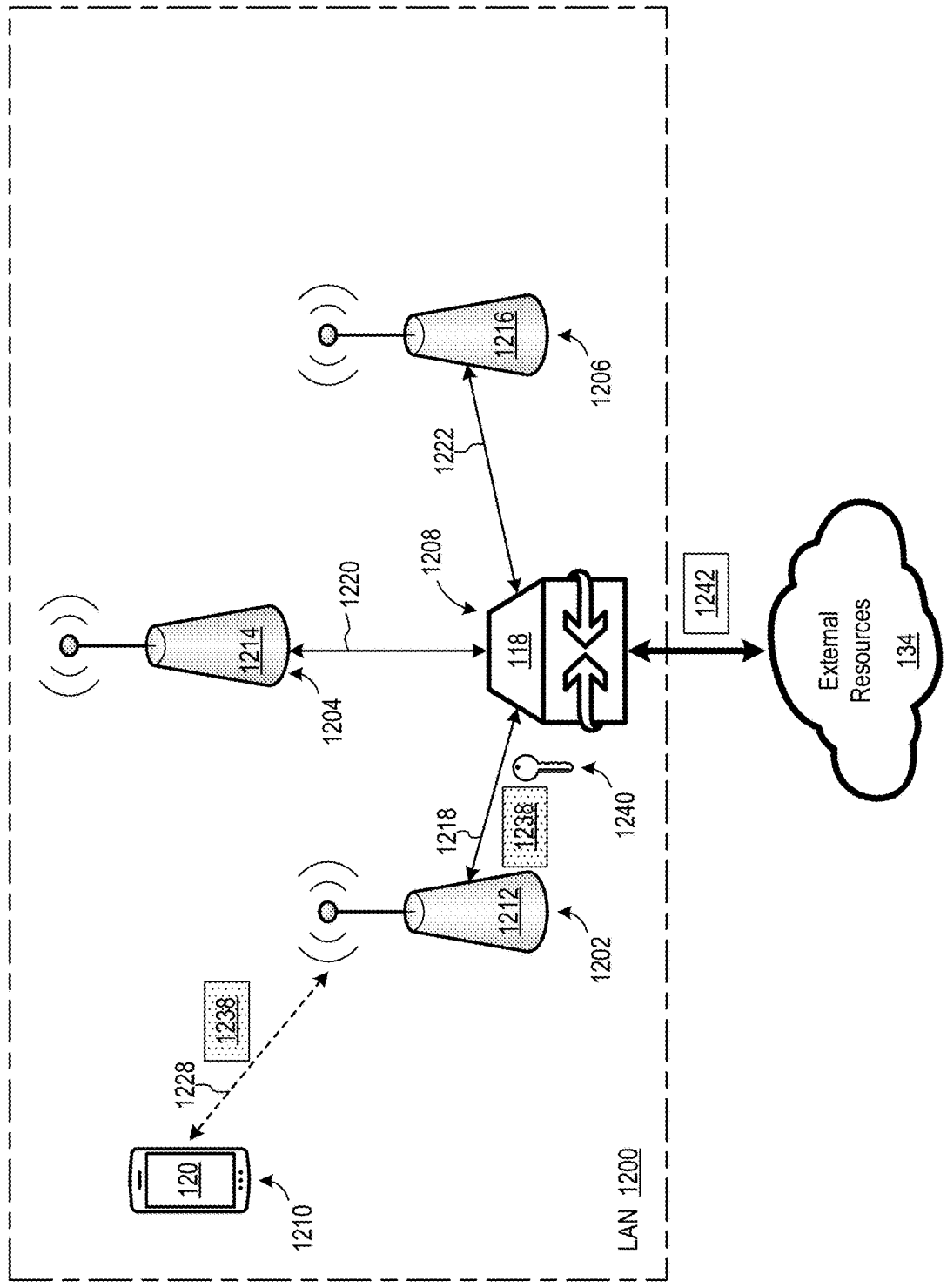
FIG. 12 is block diagram of an alternate embodiment of the FIG. 1 LAN including a plurality of WAPs communicatively coupled to a gateway device in a star configuration.

FIG. 12 is a block diagram of a LAN 1200, which is an alternate embodiment of LAN 100 including a plurality of WAPs communicatively coupled to a gateway device in a star configuration. LAN 1200 includes nodes 1202, 1204, 1206, 1208, and 1210. Nodes 1202, 1204, and 1206 include WAPs 1212, 1214, and 1216, respectively. Node 1208 includes an instance of gateway device 118, and node 1210 includes an instance of first device 120. LAN 1200 could be modified to have a different number of nodes without departing from the scope hereof.

In some embodiments, each of WAP 1212, 1214, and 1216 is embodied as first WAP 114, second WAP 116, thin WAP 214, WAP 514, or WAP 714. Each WAP of LAN 1200, however, need not have the same configuration. Each of communication links 1218, 1220, and 1222 includes, for example, one or more of an electrical cable, an optical cable, and a wireless communication link. WAP 1212 is configured to establish an encrypted wireless communication link 1228 with first device 120 according to an encryption key 1240, and WAP 1212 exchanges data packets with first device 120 via encrypted wireless communication link 1228. In some embodiments, WAP 1212 is configured to establish encrypted wireless communication link 1228 according to one of a WPA2 protocol and a WPA3 protocol. However, WAP 1212 could be configured to establish encrypted wireless communication link 1218 according to one or more other protocols without departing from the scope hereof.

In an embodiment, WAP 1212 receives an encrypted data packet 1238 from first device 120 via encrypted wireless communication link 1228. WAP 1212 forwards encrypted data packet 1238 to node 1208 without decrypting the data packet. WAP 1212 also optionally forwards encryption key 1240 to node 1208. Gateway device 118 at node 1208 decrypts encrypted data packet 1238 using encryption key 1240, to yield decrypted data packet 1242. Decrypted data packet 1242 is optionally forwarded to external resources 134, as illustrated in FIG. 12.

Figure 13:
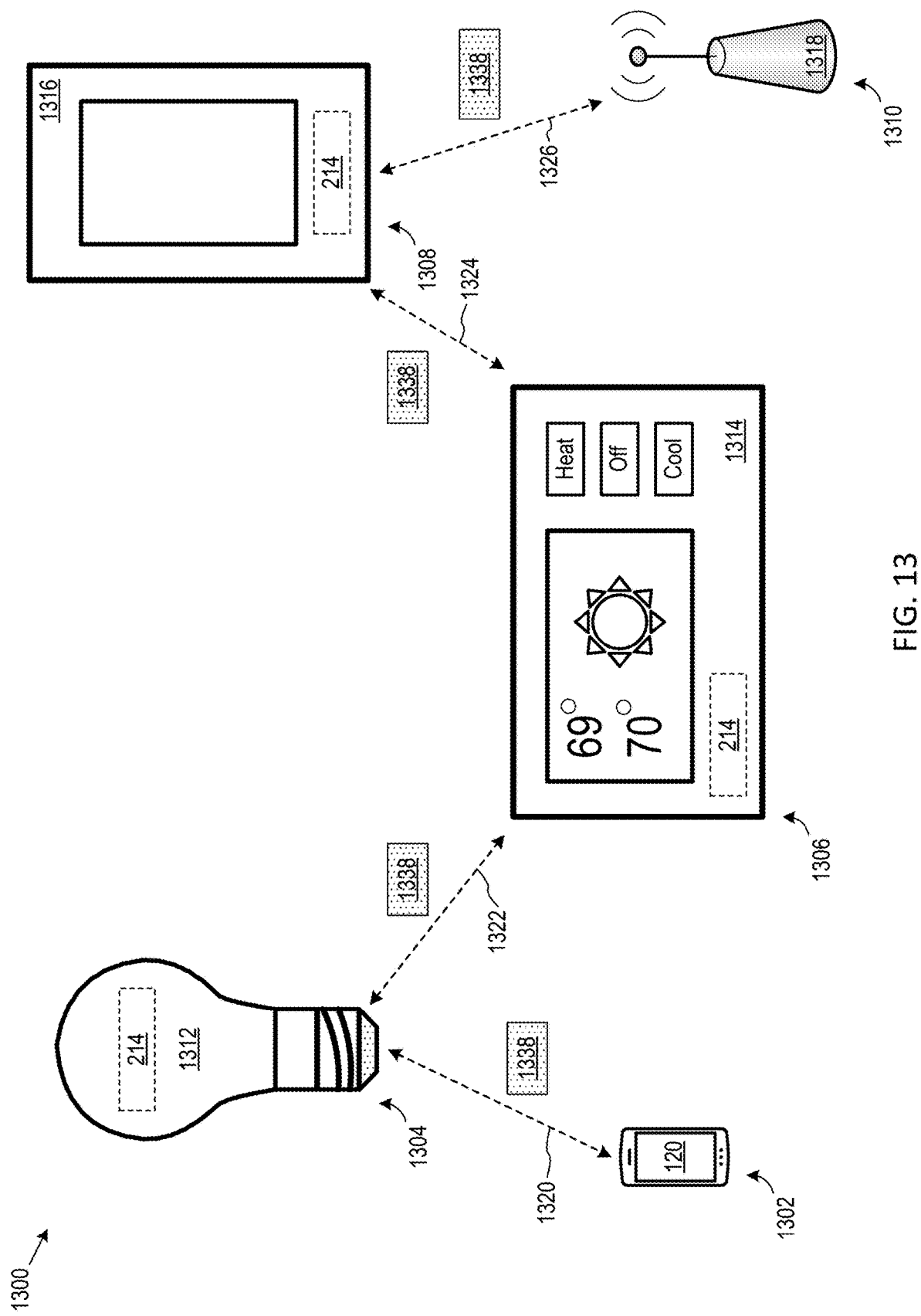
FIG. 13 is block diagram of an alternate embodiment of the FIG. 1 LAN including a plurality of Internet of Things (IoT) devices, where each IoT device includes an instance of the FIG. 2 thin WAP.

The fact that a thin WAP is configured to forward encrypted data packets without decrypting the data packets helps minimize processing and power requirements of the thin WAP, as well as cost of the thin WAP, thereby facilitating incorporation of the thin WAP into another device, such as an IoT device. For example, FIG. 13 is a block diagram of an alternate embodiment of LAN 100 including a plurality of IoT devices, where each IoT device includes an instance of thin WAP 214. LAN 1300 includes nodes 1302, 1304, 1306, 1308, and 1310. Node 1302 includes an instance of first device 120, node 1304 includes a light bulb 1312, node 1306 includes a thermostat 1314, node 1308 includes a light switch 1316, and node 1310 includes a WAP 1318. Each of light bulb 1312, thermostat 1314, and light switch 1316 is an IoT device, i.e. each of these devices is capable of communicating via the Internet. Additionally, each of light bulb 1312, thermostat 1314, and light switch 1316 includes an instance of thin WAP 214, symbolically shown in FIG. 13 by boxes formed of dashed lines. Accordingly, light bulb 1312, thermostat 1314, and light switch 1316 collectively form a mesh wireless network, and each of light bulb 1312, thermostat 1314, and light switch 1316 can relay encrypted data packets without decrypting the data packets.

For example, FIG. 13 illustrates first device 120 generating an encrypted data packet 1338, which is transmitted to WAP 1318 via the IoT devices of LAN 1300. Specifically, light bulb 1312 receives encrypted data packet 1338 via an encrypted wireless communication link 1320. Light bulb 1312 forwards encrypted data packet 1338 to thermostat 1314 via an encrypted wireless communication link 1322, without decrypting encrypted data packet 1338. Thermostat 1314 forwards encrypted data packet 1338 to light switch 1316 via an encrypted wireless communication link 1324, without decrypting encrypted data packet 1338, and light switch 1316 forwards encrypted data packet 1338 to WAP 1318 via an encrypted wireless communication link 1326, without decrypting encrypted data packet 1338. WAP 1318 optionally decrypts encrypted data packet 1338. It should be noted that transmission of data packet 1338 in LAN 1300 without decrypting the data packet relieves the IoT devices from performing decryption, thereby promoting simplicity of the IoT devices and low power consumption by the IoT devices. Additionally, transmission of data packet 1338 in LAN 1300 in encrypted form promotes security by reducing likelihood of unauthorized access to data of the data packet as the data packet travels in LAN 1300.

LAN 1300 could have fewer nodes or additional nodes without departing from the scope hereof. Additionally, the IoT devices at the nodes of LAN 1300 could vary. For example, in an alternate embodiment, thermostat 1314 and light switch 1316 are each replaced with a respective instance of light bulb 1312, such that a plurality of IoT light bulbs form a mesh wireless network in LAN 1300. Furthermore, in some alternate embodiments, one or more of wireless communication links 1320, 1322, 1324, and 1326 are not encrypted.

Applicant has determined that incorporating thin WAPs into IoT devices may achieve significant advantages. For example, conventional WAPs are considered by many to be unsightly. Incorporating thin WAPs into IoT devices, however, enables the WAPs to be partially or completely hidden, e.g. hidden within an IoT lightbulb, thermostat, or light switch, thereby promoting pleasing aesthetics. As another example, IoT devices are often found at locations that would ideal for a WAP, such as in a light fixture that is in line-of-sight to most of a room. Therefore, incorporating thin WAPs into IoT devices may promote good wireless communication coverage and performance. As yet another example, conventional WAPs require an electrical power source which may limit their deployment, e.g. a conventional WAP may need to be within close proximity to an electrical outlet. A thin WAP incorporated into an IoT device, however, may operate from the IoT device's power source, thereby enabling the thin WAP to be used in locations lacking a nearby electrical outlet.

Figure 14:
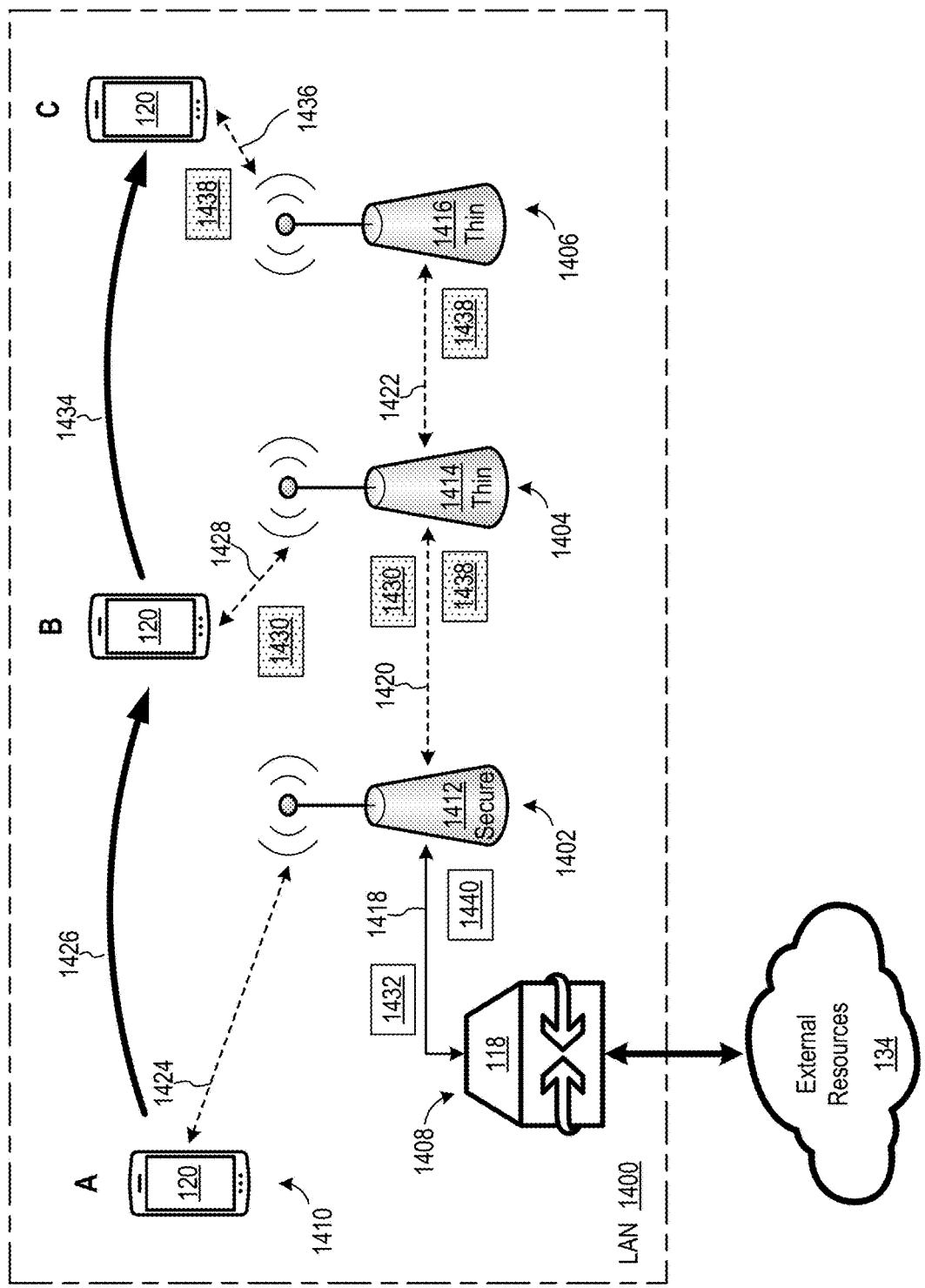
FIG. 14 is a block diagram of an alternate embodiment of the FIG. 1 LAN including a secure WAP and a plurality of thin WAPs.

FIG. 14 is a block diagram of a LAN 1400, which is an alternate embodiment of LAN 100 including a secure WAP and a plurality of thin WAPs. LAN 1400 includes nodes 1402, 1404, 1406, 1408, and 1410. Nodes 1402, 1404, and 1406 include a secure WAP 1412, a thin WAP 1414, and a thin WAP 1416, respectively. Node 1408 includes an instance of gateway device 118, and node 1410 includes an instance of first device 120. LAN 1400 could be modified to have a different number of nodes without departing from the scope hereof.

Secure WAP 1412 is communicatively coupled to gateway device 118 via a communication link 1418 which includes, for example, one or more of an electrical cable, wired network cable, an optical cable, and a wireless communication link. Thin WAP 1414 is illustrated as being communicatively coupled to secure WAP 1412 via a wireless communication link 1420, and thin WAP 1416 is illustrated as being communicatively coupled to thin WAP 1414 via a wireless communication link 1422. In embodiments, wireless communication links 1420 and 1422 operate at different respective frequencies. In some other embodiments, wireless communication links 1420 and 1422 operate on different respective channels of a common or different radio frequency band. In yet other embodiments, wireless communication links 1420 and 1422 operate on a common channel, and thin WAP 1414 is configured to remove signals transmitted on one of wireless communication links 1420 and 1422 from signals received from the other of wireless communication links 1420 and 1422, to enable simultaneous data transmission on wireless communication links 1420 and 1422. In some alternate embodiments, wireless communication links 1420 and/or 1422 are replaced with, or by supplemented by, a wired communication link, such as a wired communication link including an electrical cable and/or an optical cable. Additionally, in some alternate embodiments, thin WAP 1416 is directly communicatively coupled to thin WAP 1414.

In some embodiments, each of secure WAP 1412, thin WAP 1414, and thin WAP 1416 is configured to operate according an IEEE 802.11 protocol and/or a 5G, NR protocol. However, the WAPs could be configured to operate according to one or more other wireless communication protocols without departing from the scope hereof. In some embodiments, each of thin WAP 1414 and thin WAP 1416 is embodied similar to thin WAP 300 or thin WAP 400 of FIGS. 3 and 4, respectively.

Secure WAP 1412 is configured to establish an encrypted wireless communication link 1424 with first device 120, and secure WAP 1412 exchanges encrypted data packets with first device 120 via encrypted wireless communication link 1424. In some embodiments, secure WAP 1214 is configured to establish encrypted wireless communication link 1424 according to one of a WPA2 protocol and a WPA3 protocol. However, secure WAP 1412 could be configured to establish encrypted wireless communication link 1424 according to one or more other protocols without departing from the scope hereof. In contrast to a conventional WAP, secure WAP 1412 is further configured decrypt data packets received from another WAP, such as a thin WAP.

For example, FIG. 14 illustrates first device 120 being initially located at position A in LAN 1400, and secure WAP 1412 establishes encrypted wireless communication link 1424, as discussed above. First device 120 subsequently moves (roams) to position B in LAN 1400, as represented by an arrow 1426, where position B is closer to thin WAP 1414 than to secure WAP 1412. Thin WAP 1414 accordingly establishes an encrypted wireless communication link 1428 with first device 120 at position B, and thin WAP 1414 exchanges encrypted data packets 1430 with first device 120 via encrypted wireless communication link 1428. Secure WAP 1412 and thin WAP 1414 optionally additionally cooperate to transfer a current state of first device 120 from secure WAP 1412 to thin WAP 1414, to assist in transitioning first device 120 from secure WAP 1412 to thin WAP 1414. Thin WAP 1414 does not have decryption capability, and thin WAP 1414 therefore forwards encrypted data packets 1430 to secure WAP 1412 for decryption. Secure WAP 1412 decrypts encrypted data packets 1430 to yield decrypted data packets 1432. In some embodiments, secure WAP 1412 forwards decrypted data packets 1432 to gateway device 118.

First device 120 next moves (roams) from position B to position C in LAN 1400, as represented by an arrow 1434, where position C is closer to thin WAP 1416 than to thin WAP 1414. Thin WAP 1416 accordingly establishes an encrypted wireless communication link 1436 with first device 120 at position C, and thin WAP 1416 exchanges encrypted data packets 1438 with first device 120 via encrypted wireless communication link 1436. Thin WAP 1414 and thin WAP 1416 optionally additionally cooperate to transfer a current state of first device 120 from thin WAP 1414 to thin WAP 1416, to assist in transitioning first device 120 from thin WAP 1414 to thin WAP 1416. Thin WAP 1416 does not have decryption capability, and thin WAP 1416 therefore forwards encrypted data packets 1438 to secure WAP 1412 for decryption. Secure WAP 1412 decrypts encrypted data packets 1438 to yield decrypted data packets 1440. In some embodiments, secure WAP 1412 forwards decrypted data packets 1440 to gateway device 118.

Figure 15:
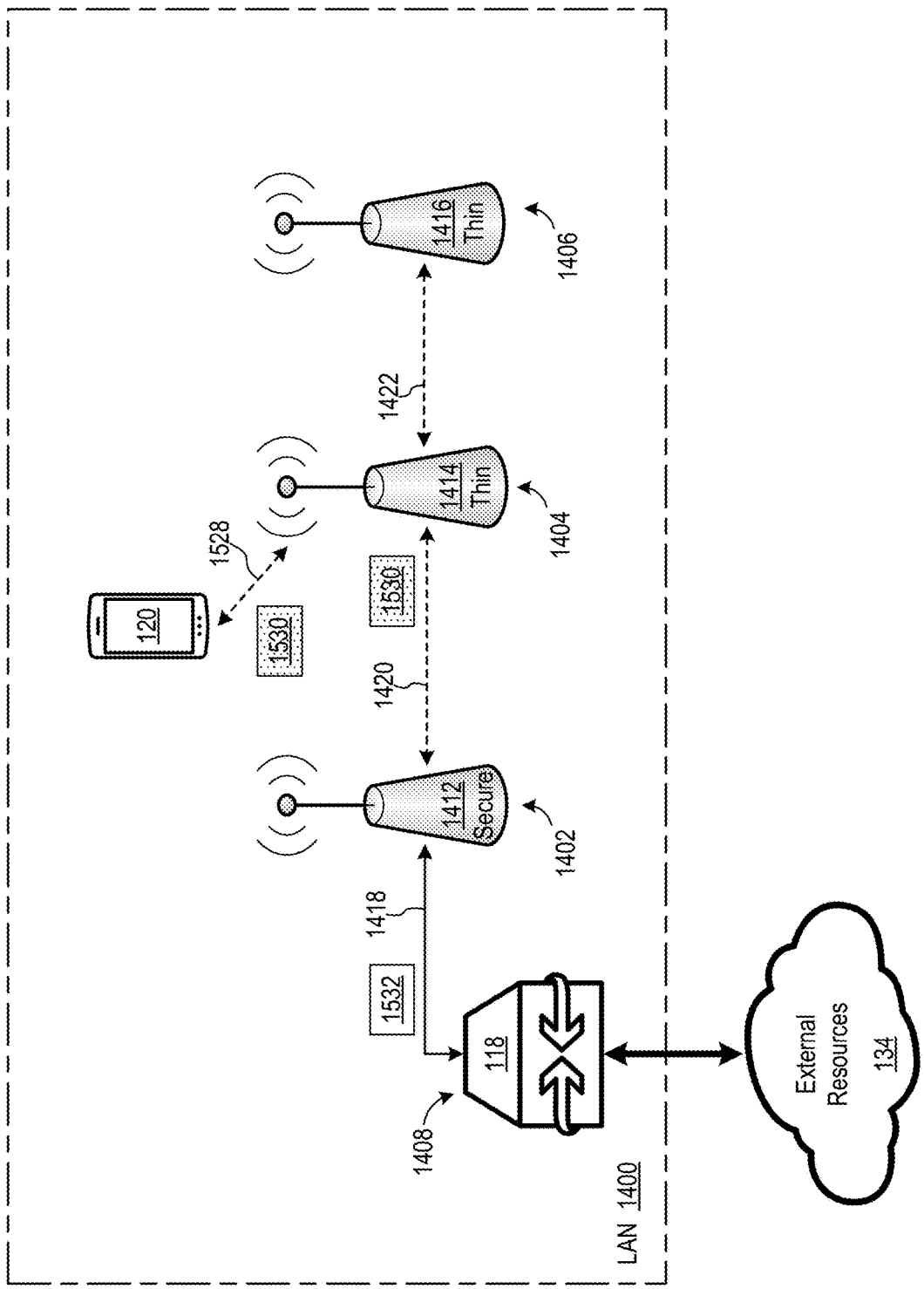
FIG. 15 is a block diagram illustrating an alternative operating scenario of the FIG. 14 LAN.

In FIG. 14, first device 120 initially connects to secure WAP 1412 to initiate an encrypted communication session with LAN 1400 (via encrypted wireless communication link 1424). In some embodiments of LAN 1400, thin WAPs 1414 and 1416 are also configured to initiate an encrypted communication session with a device, such as first device 120. For example, FIG. 15 is a block diagram illustrating an alternative operating scenario of LAN 1400 where thin WAP 1414, instead of secure WAP 1412, initiates an encrypted communication session with first device 120. Specifically, thin WAP 1414 establishes an encrypted wireless communication link 1528 with first device 120, and thin WAP 1414 exchanges encrypted data packets 1530 with first device 120 via encrypted wireless communication link 1528. In some embodiments, thin WAP 1414 handles encryption key negotiation with first device 120 to establish encrypted wireless communication link 1528. In some other embodiments, thin WAP 1414 acts as a conduit between first device 120 and secure WAP 1412 for encryption key negotiation data, such that secure WAP 1412 handles key negotiation with first device 120 to establish encrypted wireless communication link 1528. Thin WAP 1414 forwards encrypted data packets 1530 to secure WAP 1412 for decryption. Secure WAP 1412 decrypts encrypted data packets 1530 to yield decrypted data packets 1532. In some embodiments, secure WAP 1412 forwards decrypted data packets 1532 to gateway device 118.

Emerging applications, such as virtual reality and augmented reality, are expected to fuel an increasing need for high-capacity, low-latency, wireless communication networks. Furthermore, users increasingly expect ubiquitous wireless communication network service in a building. Accordingly, it is anticipated that buildings will need many WAPs, such as at least one WAP in each major room of a building.

Consumer WAPs are typically designed to be placed on furniture in a room, such as on a table, desk, or shelf. However, such location is often non-ideal because objects within the room, such as furniture or people, can block a wireless communication link between the WAP and a client. Such problem is particularly acute when using a high frequency wireless communication link, such as a millimeter wave wireless communication link, that cannot readily penetrate an object. Some commercial WAPs are designed for ceiling installation, such that the WAP is in line of sight (LoS) to user equipment in a room. While ceiling installation is ideal from a performance standpoint, conventional ceiling mounted WAPs require dedicated wiring for power (and sometimes also for data transmission), which may make installation difficult and/or expensive. Indeed, it may be essentially impossible to install a conventional ceiling mounted WAP in an existing building without significant alterations to the building.

Discussed below with respect to FIGS. 16-36 are mesh WAPs which at least partially overcome the above-discussed drawbacks of conventional WAPs. Certain embodiments of the new WAPs are configured to be directly or indirectly affixed to, or integrated with, a feature of a building, such as a ceiling or a wall, or an electrical work box in a ceiling or wall, so to promote LoS to clients in a room. Additionally, some embodiments are configured to replace or supplement an existing building device, such as a light fixture, so that the WAPs can receive electrical power via existing electrical wiring. Furthermore, some embodiments are integrated in furniture or a similar structure to achieve good wireless communication network performance and pleasing aesthetics.

Figure 16:
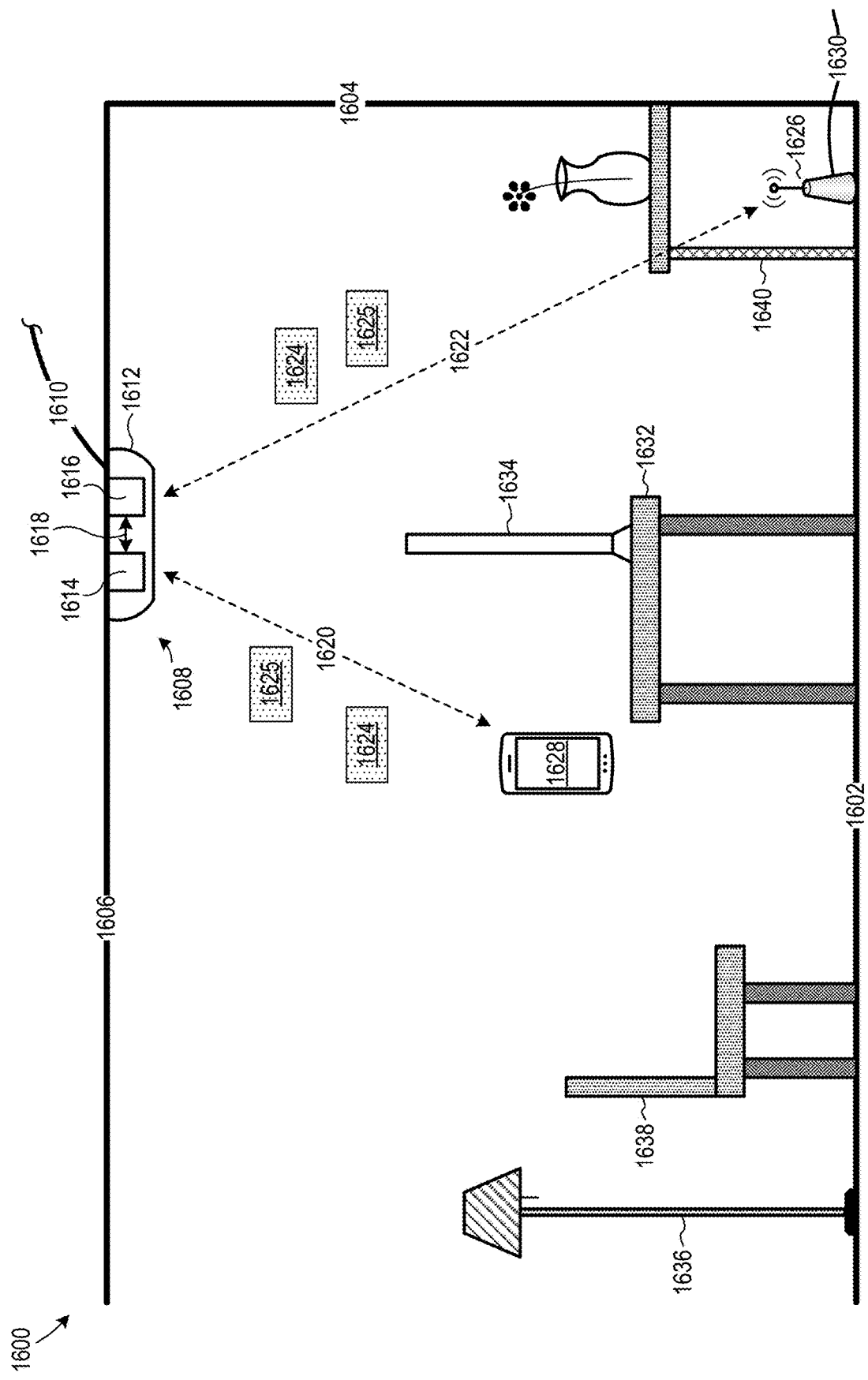
FIG. 16 is an illustration of a room including a mesh WAP, according to an embodiment.

FIG. 16 is an illustration of a room 1600 of a building, where room 1600 includes a floor 1602, a wall 1604, and a ceiling 1606. A mesh WAP 1608 is affixed to ceiling 1606. Mesh WAP 1608 may be either directly affixed to ceiling 1606, or mesh WAP 1608 may be indirectly affixed to ceiling 1606. For example, mesh WAP 1608 may be affixed to an electrical work box (not shown) on ceiling 1606 or recessed in ceiling 1606, such that mesh WAP 1608 is indirectly affixed to ceiling 1606 via the electrical work box. Mesh WAP 1608 could alternately be affixed to wall 1604. Furthermore, mesh WAP 1608 could be integrated with ceiling 1606 or wall 1604. Some embodiments of mesh WAP 1608 are configured to replace a device (not shown) that receives electrical power via electrical wiring 1610, such as a light fixture or a smoke detector, and mesh WAP 1608 is configured to be at least partially powered via electrical wiring 1610. Consequentially, certain embodiments of mesh WAP 1608 are amenable to installation in existing buildings because they are capable of being powered from existing electrical wiring. However, mesh WAP 1608 is not limited to retrofit applications, and mesh WAP 1608 could be powered from newly installed electrical wiring without departing from the scope hereof. Electrical wiring 1610 is for, example, high voltage electrical wiring (e.g., 120 volts, 240 volts, 480 volts, etc.) or low voltage electrical wiring (e.g., 12 volts, 18 volts, 24 volts, 48 volts, etc.).

Mesh WAP 1608 includes a housing 1612, a first radio assembly 1614, a second radio assembly 1616, and an internal communication link 1618. Housing 1612 is configured to be attached directly or indirectly to, or integrated with, a feature of a building, such as ceiling 1606 or wall 1604. Housing 1612 can take a variety of forms, as long as it is configured to be attached directly or indirectly to a building feature, or integrated with a building feature. For example, housing 1612 could be part of a light fixture, a ceiling fan, a sensing device (e.g., a smoke detector, a carbon monoxide detector, a carbon dioxide detector, a temperature detector, a humidity detector, a motion detector, a light detector, a sound detector, a camera), an output device (e.g., a fire alarm, a security alarm, a strobe light, a public address speaker), a window covering device, a building ornamental feature, etc.

First radio assembly 1614 is incorporated in housing 1612 and is configured to support a first wireless communication link 1620. Second radio assembly 1616 is incorporated in housing 1612 and is configured to support a second wireless communication link 1622. Internal communication link 1618 is configured to transmit data packets between first and second radio assemblies 1614 and 1616. In some embodiments, internal communication link 1618 includes a cable and/or a printed circuit board (PCB). In some embodiments, mesh WAP 1608 is configured to relay data packets between a client and another WAP, or between two or more other WAPs. For example, FIG. 16 illustrates mesh WAP 1608 relaying encrypted data packets 1624 and 1625 between another WAP 1626 and a client in the form of UE 1628. Second radio assembly 1612 may receive encrypted data packets 1624 from other WAP 1626 via second wireless communication link 1626, internal communication link 1618 may transmit encrypted data packets 1624 from second radio assembly 1616 to first radio assembly 1614, and first radio assembly 1614 may transmit encrypted data packets 1624 to UE 1628 via first wireless communication link 1620. Additionally, first radio assembly 1614 may receive encrypted data packets 1625 from UE 1628 via first wireless communication link 1620, internal communication link 1618 may transmit encrypted data packets 1625 from first radio assembly 1614 to second radio assembly 1616, and second radio assembly 1616 may transmit encrypted data packets 1625 to other WAP 1626 via second wireless communication link 1622.

In some embodiments, mesh WAP 1608 is configured as a thin WAP such that it does not decrypt encrypted data packets, such as encrypted data packets 1624 and 1625. Instead, mesh WAP 1608 relays encrypted data packets without decryption, which promotes low cost, small size, and low power consumption of mesh WAP 1608. In some other embodiments, mesh WAP 1608 selectively decrypts encrypted data packet, such as in a manner similar to those discussed above with respect to FIGS. 5-8. Additionally, some embodiments of mesh WAP 1608 are configured to decrypt all received encrypted data packets. Furthermore, mesh WAP 1608 is not limited to supporting encrypted data transmission—to the contrary, some embodiments of mesh WAP 1608 are configured to establish unencrypted wireless communication links, as well as encrypted wireless communication links. Moreover, mesh WAP 1608 need not even be capable of supporting encrypted wireless communication links, such as in applications where security is not required.

It should be appreciated that the location of a mesh WAP 1608, i.e., on the ceiling 1606 of room 1600, helps achieve LoS to clients, such as UE 1628, in room 1600. If mesh WAP 1608 was not present and UE 1628 was instead served directly by WAP 1626, table 1632 and/or television 1634 might interfere with a wireless communication link established directly between WAP 1626 and UE 1628. Additionally, if WAP 1626 was moved to the other side of room 1600, floor lamp 1636 and/or chair 1638 may interfere with a wireless communication link established directly between WAP 1626 and UE 1628. Accordingly, mesh WAP 1608 enables UE 1628 to be indirectly served by WAP 1626, i.e., by relaying data packets between WAP 1626 and UE 1628, even though WAP 1626 is not in LoS with UE 1628. Indeed, presence of mesh WAP 1608 in room 1600 may enable other WAP 1626 to be placed in a cabinet 1640, such as for aesthetic purposes, without degrading wireless communication service to UE 1628, as long as second wireless communication link 1622 can penetrate cabinet 1640.

In some embodiments, first and second radio assemblies 1614 and 1616 are configured to support respective wireless communication links in different frequency ranges. For example, in particular embodiments, first wireless communication link 1620 is in a millimeter frequency range (e.g., 60 gigahertz (GHz) to 72 GHz), and second wireless communication link 1622 is in a 2.4 GHz, 5 GHz, or 6 GHz frequency range. As another example, in some other embodiments, first wireless communication link 1620 is in a 2.4 GHz, 5 GHz, or 6 GHz frequency range, and second wireless communication link 1622 is in a millimeter frequency range (e.g., 60 GHz to 72 GHz).

Presence of dual radio assemblies 1614 and 1616 may advantageously enable WAP 1608 to optimize a wireless communication link frequency for its application. For example, the fact that UE 1628 is in LoS with mesh WAP 1608 enables a high frequency, e.g., millimeter wave, wireless communication link to be established between UE 1628 and WAP 1608. Accordingly, WAP 1608 may establish first wireless communication link 1620 in a millimeter frequency range, which promotes high bandwidth and low latency. On the other hand, presence of cabinet 1640 between WAP 1626 and mesh WAP 1608 may inhibit a high frequency wireless communication link between these two devices. Accordingly, mesh WAP 1608 may establish second wireless communication link 1622 in a lower frequency range, e.g., 5 GHz or 2.4 GHz, so that the wireless communication link can reliably penetrate cabinet 1640.

Presence of dual radio assemblies 1614 and 1616 may also help achieve reliable wireless communication coverage even as operating conditions change. For example, assume that UE 1628 moves, or that a person steps between UE 1628 and mesh WAP 1608, so that wireless communication link 1620 is no longer feasible. Mesh WAP 1608 can potentially establish an alternate wireless communication link (not shown) between UE 1628 and second radio assembly 1616, to maintain reliable wireless communication coverage for UE 1628.

Mesh WAP 1608 is not limited to including two radio assemblies. For example, mesh WAP 1608 could be modified to further include a third radio assembly (not shown), such as to support wireless communication links in three different frequency ranges. As another example, mesh WAP 1608 could be modified by omitting second radio assembly 1616 and internal communication link 1618, such that WAP 1608 includes only one radio assembly. Furthermore, mesh WAP 1608 could be configured to support a wireline backhaul, e.g., via an optical cable, an Ethernet electrical cable, or a powerline communication, in addition to, or in place of, a wireless backhaul communication link.

WAP 1626 is illustrated as being served by a wireline backhaul link 1630, e.g., an electrical cable or an optical cable. However, UE 1626 could instead be another mesh WAP which communicates with one or more additional WAPs via wireless communication links. Additionally, while UE 1628 is depicted as being a mobile a telephone, UE 1628 could take forms, including but not limited to a personal computer (e.g., a tablet computer, a laptop computer, a desktop computer), a video display device (e.g., a television, a smart picture frame, an electronic sign), an entertainment device (e.g., a gaming device, a virtual reality device, an augmented reality device, an audio device, a set-top device), a wearable device, a home assistant device, a security device, an IoT device, etc. Additionally, UE 1628 could be replaced with another mesh WAP or similar device without departing from the scope hereof.

Figure 17:
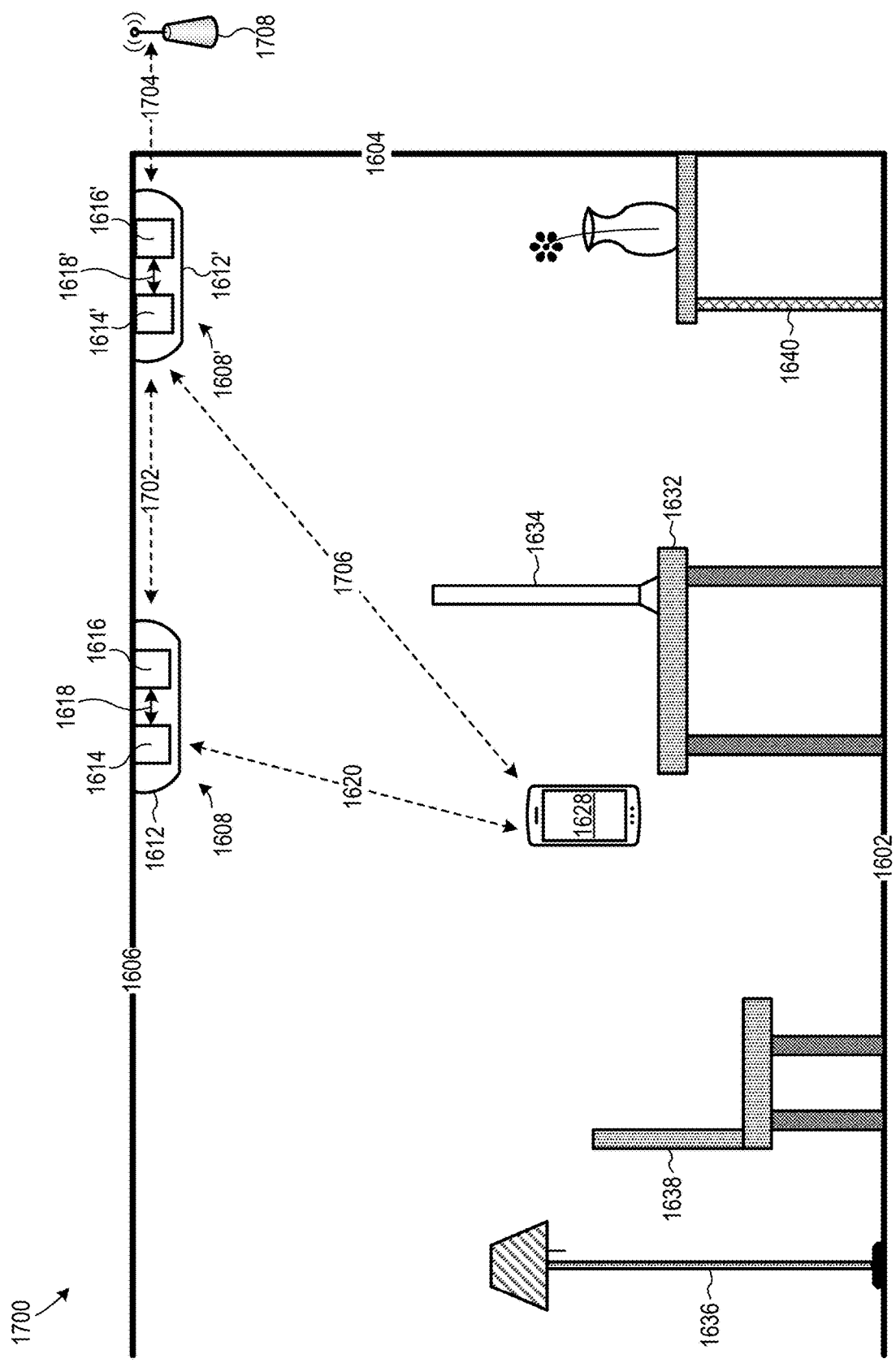
FIG. 17 is an illustration of a room including two mesh WAPs, according to an embodiment.

A room or a building could include a plurality of mesh WAPs 1608 that communicate with each other. For example, FIG. 17 is an illustration of a room 1700 of a building, where room 1700 is similar to room 1600 but further includes a mesh WAP 1608' in place of WAP 1626. Mesh WAP 1608' is as an additional instance of mesh WAP 1608 including a housing 1612', a first radio assembly 1614', a second radio assembly 1616', and an internal communication link 1618'. Mesh WAP 1608 supports first wireless communication link 1620 with UE 1628, and WAP 1608 also supports a first backhaul wireless communication link 1702 with mesh WAP 1608'. Mesh WAP 1608', in turn, supports a second backhaul wireless communication link 1704 with another WAP 1708 outside of room 1700 and on the other side of wall 1604. Not only do multiple mesh WAPS 1608 and 1608' extend wireless communication network access to room 1700 from WAP 1708, but the multiple WAPs help maintain coverage in event of fast fading. For example, if first wireless communication link 1620 is interrupted by a person stepping between WAP 1608 and UE 1628, WAP 1608' may establish an alternate wireless communication link 1706 between WAP 1608' and UE 1628, to maintain wireless communication network service to UE 1628.

Applicant has found that wireless communication links are often readily able to penetrate building walls. For example, a wireless communication link may experience only a 3 to 4 dB loss in signal strength when penetrating an interior wall. Accordingly, second backhaul wireless communication link 1704 may be readily able to penetrate wall 1604. Additionally, some embodiments of mesh WAP 1608' are further configured to increase robustness of second backhaul wireless communication link 1704, to at least partially mitigate loss of signal strength from wall 1604. For example, some embodiments of mesh WAP 1608' are configured so that second backhaul wireless communication link 1704 has greater forward error correction, reduced modulation order, increased channel width, greater channel aggregation, etc., than first backhaul wireless communication link 1702, to increase robustness of second backhaul wireless communication link 1704. Additionally, the fact that second backhaul wireless communication link 1704 travels along ceiling 1606 above any occupants of room 1700 may enable the wireless communication link to have a higher power level than wireless communication links 1620 and 1706 which extend into room 1700's occupancy zone, thereby further increasing robustness of second backhaul wireless communication link 1704.

FIGS. 18-29 illustrate several example embodiments of mesh WAP 1608. However, mesh WAP 1608 is not limited to these example embodiments.

Figure 18:
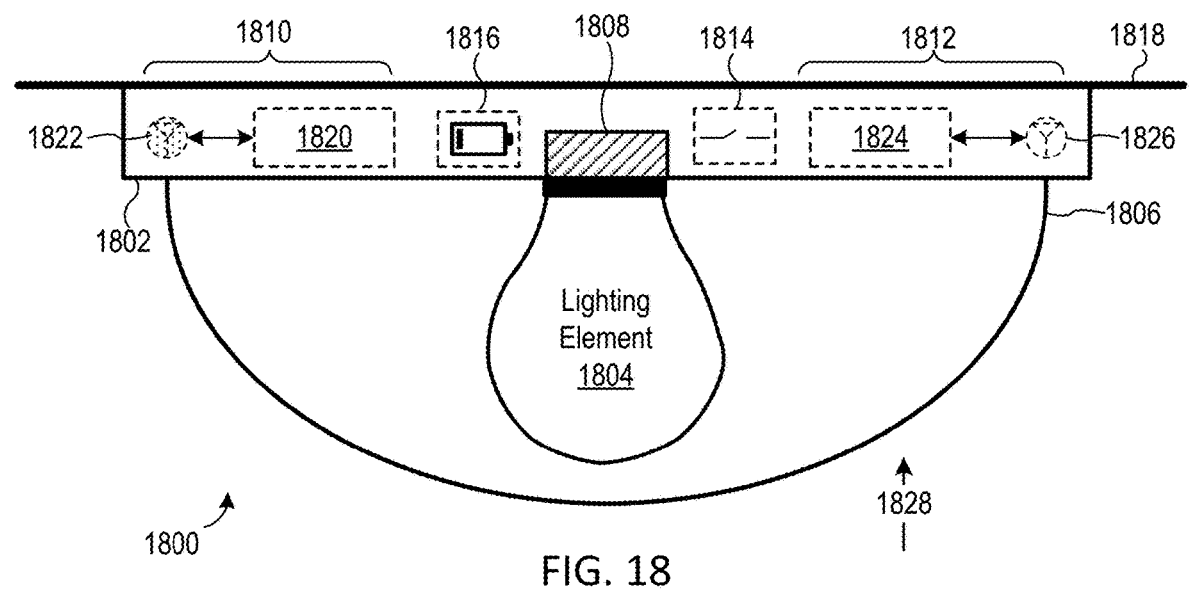
FIG. 18 is a cross-sectional view of a mesh WAP configured as a light fixture, according to an embodiment.

FIG. 18 is a cross sectional view of mesh WAP 1800, which is an embodiment of mesh WAP 1608 that is configured as a light fixture. Mesh WAP 1800 includes a housing 1802, a lighting element 1804, a globe 1806, an electrical interface 1808, a first radio assembly 1810, a second radio assembly 1812, optional lighting control circuitry 1814, and an optional energy storage subsystem 1816. Elements of first and second radio assemblies 1810 and 1812, as well as lighting control circuitry 1814 and energy storage subsystem 1816, are symbolically shown in dashed lines. Accordingly, the illustration of these elements should not be construed to require any particular physical configuration of these elements.

Housing 1802, which is an embodiment of housing 1612, is configured to attach directly or indirectly to, or being integrated with, a structure 1818, such as a ceiling or a wall. Lighting element 1804 is configured to illuminate a space adjacent to mesh WAP 1800, and electrical interface 1808 is configured to provide electrical power to lighting element 1804. In some embodiments, electrical interface 1808 is a device, such as a lightbulb socket, which allows lighting element 1804 to be removed from mesh WAP 1800, such as to replace lighting element 1804. In some other embodiments, electrical interface 1808 forms a permanent, or semi-permanent, connection between lighting element 1804 and one or more other elements of mesh WAP 1800. For example, electrical interface 1808 could include a PCB soldered to lighting element 1804. Globe 1806 acts as a light diffuser, helps protect lighting element 1804 from damage, and/or serves aesthetic purposes.

Figure 19:
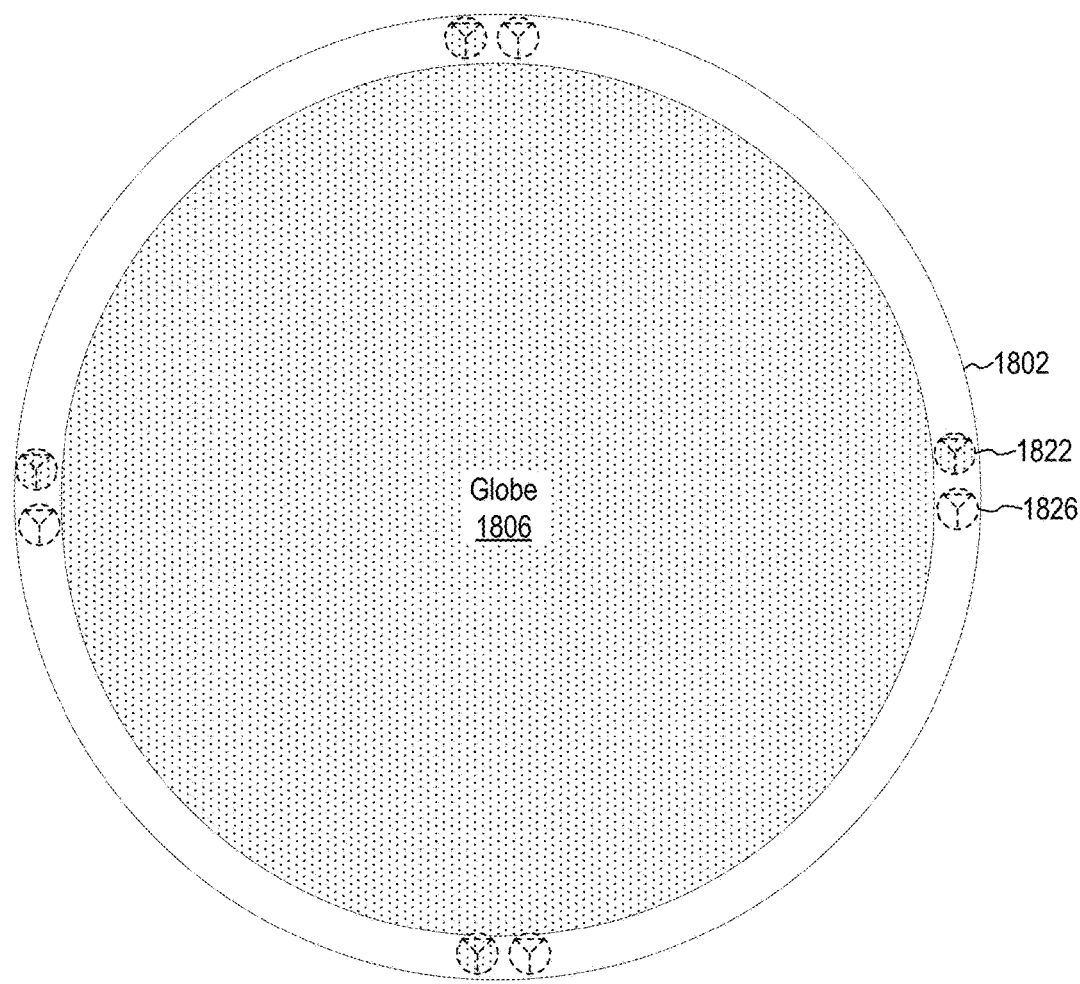
FIG. 19 is a plan view of the FIG. 18 mesh WAP.

First and second radio assemblies 1810 and 1812 are embodiments of first and second radio assemblies 1614 and 1616 of FIG. 16, respectively. An embodiment of internal communication link 1618, which is not shown for illustrative clarity, communicatively couples first and second radio assemblies 1810 and 1812. First radio assembly 1810 includes a radio transceiver 1820 communicatively coupled to one or more first antenna elements 1822. Second radio assembly 1812 includes a radio transceiver 1824 communicatively coupled to one or more second antenna elements 1826. FIG. 19, which is a plan view of mesh WAP 1800 as seen when viewed in a direction 1828 of FIG. 18, illustrates mesh WAP 1800 as including four first antenna elements 1822 and four second antenna elements 1826 (only one of first and second antenna elements are labeled in FIG. 19). However, the number of antenna elements 1822 and 1826, as well as their respective locations within mesh WAP 1800, may vary without departing from the scope hereof. For example, mesh WAP 1800 could include only one first antenna element 1822 and only one second antenna element 1826. As another example, mesh WAP 1800 could include one or more arrays of first antenna elements 1822 and second antenna elements 1826, such as to enable beam forming. Additionally, the number of first antenna elements 1822 need not be equal to the number of second antenna elements 1826. Furthermore, the number of radio assemblies of mesh WAP 1800 may vary without departing from the scope hereof.

Optional lighting control circuitry 1814 is configured to control flow of electrical power to lighting element 1804, such that mesh WAP 1800 is capable of controlling operation of the lighting element 1804. Lighting control circuitry 1814 is included, for example, in embodiments where mesh WAP 1800 is intended to continuously receive power from building electrical wiring (not shown), to enable control of light element 1804 without interrupting electrical power to mesh WAP 1800. Lighting control 1814 includes, for example, a solid-state relay or an electromechanical relay configured to make or break an electrical circuit including lighting element 1804 in response to a switching signal.

Optional energy storage subsystem 1816 is configured to (a) store energy received via a primary electrical power source of WAP 1800, such as building wiring (not shown), and (b) power at least one of first and second radio assemblies 1810 and 1812 when the primary electrical power source is unavailable. For example, assume that lighting circuitry 1814 is omitted and that lighting element 1804 is controlled by wall switch (not shown) which controls flow of electrical power to mesh WAP 1800 via building electrical wiring. Mesh WAP 1800 will not receive electrical power from the building electrical wiring when the wall switch is turned off. However, energy storage system 1816, which is charged from electrical energy received from the building wiring when the wall switch is on, may be capable of powering first and second radio assemblies 1810 and 1812 until the wall switch is turned on again. Energy storage subsystem 1816 includes, for example, one or more energy storage devices such as a battery and/or a capacitor, as well as power conversion circuitry configured to control charging and discharging of the energy storage devices.

Figure 20:
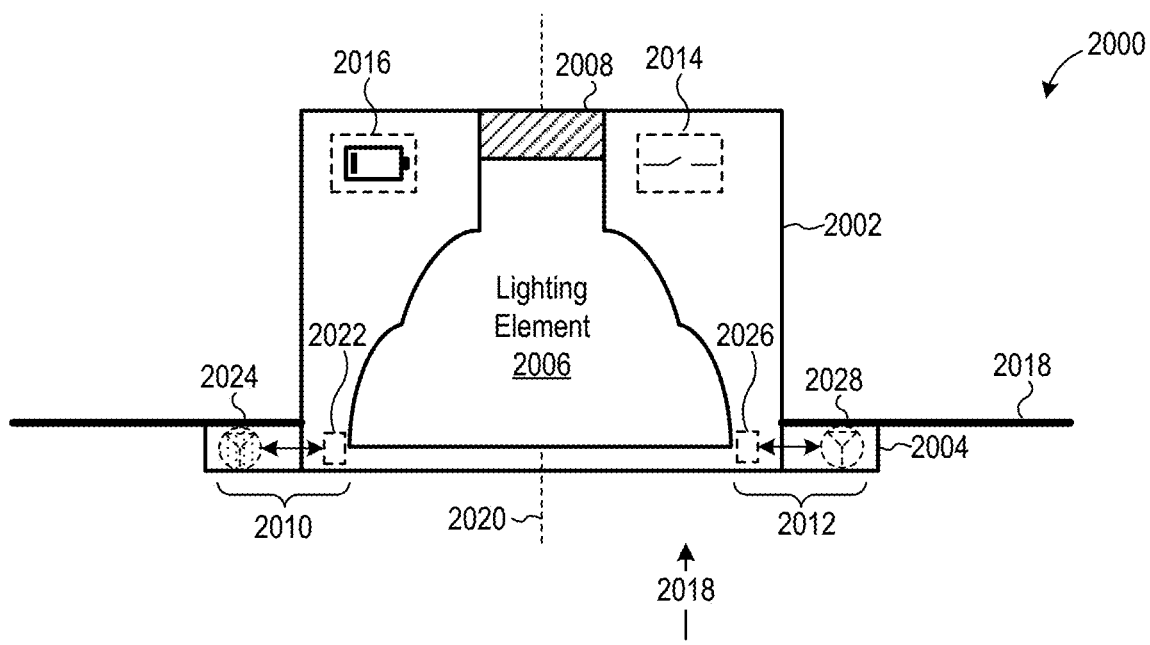
FIG. 20 is a cross-sectional view of another mesh WAP configured as a light fixture, according to an embodiment.
Figure 21:
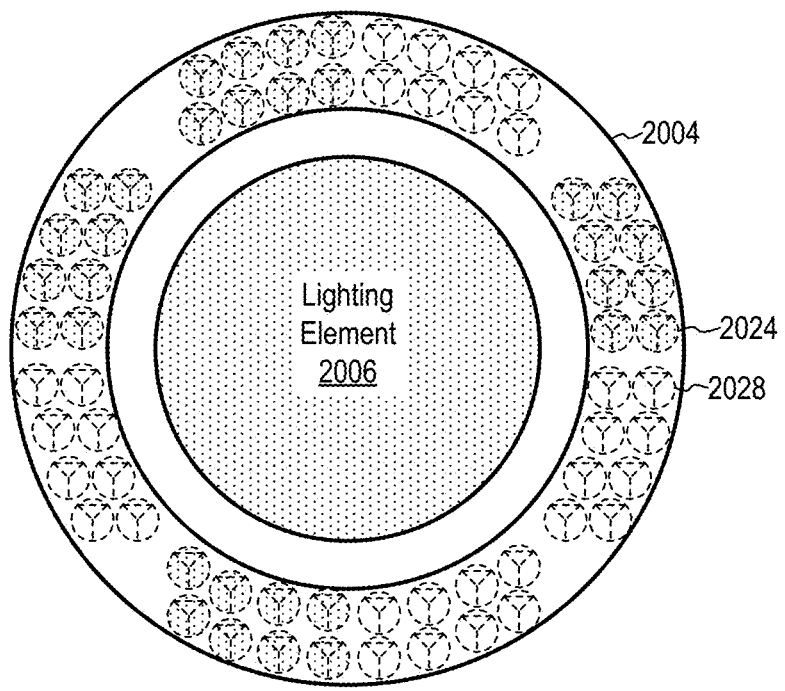
FIG. 21 is a plan view of the FIG. 20 mesh WAP.

FIG. 20 is a cross sectional view of a mesh WAP 2000, which is another embodiment of mesh WAP 1608 that is configured as a light fixture. Mesh WAP 2000 includes a housing 2002, a ring 2004, a lighting element 2006, an electrical interface 2008, a first radio assembly 2010, a second radio assembly 2012, optional lighting control circuitry 2014, and an optional energy storage subsystem 2016. Elements of first and second radio assemblies 2010 and 2012, as well as lighting control circuitry 2014 and energy storage subsystem 2016, are symbolically shown in dashed lines. Accordingly, the illustration of these elements should not be construed to require any particular physical configuration of these elements. FIG. 21 is a plan view of WAP 2000 as seen when the WAP is viewed in a direction 2018 as shown in FIG. 20.

Housing 2002, which is an embodiment of housing 1612, is configured to be at least partially recessed in a structure 2018, such as a ceiling or wall. Housing 2002 is further configured to house lighting element 2006. Accordingly, mesh WAP 2000 is a can light or a recessed light that is also a WAP. Ring 2004 at least partially surrounds housing 2002, and in some embodiments, ring 2004 and housing 2002 are concentric with respect to a center axis 2020. Although ring 2004 and housing 2002 have a circular shape, as seen when viewed in direction 2018, the shape of either of these elements could vary without departing from the scope hereof. For example, each of ring 2004 and housing 2002 could alternately have a rectangular shape. Ring 2004 is configured to extend beyond structure 2018 in a direction opposite of direction 2018, i.e., in a direction parallel to center axis 2020. Ring 2004 is included, for example, to help secure mesh WAP 2000 to structure 2018 and/or for aesthetic purposes.

Lighting element 2006 is configured to illuminate a space adjacent to mesh WAP 2000, and electrical interface 2008 is configured to provide electrical power to lighting element 2006. In some embodiments, electrical interface 2008 is a device, such as a lightbulb socket, which allows lighting element 2006 to be removed from mesh WAP 2000, such as to replace lighting element 2006. In some other embodiment, electrical interface 2008 forms a permanent, or semi-permanent, connection between lighting element 2006 and one or more other elements of mesh WAP 2000. For example, electrical interface 2008 could include a printed circuit board (PCB) soldered to lighting element 2006.

First and second radio assemblies 2010 and 2012 are embodiments of first and second radio assemblies 1614 and 1616 of FIG. 16, respectively. An embodiment of internal communication link 1618, which is not shown for illustrative clarity, communicatively couples first and second radio assemblies 2010 and 2012. First radio assembly 2010 includes a radio transceiver 2022 communicatively coupled to one or more first antenna elements 2024. Second radio assembly 2012 includes a radio transceiver 2026 communicatively coupled to one or more second antenna elements 2028. First and second antenna elements 2024 and 2028 are optionally located in ring 2004 so that the antenna elements are below structure 2018, to promote unimpeded wireless communication links with clients below structure 2018. FIG. 21 illustrates mesh WAP as including four arrays of first antenna elements 2024 and four arrays of second antenna elements 2028, such as to enable beamforming. However, the number of antenna elements 2024 and 2028, as well as their respective locations within mesh WAP 2000, could vary without departing from the scope hereof. For example, mesh WAP 2000 could include only one first antenna element 2024 and only one second antenna element 2028. Additionally, the number of first antenna elements 2024 need not be equal to the number of second antenna elements 2028. Furthermore, the number of radio assemblies of mesh WAP 2000 may vary without departing from the scope hereof.

Optional lighting control circuitry 2014 is configured to control flow of electrical power to lighting element 2006 in a manner analogous to that discussed above with respect to lighting control circuitry 1814 of FIG. 18. Additionally, optional energy storage subsystem 2016 is configured to (a) store energy received via a primary electrical power source of WAP 2000, such as building wiring (not shown), and (b) power at least one of first and second radio assemblies 2010 and 2012 when the primary electrical power source is unavailable, in a manner analogous to that discussed above with respect energy storage subsystem 1816 of FIG. 18.

Figure 22:
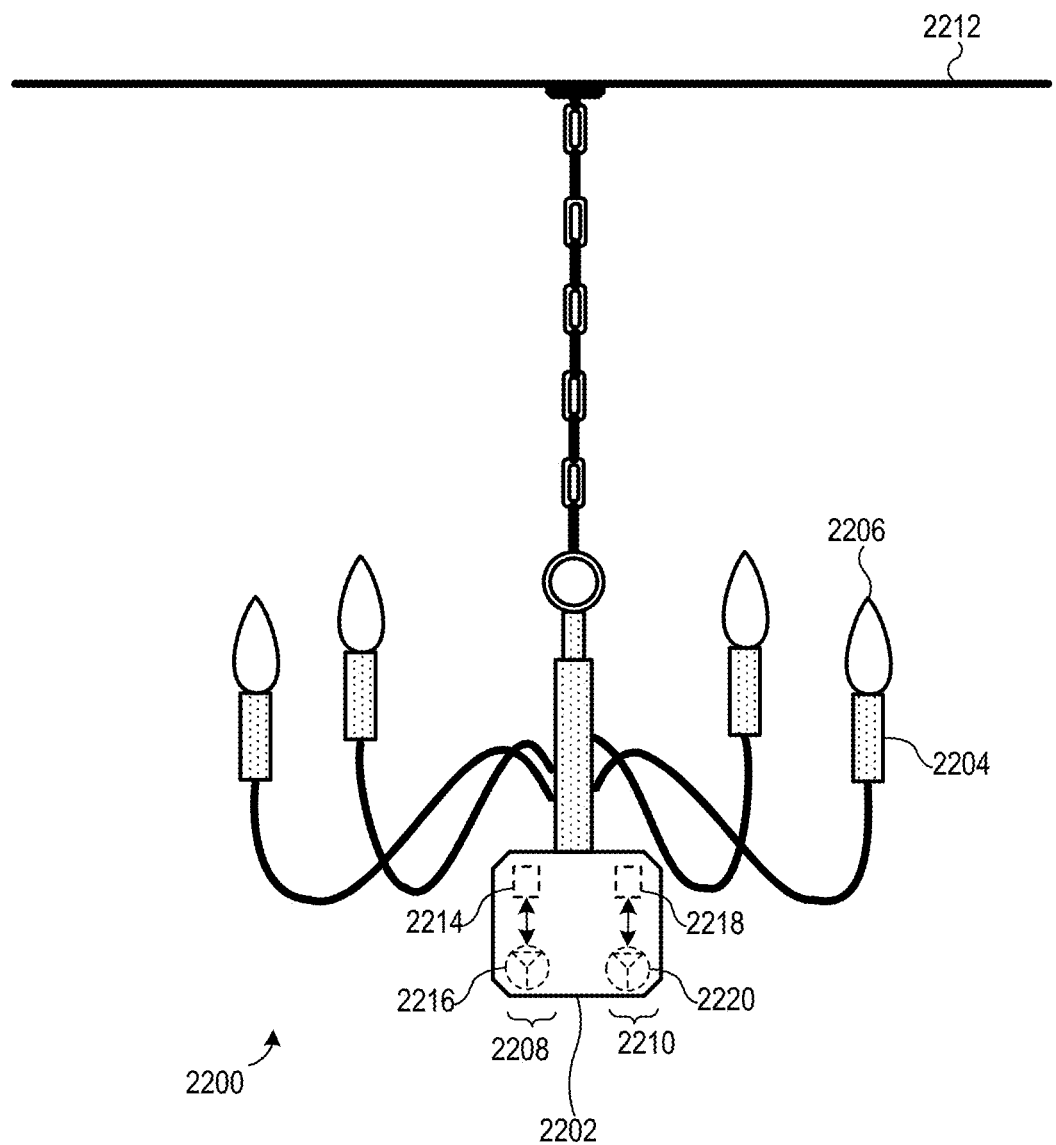
FIG. 22 is an illustration of a WAP configured as a chandelier, according to an embodiment.

FIG. 22 is an illustration of a mesh WAP 2200, which is an embodiment of mesh WAP 1608 that is configured as a light fixture in the form of a chandelier. Mesh WAP 2200 includes a housing 2202, a plurality of electrical interfaces 2204, a respective lighting element 2206 for each electrical interface 2204, a first radio assembly 2208, and a second radio assembly 2210. Only one instance of electrical interface 2204 and only one instance of lighting element 2206 are labeled for illustrative clarity. Mesh WAP 2200 optionally further includes an embodiment of lighting control circuitry 1814 and/or an embodiment of energy storage subsystem 1816. Elements of first and second radio assemblies 2208 and 2210 are symbolically shown in dashed lines. Accordingly, the illustration of these elements should not be construed to require any particular physical configuration of these elements.

Housing 2202, which is an embodiment of housing 1612, is configured to be attached directly or indirectly to, or integrated with, a structure 2212, such as a wall or ceiling. Lighting elements 2206 are configured to illuminate a space adjacent to mesh WAP 2200, and each electrical interface 2204 is configured to provide electrical power to its respective lighting element 2206. In some embodiments, each electrical interface 2204 is a device, such as a lightbulb socket, which allows its lighting element 2206 to be removed from mesh WAP 2200, such as to replace the lighting element. In some other embodiments, each electrical interface 2204 forms a permanent, or semi-permanent, connection between its respective lighting element 2204 and one or more other elements of mesh WAP 2200.

First and second radio assemblies 2208 and 2210 are embodiments of first and second radio assemblies 1614 and 1616 of FIG. 16, respectively. An embodiment of internal communication link 1618, which is not shown for illustrative clarity, communicatively couples first and second radio assemblies 2208 and 2210. First radio assembly 2208 includes a radio transceiver 2214 communicatively coupled to one or more first antenna elements 2216. Second radio assembly 2210 includes a radio transceiver 2218 communicatively coupled to one or more second antenna elements 2220. The number of antenna elements 2216 and 2220, as well as their respective locations within mesh WAP 2200, could vary without departing from the scope hereof. Additionally, the number of first antenna elements 2216 need not be equal to the number of second antenna elements 2220. Furthermore, the number of radio assemblies of mesh WAP 2200 may vary without departing from the scope hereof.

Figure 23:
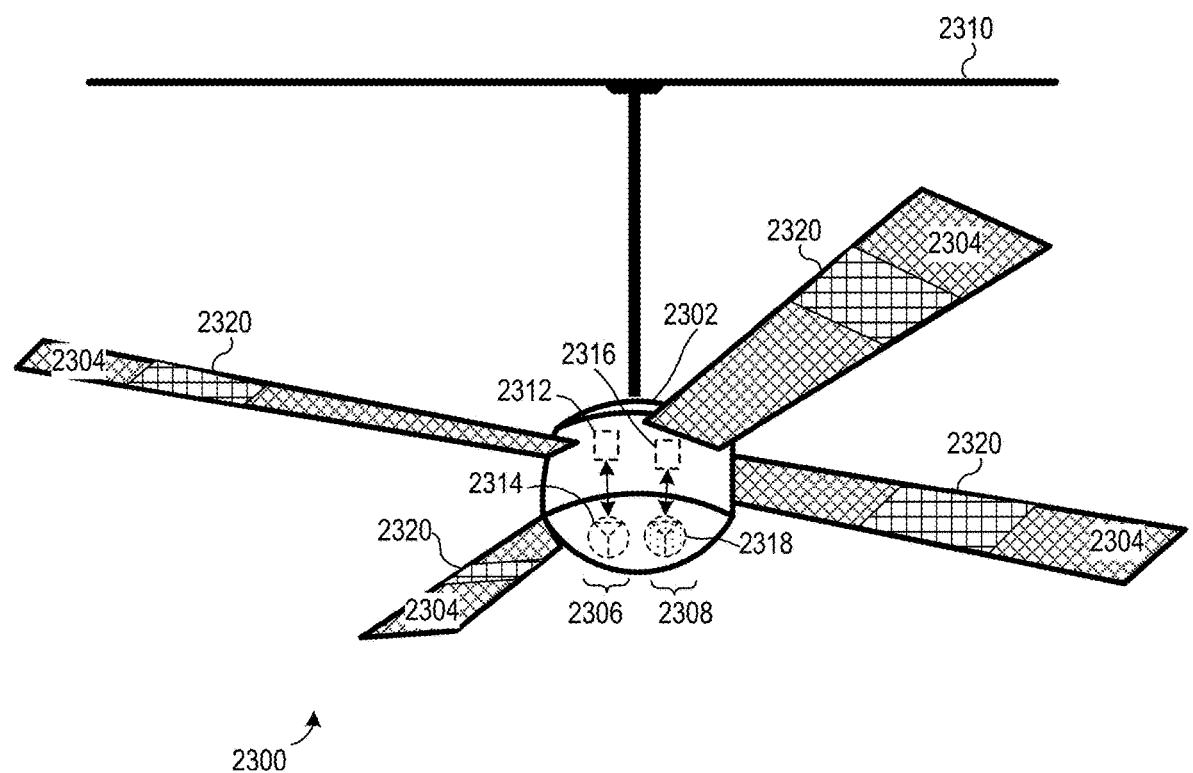
FIG. 23 is an illustration of a WAP configured as a ceiling fan.

FIG. 23 is an illustration of a mesh WAP 2300, which is an embodiment of mesh WAP 1608 that is configured as a ceiling fan. Mesh WAP 2300 includes a housing 2302, one or more fan blades 2304, a first radio assembly 2306, and a second radio assembly 2308. Elements of first and second radio assemblies 2306 and 2308 are symbolically shown in dashed line. Accordingly, the illustration of these elements should not be construed to require any particular physical configuration of these elements. Mesh WAP 2300 may include additional elements, such as a lighting element, without departing from the scope hereof.

Housing 2302, which is an embodiment of housing 1612, is configured to be directly or indirectly affixed to, or integrated with, a structure 2310. First and second radio assemblies 2306 and 2308 are embodiments of first and second radio assemblies 1614 and 1616 of FIG. 16, respectively. An embodiment of internal communication link 1618, which is not shown for illustrative clarity, communicatively couples first and second radio assemblies 2306 and 2308. First radio assembly 2306 includes a radio transceiver 2312 communicatively coupled to one or more first antenna elements 2314. Second radio assembly 2308 includes a radio transceiver 2316 communicatively coupled to one or more second antenna elements 2318. The number of antenna elements 2314 and 2318, as well as their respective locations within mesh WAP 2300, may vary without departing from the scope hereof. Additionally, the number of first antenna elements 2314 need not be equal to the number of second antenna elements 2318. Furthermore, the number of radio assemblies of mesh WAP 2300 may vary without departing from the scope hereof.

WAP 2300 optionally further includes radio frequency (RF) reflective elements 2320 on fan blades 2304. RF reflective elements 2320 are formed, for example, of metal or another material that reflects RF signals. RF reflective elements 2320 are intended to reflect wireless communication signals between user equipment (not shown) and first and second antenna elements 2314 and 2318, to promote good wireless communication network performance. The number of RF reflective elements 2320, as well as their locations on fan blades 2304, may vary without departing from the scope hereof. Furthermore, RF reflective elements could be included in housing 2302 in place of, or in addition to, RF reflective elements 2320 on fan blades 2304.

Figure 24:
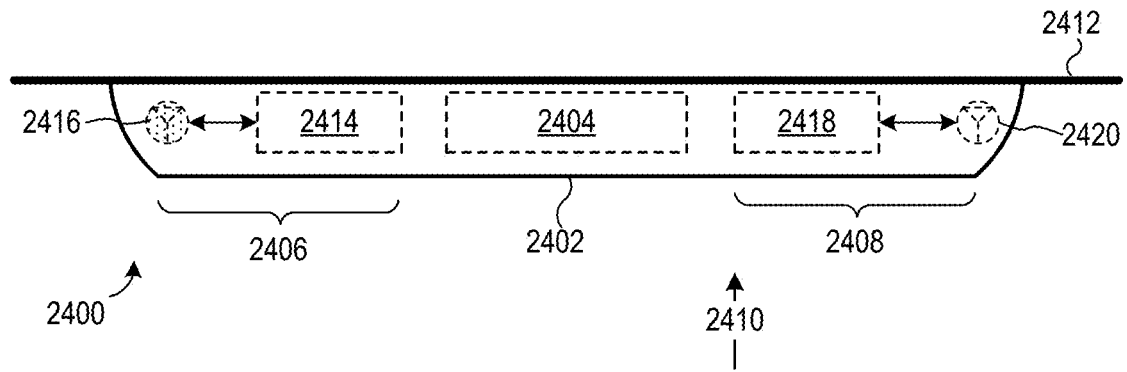
FIG. 24 is a cross-sectional view of a mesh WAP configured as a sensing device, according to an embodiment.
Figure 25:
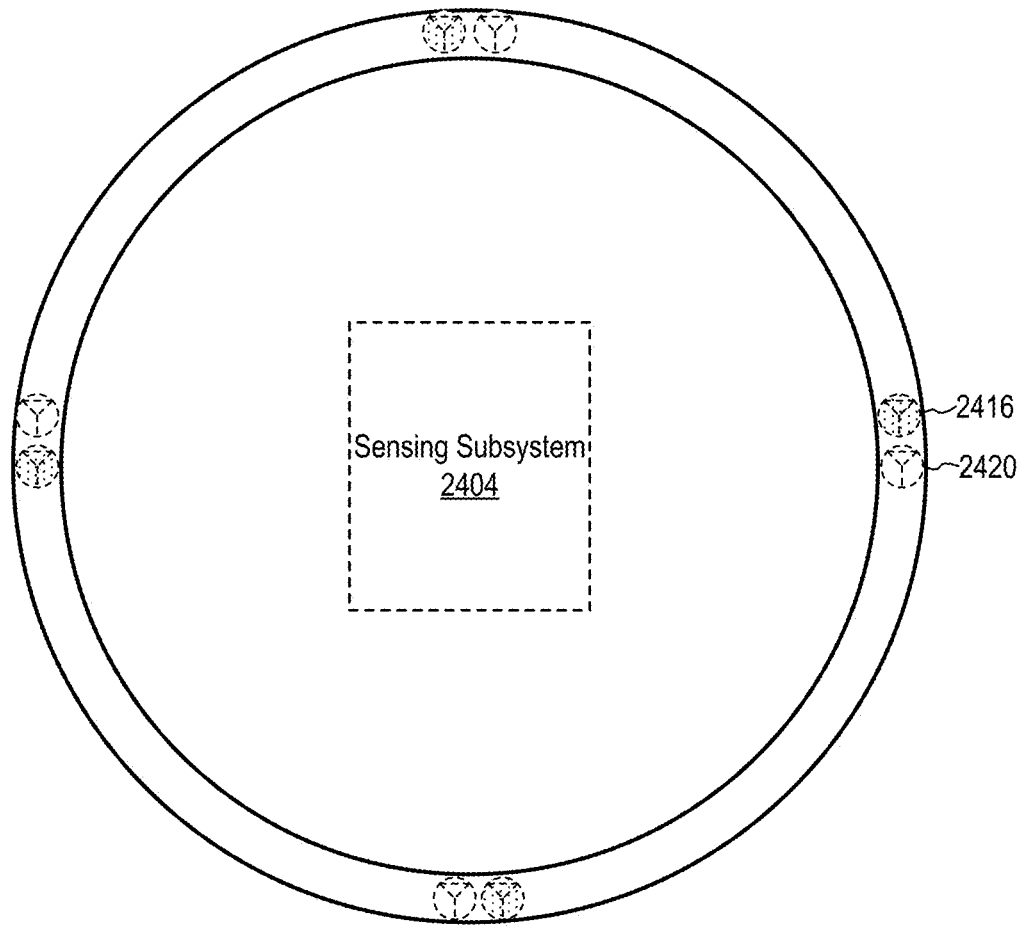
FIG. 25 is a plan view of the FIG. 24 mesh WAP.

FIG. 24 is a cross sectional view of mesh WAP 2400, which is an embodiment of mesh WAP 1608 that is configured as a sensing device, such as a smoke detector, a carbon monoxide detector, a carbon dioxide detector, a temperature detector, a humidity detector, a motion detector, a light detector, a sound detector, a camera, etc. Mesh WAP 2400 includes a housing 2402, a sensing subsystem 2404, a first radio assembly 2406, and a second radio assembly 2408. Elements of first and second radio assemblies 2406 and 2408 are symbolically shown in dashed lines. Accordingly, the illustration of these elements should not be construed to require any particular physical configuration of these elements. FIG. 25 is a plan view of WAP 2400 as seen when the WAP is viewed in a direction 2410 as shown in FIG. 24.

Housing 2402, which is an embodiment of housing 1612, is configured to be directly or indirectly affixed to, or integrated with, a structure 2412, such as a ceiling or wall. Although housing 2402 has a round shape, as seen when viewed in direction 2410, the shape of housing 2402 may vary. Sensing subsystem 2404 is configured to (a) detect presence of one or more elements in the vicinity of mesh WAP 2400 and/or (b) obtain data regarding the environment in the vicinity of mesh WAP 2400. For example, sensing subsystem 2404 may include one or more of a smoke detection element, a carbon monoxide detection element, a carbon dioxide detection element, a temperature sensor, a humidity sensor, a motion detection element, a photocell, a microphone, and an imaging device.

First and second radio assemblies 2406 and 2408 are embodiments of first and second radio assemblies 1614 and 1616 of FIG. 16, respectively. An embodiment of internal communication link 1618, which is not shown for illustrative clarity, communicatively couples first and second radio assemblies 2406 and 2408. First radio assembly 2406 includes a radio transceiver 2414 communicatively coupled to one or more first antenna elements 2416. Second radio assembly 2408 includes a radio transceiver 2418 communicatively coupled to one or more second antenna elements 2420. FIG. 25 illustrates mesh WAP 2400 as including four first antenna elements 2416 and four second antenna elements 2420. However, the number of antenna elements 2416 and 2420, as well as their respective locations within mesh WAP 2400, could vary without departing from the scope hereof. Additionally, the number of first antenna elements 2416 need not be equal to the number of second antenna elements 2420. Furthermore, the number of radio assemblies of mesh WAP 2400 may vary without departing from the scope hereof.

Figure 26:
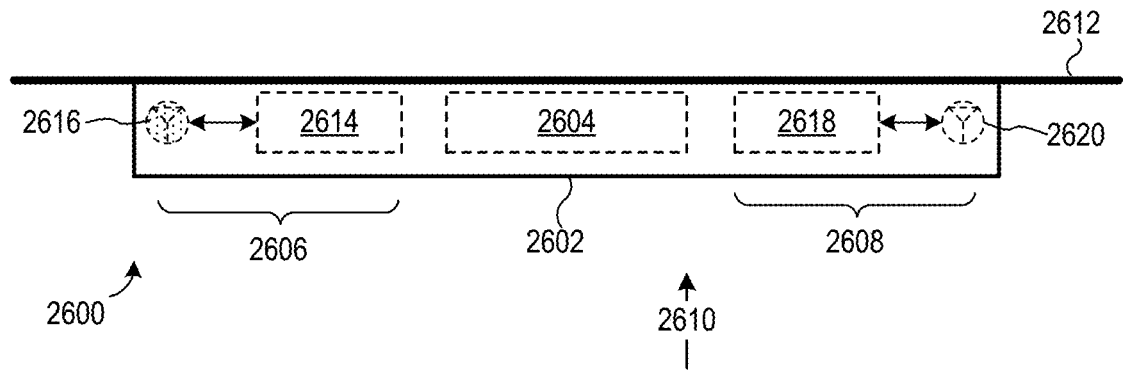
FIG. 26 is a cross-sectional view of a mesh WAP configured as an output device, according to an embodiment.
Figure 27:
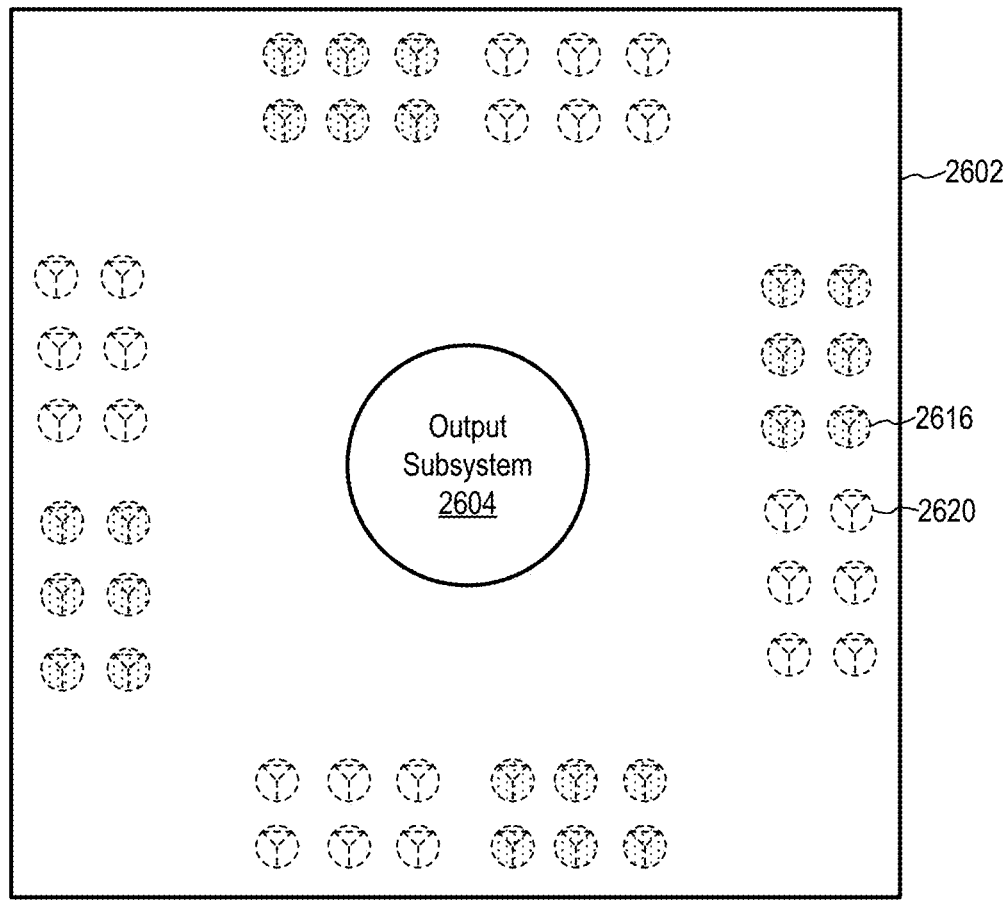
FIG. 27 is a plan view of the FIG. 26 mesh WAP.

FIG. 26 is a cross sectional view of mesh WAP 2600, which is an embodiment of mesh WAP 1608 that is configured as an output device, such as a fire alarm, a security alarm, a strobe light, a public address speaker, etc. Mesh WAP 2600 includes a housing 2602, an output subsystem 2604, a first radio assembly 2606, and a second radio assembly 2608. Elements of first and second radio assemblies 2606 and 2608 are symbolically shown in dashed lines. Accordingly, the illustration of these elements should not be construed to require any particular physical configuration of these elements. FIG. 27 is a plan view of WAP 2600 as seen when the WAP is viewed in a direction 2610 as shown in FIG. 26.

Housing 2602, which is an embodiment of housing 1612, is configured to be directly or indirectly affixed to, or integrated with, a structure 2612, such as a ceiling or wall. Although housing 2602 has a rectangular shape, as seen when viewed in direction 2610, the shape of housing 2602 may vary. Output subsystem 2604 is configured to emit sound and/or light. For example, output subsystem 2604 may include one or more of a speaker, a buzzer, a bell, a horn, a siren, and a light.

First and second radio assemblies 2606 and 2608 are embodiments of first and second radio assemblies 1614 and 1616 of FIG. 16, respectively. An embodiment of internal communication link 1618, which is not shown for illustrative clarity, communicatively couples first and second radio assemblies 2606 and 2608. First radio assembly 2606 includes a radio transceiver 2614 communicatively coupled to one or more first antenna elements 2616. Second radio assembly 2608 includes a radio transceiver 2618 communicatively coupled to one or more second antenna elements 2620. FIG. 27 illustrates mesh WAP 2600 as including four first antenna elements 2616 and four second antenna elements 2620. However, the number of antenna elements 2616 and 2620, as well as their respective locations within mesh WAP 2600, could vary without departing from the scope hereof. Additionally, the number of first antenna elements 2616 need not be equal to the number of second antenna elements 2620. Furthermore, the number of radio assemblies of mesh WAP 2600 may vary without departing from the scope hereof.

Figure 28:
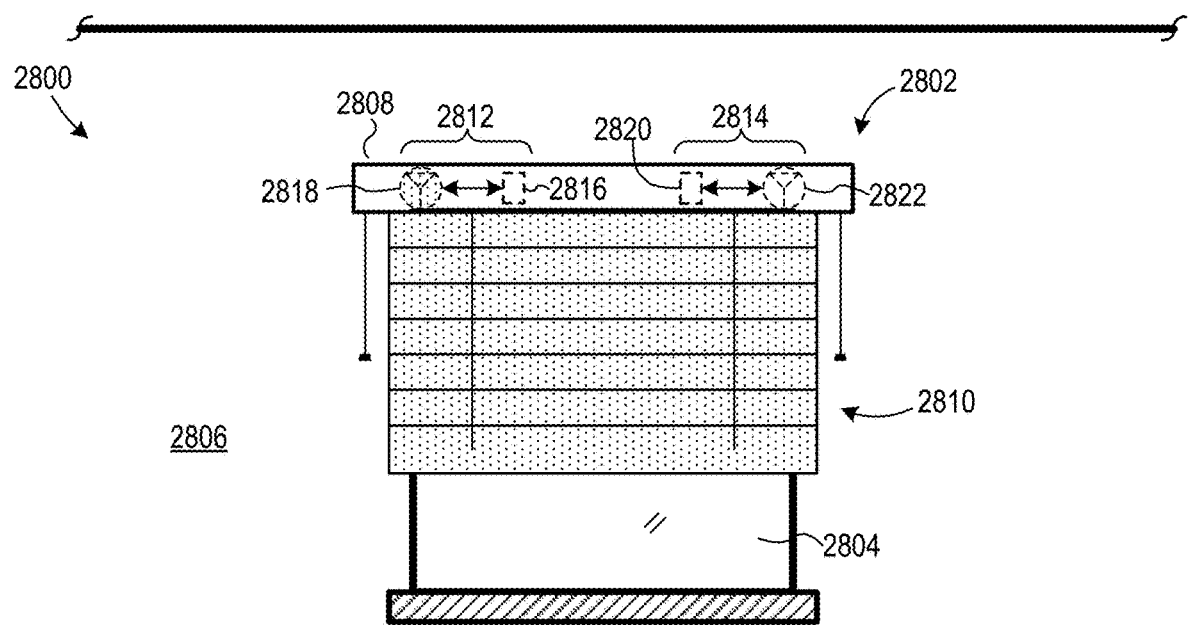
FIG. 28 is an illustration of room including a mesh WAP that is configured as a window covering, according to an embodiment.

FIG. 28 is an illustration of room 2800 including a mesh WAP 2802, which is an embodiment of mesh WAP 1608 that is configured as a window covering. Mesh WAP 2802 is configured to selectively cover a window 2804 in a wall 2806 of room 2800. Mesh WAP 2802 includes a housing 2808, slats 2810, a first radio assembly 2812, and a second radio assembly 2814. Elements of first and second radio assemblies 2812 and 2814 are symbolically shown in dashed lines. Accordingly, the illustration of these elements should not be construed to require any particular physical configuration of these elements. Housing 2808, which is an embodiment of housing 1612, is configured to be directly or indirectly affixed to, or integrated with, wall 2806 or a frame of window 2804. Slats 2810 are configured to cover window 2804.

First and second radio assemblies 2812 and 2814 are embodiments of first and second radio assemblies 1614 and 1616 of FIG. 16, respectively. An embodiment of internal communication link 1618, which is not shown for illustrative clarity, communicatively couples first and second radio assemblies 2812 and 2814. First radio assembly 2812 includes a radio transceiver 2816 communicatively coupled to one or more first antenna elements 2818. Second radio assembly 2814 includes a radio transceiver 2820 communicatively coupled to one or more second antenna elements 2822. The number of antenna elements 2818 and 2822, as well as their respective locations within mesh WAP 2802, could vary without departing from the scope hereof. Additionally, the number of first antenna elements 2818 need not be equal to the number of second antenna elements 2822. Furthermore, the number of radio assemblies of mesh WAP 2802 may vary without departing from the scope hereof.

Figure 29:
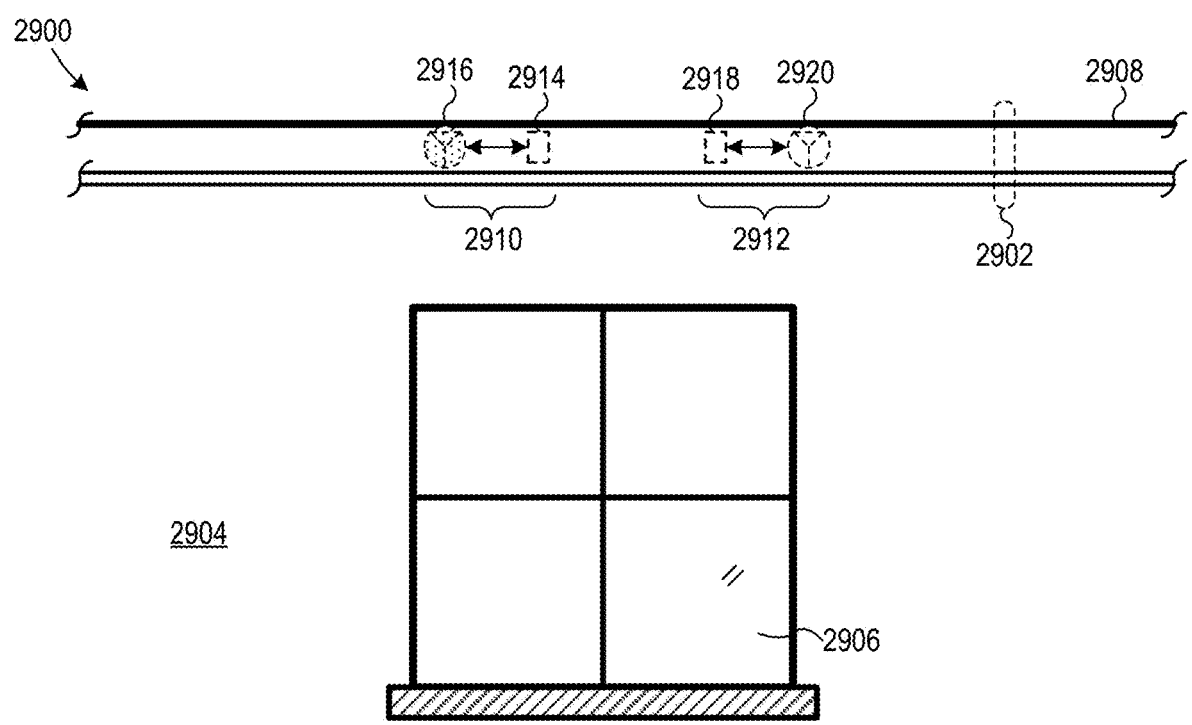
FIG. 29 is an illustration of room including a mesh WAP that is configured as an ornamental building feature, according to an embodiment.

FIG. 29 is an illustration of room 2900 including a mesh WAP 2902, which is an embodiment of mesh WAP 1608 that is configured as an ornamental building feature in the form of crown molding. Mesh WAP 2902 is installed at the top of a wall 2904 including a window 2906. Mesh WAP 2902 includes a housing 2908, a first radio assembly 2910, and a second radio assembly 2912. Elements of first and second radio assemblies 2910 and 2912 are symbolically shown in dashed lines. Accordingly, the illustration of these elements should not be construed to require any particular physical configuration of these elements. Housing 2908, which is an embodiment of housing 1612, is configured as crown molding that is affixed to wall 2904.

First and second radio assemblies 2910 and 2912 are embodiments of first and second radio assemblies 1614 and 1616 of FIG. 16, respectively. An embodiment of internal communication link 1618, which is not shown for illustrative clarity, communicatively couples first and second radio assemblies 2910 and 2912. First radio assembly 2910 includes a radio transceiver 2914 communicatively coupled to one or more first antenna elements 2916. Second radio assembly 2912 includes a radio transceiver 2918 communicatively coupled to one or more second antenna elements 2920. The number of antenna elements 2916 and 2918, as well as their respective locations within mesh WAP 2902, could vary without departing from the scope hereof. Additionally, the number of first antenna elements 2916 need not be equal to the number of second antenna elements 2920. Furthermore, the number of radio assemblies of mesh WAP 2902 may vary without departing from the scope hereof.

Figure 30:
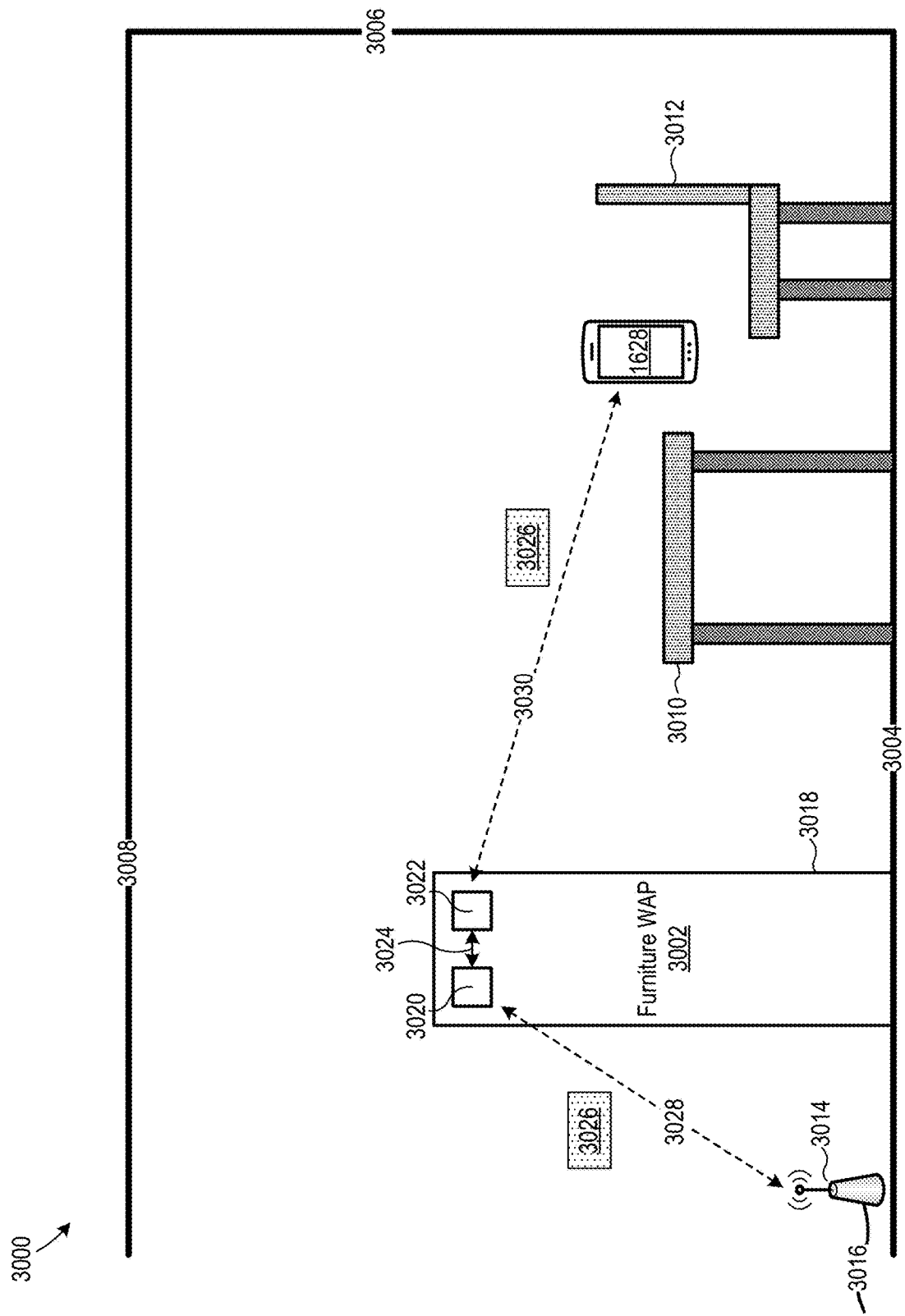
FIG. 30 is an illustration of a room including a mesh WAP that is configured as furniture, according to an embodiment.

FIG. 30 is an illustration of a room 3000 including a mesh WAP 3002 that is configured as furniture. FIG. 30 illustrates room 3000 as further including a floor 3004, a wall 3006, a ceiling 3008, a table 3010, a chair 3012, and another WAP 3014. FIG. 30 illustrates other WAP 3014 as including a wireline backhaul 3016, although WAP 3014 could include a wireless backhaul in place of, or in addition to, wireline backhaul 3016. Mesh WAP 3002 includes a furniture structure 3018, a first radio assembly 3020, a second radio assembly 3022, and an internal communication link 3024. First radio assembly 3020, second radio assembly 3022, and internal communication link 3024 are incorporated with furniture structure 3018. Furniture structure 3018 may be, for example, part of a shelf, a table, a chair, a bed, a sofa, a lamp, a decorating item, a dresser, etc.

First radio assembly 3020, second radio assembly 3022, and internal communication link 3024 are embodiments of first radio assembly 1614, second radio assembly 1616, and internal communication link 1618, respectively. Accordingly, mesh WAP 3002 operates in a similar manner to mesh WAP 1608 of FIG. 16. FIG. 30 illustrates one example of operation of mesh WAP 3002 where the WAP relays encrypted data packets 3026 between other WAP 3014 and UE 1628 via wireless communication links 3028 and 3030. Accordingly, mesh WAP 3002 enables UE 1628 to be indirectly served by WAP 3014, i.e., by relaying data packets between WAP 3014 and UE 1628, even though UE 1628 is not in LoS with WAP 3014.

Figure 31:
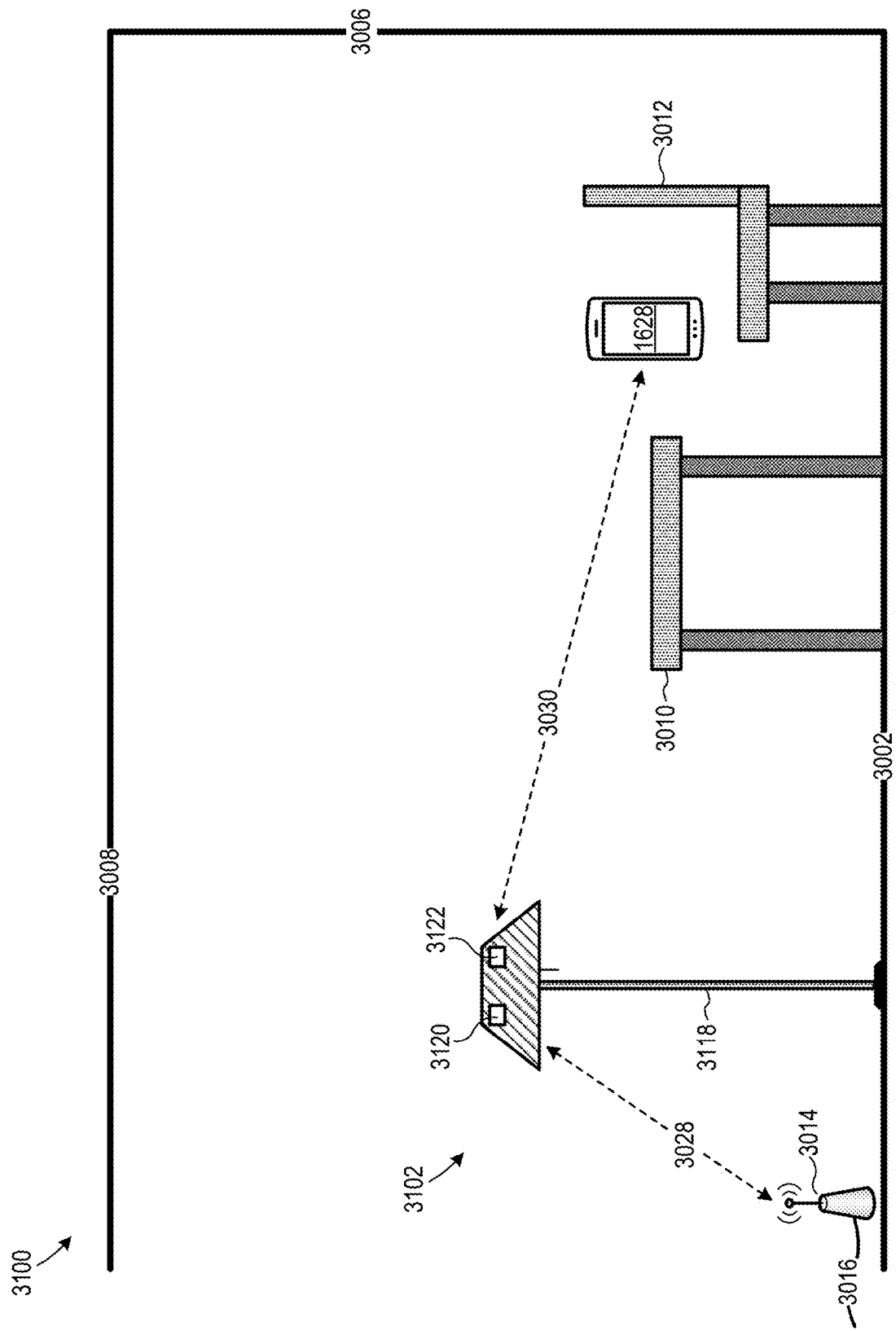
FIG. 31 is an illustration of a room including a mesh WAP that is configured as a floor lamp, according to an embodiment.
Figure 32:
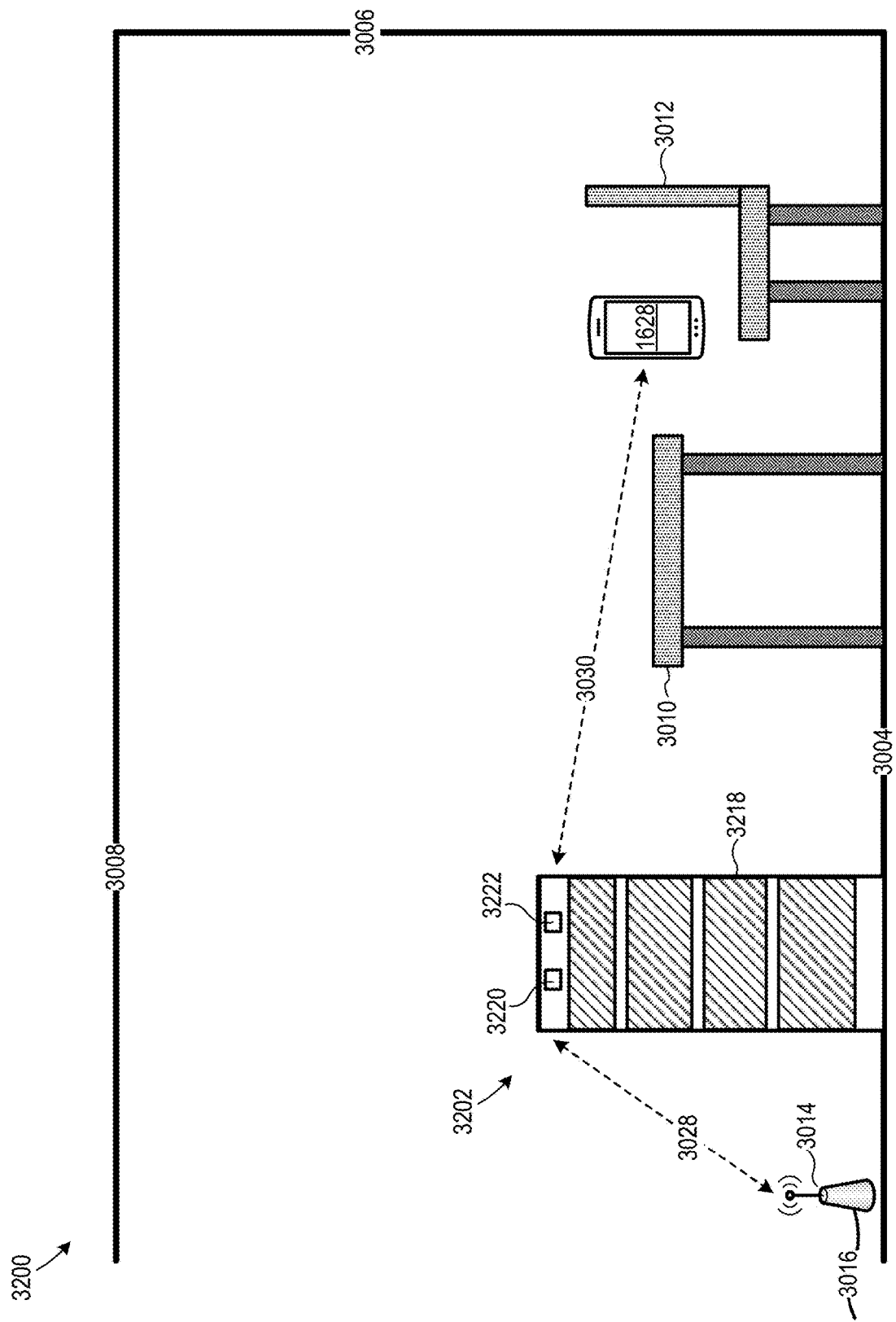
FIG. 32 is an illustration of a room including a mesh WAP that is configured as a shelf, according to an embodiment.

FIGS. 31 and 32 illustrate two example embodiments of mesh WAP 3002. However, mesh WAP 3002 is not limited to these example embodiments. FIG. 31 is an illustration of a room 3100 including a mesh WAP 3102, which is an embodiment of mesh WAP 3002 that is configured as a floor lamp. Mesh WAP 3102 includes a lamp body 3118, a first radio assembly 3120, and a second radio assembly 3122. Lamp body 3118 is an embodiment of furniture structure 3018, and first and second radio assemblies 3120 and 3122 are embodiments of first and second radio assemblies 3020 and 3022, respectively. Mesh WAP 3102 further includes an embodiment of internal communication link 3024, which is not shown for illustrative clarity.

FIG. 32 is an illustration of a room 3200 including a mesh WAP 3202, which is an embodiment of mesh WAP 3002 that is configured as a shelf. Mesh WAP 3202 includes a shelf structure 3218, a first radio assembly 3220, and a second radio assembly 3222. Shelf structure 3218 is an embodiment of furniture structure 3018, and first and second radio assemblies 3220 and 3222 are embodiments of first and second radio assemblies 3020 and 3022, respectively. Mesh WAP 3202 further includes an embodiment of internal communication link 3024, which is not shown for illustrative clarity.

Figure 33:
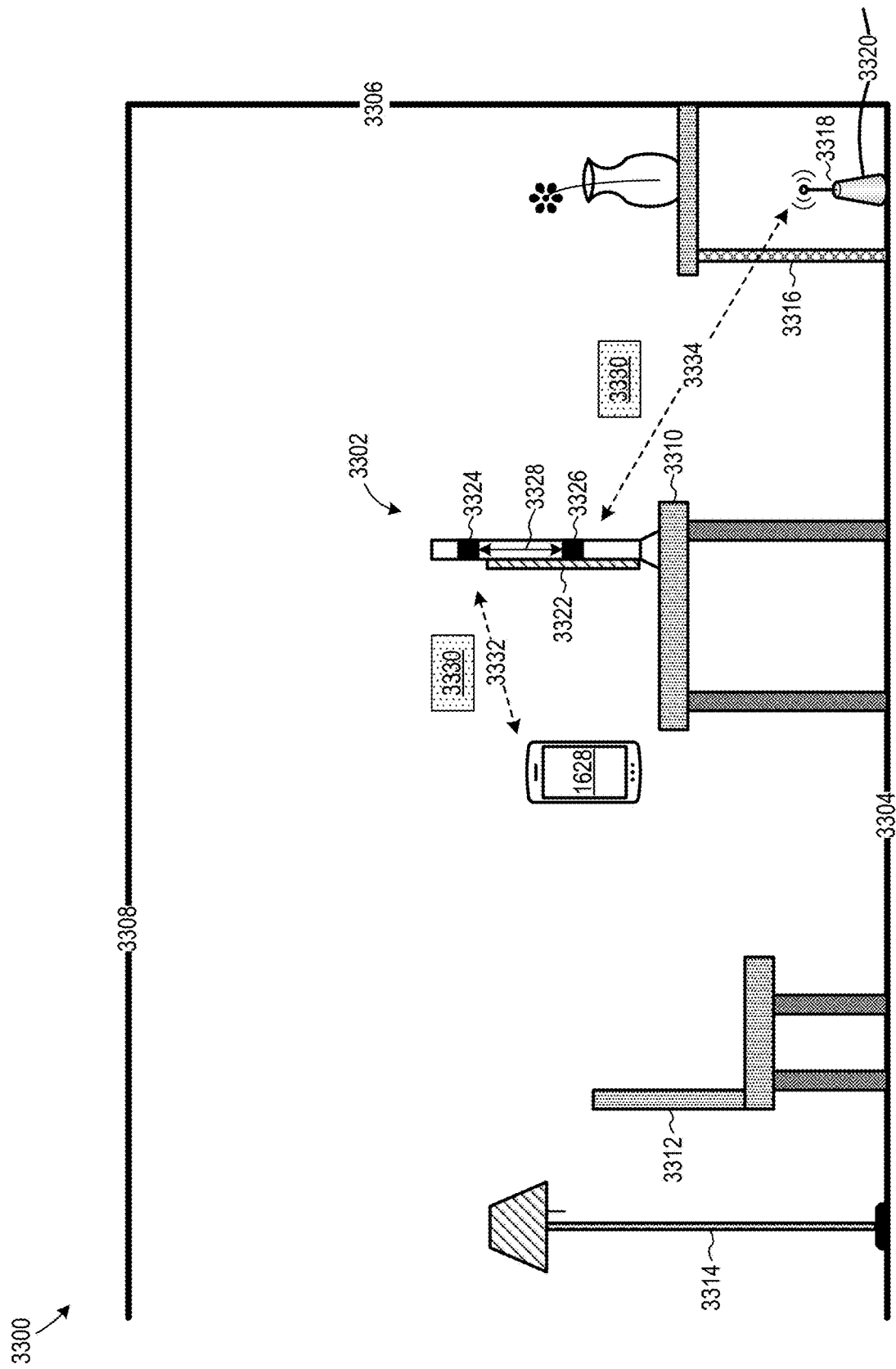
FIG. 33 is an illustration of a room including a mesh WAP that is configured as a television, according to an embodiment.

FIG. 33 is an illustration of a room 3300 including a mesh WAP 3302 that is configured as a television. FIG. 33 illustrates room 3300 as further including a floor 3304, a wall 3306, a ceiling 3308, a table 3310, a chair 3312, a lamp 3314, a cabinet 3316, and another WAP 3318. FIG. 33 illustrates other WAP 3318 as including a wireline backhaul 3320, although WAP 3318 could include a wireless backhaul in place of, or in addition to, wireline backhaul 3320. Mesh WAP 3302 includes an image display 3322, a first radio assembly 3324, a second radio assembly 3326, and an internal communication link 3328. First radio assembly 3324, second radio assembly 3326, and internal communication link 3328 are embodiments of first radio assembly 1614, second radio assembly 1616, and internal communication link 1618, respectively. Accordingly, mesh WAP 3302 operates in a similar manner to mesh WAP 1608 of FIG. 16. FIG. 33 illustrates one example of operation of mesh WAP 3302 where the WAP relays encrypted data packets 3330 between other WAP 3318 and UE 1628 via wireless communication links 3332 and 3334. Accordingly, mesh WAP 3302 enables UE 1628 to be indirectly served by WAP 3318, i.e., by relaying data packets between WAP 3318 and UE 1628, even though UE 1628 is not in LoS with WAP 3318.

Figure 34:
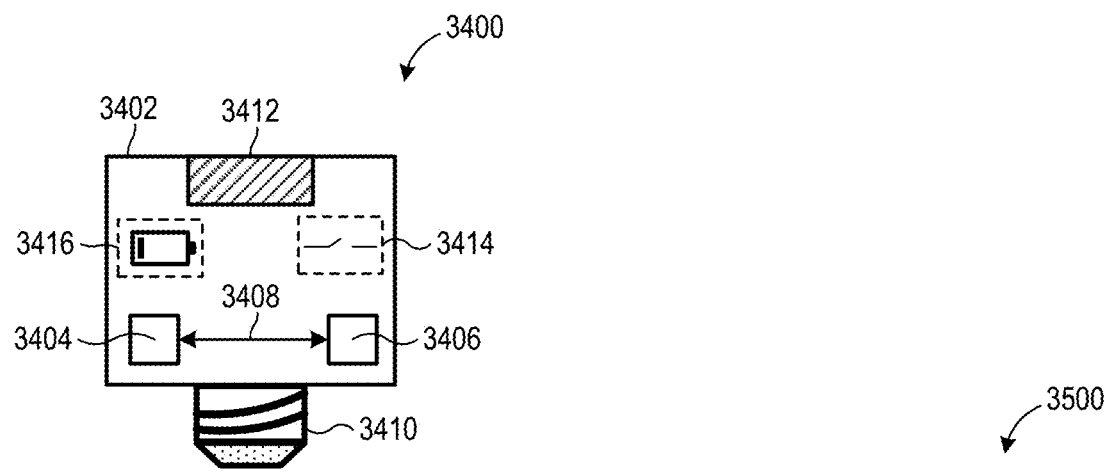
FIG. 34 is a cross-sectional view of a mesh WAP that is configured to be electrically coupled with a lightbulb socket, according to an embodiment.

FIG. 34 is a cross-sectional view of a mesh WAP 3400 which is configured to be electrically coupled with a lightbulb socket. Mesh WAP 3400 includes a housing 3402, a first radio assembly 3404, a second radio assembly 3406, an internal communication link 3408, a first electrical interface 3410, a second electrical interface 3412, optional light control circuitry 3414, and an optional energy storage subsystem 3416. First radio assembly 3404, second radio assembly 3406, internal communication link 3408, first electrical interface 3410, second electrical interface 3412, optional light control circuitry 3414, and optional energy storage subsystem 3416 are incorporated with housing 3402. First radio assembly 3404, second radio assembly 3406, and internal communication link 3408 are embodiments of first radio assembly 1614, second radio assembly 1616, and internal communication link 1618, respectively. Accordingly, mesh WAP 3400 operates in a similar manner to mesh WAP 1608 of FIG. 16.

First electrical interface 3410 is configured to be electrically coupled with a lightbulb socket, such that first and second radio assemblies 3404 and 3406 may be at least partially powered from electrical power available via the lightbulb socket. Although first electrical interface 3410 is illustrated as included threads so that the interface can be screwed into a lightbulb socket, first electrical interface 3410 could take other forms. For example, first electrical interface 3410 could include two pins in place of the threads to enable the interface to be inserted into a lightbulb socket including a GU10 or GX10 base. Second electrical interface 3412 is configured to provide electrical power to a lighting element (not shown), such as a light bulb. Accordingly, in some embodiments, second electrical interface 3412 is a lightbulb socket.

Optional lighting control circuitry 3414 is configured to control flow of electrical power to a lighting element in a manner analogous to that discussed above with respect to lighting control circuitry 1814 of FIG. 18. Additionally, optional energy storage subsystem 3416 is configured to (a) store energy received via a primary electrical power source of WAP 3400, such as from a light bulb socket, and (b) power at least one of first and second radio assemblies 3404 and 3406 when the primary electrical power source is unavailable, in a manner analogous to that discussed above with respect energy storage subsystem 1816 of FIG. 18.

Figure 35:
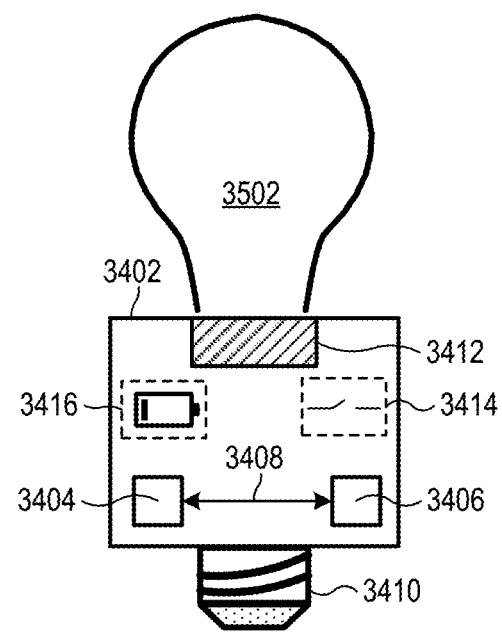
FIG. 35 is a cross-sectional view of an alternate embodiment of the FIG. 34 mesh WAP.

Mesh WAP 3400 could be modified to further include a lighting element. For example, FIG. 35 is a cross-sectional view of a mesh WAP 3500 which is in alternate embodiment of mesh WAP 3400 further including a lighting element 3502 configured to illuminate a space adjacent to WAP 3500. Lighting element 3502 is electrically coupled with the remainder of mesh WAP 3500 via second electrical interface 3412. In some embodiments, second electrical interface 3412 is a device, such as a lightbulb socket, which allows lighting element 3502 to be removed from mesh WAP 3500, such as to replace lighting element 3502. In some other embodiments, second electrical interface 3412 forms a permanent, or semi-permanent, connection between second lighting element 3502 and one or more other elements of mesh WAP 3500. For example, second electrical interface 3412 could include a PCB soldered to lighting element 3502.

Figure 36:
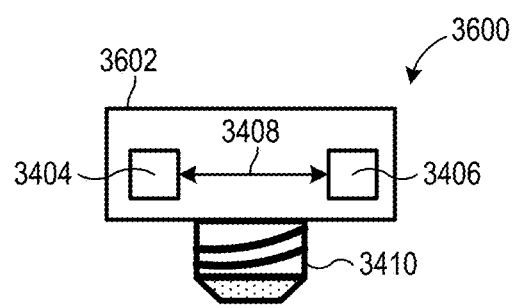
FIG. 36 is a cross-sectional view of another alternate embodiment of the FIG. 34 mesh WAP.

Mesh WAP 3400 could also be configured to omit second electrical interface 3412 and associated subsystems in applications where lighting is not required. For example, FIG. 36 is a cross-sectional view of a mesh WAP 3600 which is in alternate embodiment of mesh WAP 3400 where second electrical interface 3412, lighting control circuitry 3414, and energy storage subsystem 3416 are omitted. Mesh WAP 3600 also includes a housing 3602 in place of housing 3402, where housing 3602 may be smaller than housing 3402. Mesh WAP 3600 may advantageously be lower cost than mesh WAP 3400.

Figure 37:
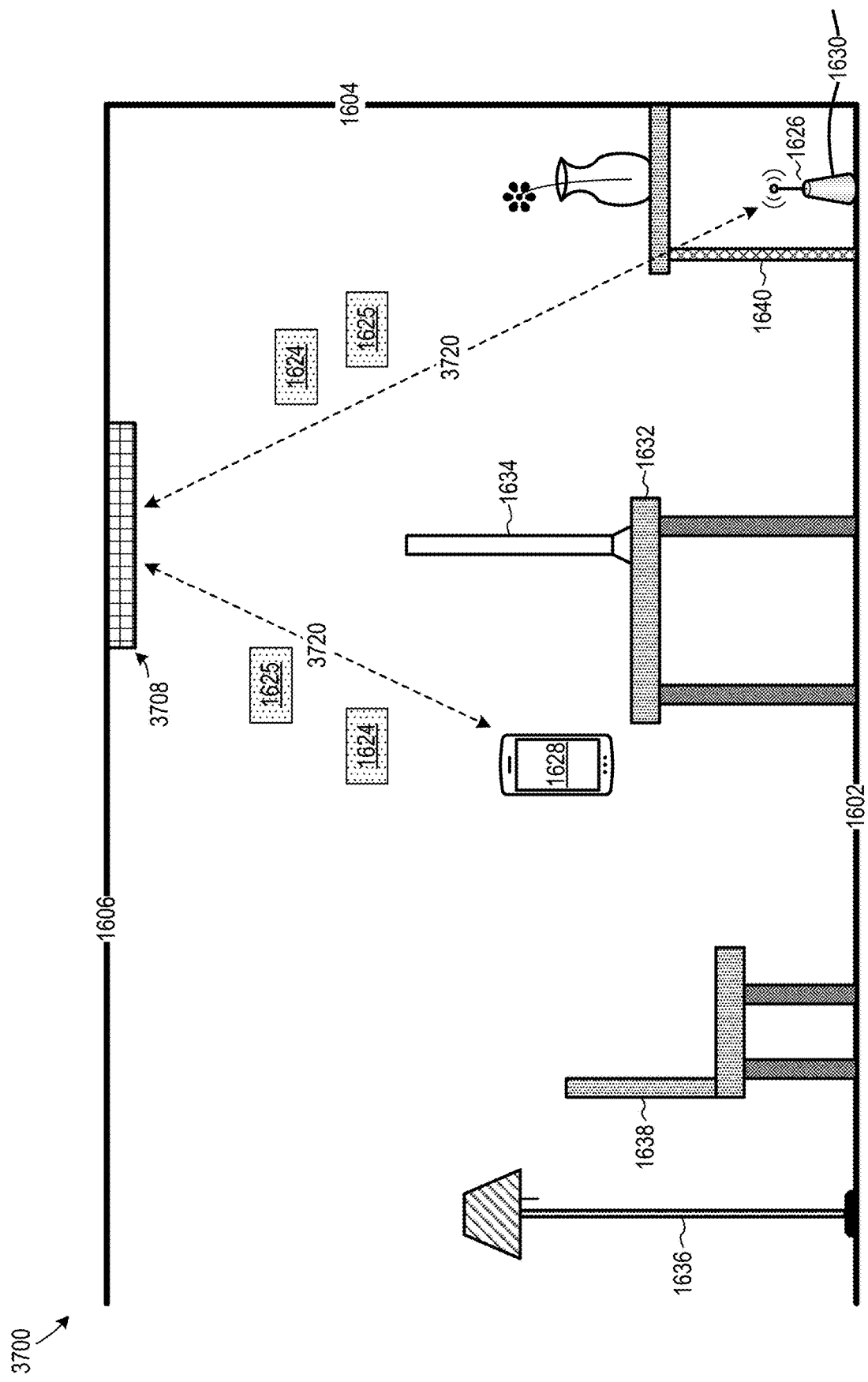
FIG. 37 is an illustration of a room including a radio frequency reflective element, according to an embodiment.

RF reflective elements can also be affixed to a building ceiling or wall to reflect wireless communication signals and thereby promote good wireless communication network performance. For example, FIG. 37 is an illustration of room 3700, which is an alternate embodiment of room 1600 (FIG. 16) where mesh WAP 1608 is replaced with a RF reflective element 3708. RF reflective element 3708 reflects wireless communication signals 3720 between WAP 1626 and UE 1628, thereby enabling UE 1628 to be served by WAP 1626 even though WAP 1626 is not in LoS with UE 1628. RF reflective element 3708 is formed of metal or another material that is reflective to RF signals. The shape, size, and location of RF reflective element 3708 may vary without departing from the scope hereof, and room 3700 could include additional RF reflective elements 3708. Additionally, although RF reflective element 3708 is illustrated as being affixed to ceiling 1606, RF reflective element 3708 could instead be embedded in ceiling 1606. Furthermore, RF reflective element 3708 could be affixed to a structure other than ceiling 1606. Moreover, ceiling 1606 could be formed of a material that is reflective to RF signals, such that ceiling 1606 functions as a RF reflective element.

Combinations of Features

Features described above may be combined in various ways without departing from the scope hereof. The following examples illustrate some possible combinations:

(A1) A method for distributed wireless encryption may include (1) establishing, at a first WAP, a first encrypted wireless communication link between the first WAP and a first device, (2) receiving, at the first WAP, a first encrypted data packet from the first device via the first encrypted wireless communication link, and (3) forwarding the first encrypted data packet from the first WAP to a first node within a first LAN including the first WAP, without decrypting the first encrypted data packet.

(A2) In the method denoted as (A1), establishing the first encrypted wireless communication link may include establishing the first encrypted wireless communication link according to an encryption key, and the method may further include forwarding the encryption key from the first WAP to the first node.

(A3) Any one of the methods denoted as (A1) and (A2) may further include decrypting the first encrypted data packet at a second WAP that is different from the first WAP.

(A4) Any one of the methods denoted as (A1) and (A2) may further include decrypting the first encrypted data packet at a gateway device of the first LAN.

(A5) Any one of the methods denoted as (A1) through (A4) may further include forwarding the first encrypted data packet from the first node to a second node within the first LAN, without decrypting the encrypted data packet.

(A6) In the method denoted as (A5), forwarding the first encrypted data packet from the first node to the second node may include forwarding the first encrypted data packet via a wireless communication link between the first node and the second node.

(A7) In the method denoted as (A1), establishing the first encrypted wireless communication link may include establishing the first encrypted wireless communication link according to an encryption key, and the method may further include (1) forwarding the encryption key from the first WAP to a second WAP and (2) establishing a second encrypted wireless communication link between the first device and the second WAP, using the encryption key forwarded from the first WAP to the second WAP.

(A8) The method denoted as (A1) may further include (1) receiving, at the first WAP, a second encrypted data packet from the first device via the first encrypted wireless communication link, and (2) decrypting, at the first WAP, the second encrypted data packet.

(A9) The method denoted as (A1) may further include (1) determining, at the first WAP, that the first encrypted data packet is destined for a destination node within the first LAN, and (2) in response to determining that the first encrypted data packet is destined for the destination node within the first LAN, performing the step of forwarding the first encrypted data packet from the first WAP to the first node within the first LAN, without decrypting the first encrypted data packet.

(A10) The method denoted as (A1) may further include (1) receiving, at the first WAP, a second encrypted data packet, (2) determining, at the first WAP, that the second encrypted data packet is destined for a destination node outside of the first LAN, and (3) in response to determining that the second encrypted data packet is destined for a destination node outside of the first LAN, decrypting the second encrypted data packet at the first WAP.

(A11) The method denoted as (A1) may further include (1) receiving, at the first WAP, a second encrypted data packet, (2) determining, at the first WAP, that the second encrypted data packet is destined for a destination node that does not have decryption capability, and (3) in response to determining that the second encrypted data packet is destined for a destination node that does not have decryption capability, decrypting the second encrypted data packet at the first WAP.

(A12) The method denoted as (A1) may further include (1) receiving, at the first WAP, a second encrypted data packet, (2) determining that an operating status of the first WAP meets a predetermined criterium, and (3) in response to determining that the operating status of the first WAP meets the predetermined criterium, decrypting the second encrypted data packet at the first WAP.

(A13) The method denoted as (A1) may further include (1) determining, at the first WAP, that the first encrypted data packet is a low-latency data packet, and (2) in response to determining that the first encrypted data packet is the low-latency data packet, performing the step of forwarding the first encrypted data packet from the first WAP to the first node within the first LAN, without decrypting the first encrypted data packet.

(A14) The method denoted as (A1) may further include (1) establishing, at the first WAP, a first unencrypted wireless communication link between the first WAP and a second device, (2) receiving, at the first WAP, a first unencrypted data packet from the second device via the first unencrypted wireless communication link, and (3) forwarding the first unencrypted data packet from the first WAP to the first node without encrypting the first unencrypted data packet.

(A15) In any one of the methods denoted as (A1) through (A14), the first WAP may include a WAP operating according to an IEEE 802.11 standard.

(A16) In any one of the methods denoted as (A1) through (A15), establishing the first encrypted wireless communication link may include establishing the first encrypted wireless communication link according to one of a WPA2 protocol and a WPA3 protocol.

(B1) A thin WAP may include radio circuitry, control circuitry, and power supply circuitry configured to provide electrical power to each of the radio transceiver circuitry and the control circuitry. The control circuitry may be configured to control the radio circuitry to (1) receive a first encrypted data packet from a first node via a first wireless communication link between the thin WAP and the first node, (2) forward the first encrypted data packet from the thin WAP to a second node via a second wireless communication link between the thin WAP and the second node, without decrypting the first encrypted data packet, (3) receive a second encrypted data packet from the second node via the second wireless communication link, and (4) forward the second encrypted data packet from the thin WAP to the first node via the first wireless communication link, without decrypting the second encrypted data packet.

(B2) In the thin WAP denoted as (B1), the radio circuitry and the control circuitry may be configured to collectively maintain each of the first wireless communication link and the second wireless communication link at the thin WAP according to an IEEE 802.11 standard.

(B3) In any one of the thin WAPs denoted as (B1) and (B2), the control circuitry may be further configured to control the radio circuitry to operate the first and second wireless communication links on different respective wireless channels.

(B4) In any one of the thin WAPs denoted as (B1) and (B2), the control circuitry may be further configured to control the radio circuitry to operate the first and second wireless communication links at different respective radio frequencies.

(C1) A mesh WAP may include (1) a housing configured to be affixed to, or integrated with, a feature of a building, (2) a first radio assembly incorporated with the housing and configured to support a first wireless communication link, (3) a second radio assembly incorporated with the housing and configured to support a second wireless communication link, and (4) an internal communication link between the first and second radio assemblies configured to transfer data packets between the first and second radios.

(C2) The mesh WAP denoted as (C1) may further include a lighting element configured to illuminate a space adjacent to the mesh WAP.

(C3) The mesh WAP denoted as (C2) may further include an electrical interface configured to provide electrical power to the lighting element.

(C4) In the mesh WAP denoted as (C3), the electrical interface may include a light bulb socket.

(C5) Any one of the mesh WAPs denoted as (C2) through (C4) may further include lighting control circuitry configured to control flow of electrical power to the lighting element, such that the mesh WAP is capable of controlling operation of the lighting element.

(C6) In any one of the mesh WAPs denoted as (C1) through (C5), the housing may be part of a light fixture.

(C7) In the mesh WAP denoted as (C1), the housing may be part of a ceiling fan.

(C8) In the mesh WAP denoted as (C1), the housing may be part of a sensing device.

(C9) In the mesh WAP denoted as (C8), the sensing device may include one or more of a smoke detector, a carbon monoxide detector, a carbon dioxide detector, a temperature detector, a humidity detector, a motion detector, an light detector, a sound detector, and a camera.

(C10) In the mesh WAP denoted as (C1), the housing may be part of an output device.

(C11) In the mesh WAP denoted as (C10), the output device may include one or more of a fire alarm, a security alarm, a strobe light, and a public address speaker.

(C12) In the mesh WAP denoted as (C1), the housing may be part of a window covering device.

(C13) In the mesh WAP denoted as (C1), the housing may be part of an ornamental building feature.

(C14) In any one of the mesh WAPs denoted as (C1) through (C13), the first radio assembly, the internal communication link, and the second radio assembly may be collectively configured to receive a first encrypted data packet via the first wireless communication link and forward the first encrypted data packet via the second wireless communication link without decrypting the encrypted first data packet.

(C15) In any one of the mesh WAPs denoted as (C1) through (C14), (1) the first radio assembly may be configured to support the first wireless communication link in a first frequency range, (2) the second radio assembly may be configured to support the second wireless communication link in a second frequency range, and (3) the second frequency range may be different from the first frequency range.

(C16) In the mesh WAP denoted as (C15), the first frequency range may be a millimeter frequency range, and the second frequency range may be selected from the group consisting of a 2.4 Gigahertz (GHz) frequency range and a 5 GHz frequency range.

(D1) A mesh WAP may include (1) a first radio assembly configured to support a first wireless communication link, (2) a second radio assembly configured to support a second wireless communication link, (3) an internal communication link between the first and second radio assemblies configured to transfer data packets between the first and second radio assemblies, and (4) an electrical interface configured to be electrically coupled with a lightbulb socket, such that the first and second radio assemblies may be at least partially powered from electrical power available via the lightbulb socket.

(D2) The mesh WAP denoted as (D1) may further include an energy storage subsystem configured to (a) store energy received via the light bulb socket and (b) power the first and second radio assemblies from energy stored therein when electrical power is not available via the light bulb socket.

(D3) Any one of the mesh WAPs denoted as (D1) and (D2) may further include a second electrical interface configured to provide electrical power to a lighting element.

(D4) The mesh WAP denoted as (D3) may further include lighting control circuitry configured to control flow of electrical power to the lighting element, such that the mesh WAP is capable of controlling operation of the lighting element.

(D5) In any one of the mesh WAPs denoted as (D1) through (D4), the first radio assembly, the internal communication link, and the second radio assembly may be collectively configured to receive a first encrypted data packet via the first wireless communication link and forward the first encrypted data packet via the second wireless communication link without decrypting the encrypted first data packet.

(D6) In any one of the mesh WAPs denoted as (D1) through (D5), the first radio assembly may be configured to support the first wireless communication link in a first frequency range, the second radio assembly may be configured to support the second wireless communication link in a second frequency range, and the second frequency range may be different from the first frequency range.

(D7) In the mesh WAP denoted as (D6), the first frequency range may be a millimeter frequency range, and the second frequency range may be selected from the group consisting of a 2.4 Gigahertz (GHz) frequency range and a 5 GHz frequency range.

(E1) A mesh WAP may include (1) a furniture structure, (2) a first radio assembly incorporated with the furniture structure and configured to support a first wireless communication link, (3) a second radio assembly incorporated with the furniture structure and configured to support a second wireless communication link, and (4) an internal communication link between the first and second radio assemblies configured to transfer data packets between the first and second radio assemblies.

(E2) In the mesh WAP denoted as (E1), the furniture structure may be part of a shelf, a table, a chair, a bed, a sofa, a lamp, a decorating item, or a dresser.

(E3) In any one of the mesh WAPs denoted as (E1) and (E2), the first radio assembly, the internal communication link, and the second radio assembly may be collectively configured to receive a first encrypted data packet via the first wireless communication link and forward the first encrypted data packet via the second wireless communication link without decrypting the encrypted first data packet.

(E4) In any one of the mesh WAPs denoted as (E1) through (E3), the first radio assembly may be configured to support the first wireless communication link in a first frequency range, the second radio assembly may be configured to support the second wireless communication link in a second frequency range, and the second frequency range may be different from the first frequency range.

(E5) In the mesh WAP denoted as (E4), the first frequency range may be a millimeter frequency range, and the second frequency range may be selected from the group consisting of a 2.4 Gigahertz (GHz) frequency range and a 5 GHz frequency range.

(F1) A television capable of serving as a mesh WAP may include (1) an image display, (2) a first radio assembly configured to support a first wireless communication link, (3) a second radio assembly configured to support a second wireless communication link, and (4) an internal communication link between the first and second radio assemblies configured to transfer data packets between the first and second radios.

(F2) In the television denoted as (F1), the first radio assembly, the internal communication link, and the second radio assembly may be collectively configured to receive a first encrypted data packet via the first wireless communication link and forward the first encrypted data packet via the second wireless communication link without decrypting the encrypted first data packet.

(F3) In any one of the televisions denoted as (F1) and (F2), the first radio assembly may be configured to support the first wireless communication link in a first frequency range, the second radio assembly may be configured to support the second wireless communication link in a second frequency range, and the second frequency range may be different from the first frequency range.

(F4) In the television denoted as (F3), the first frequency range may be a millimeter frequency range, and the second frequency range may be selected from the group consisting of a 2.4 Gigahertz (GHz) frequency range and a 5 GHz frequency range.

(G1) A light fixture capable of serving as a mesh WAP may include (1) a housing configured to house a lighting element, (2) a ring at least partially surrounding the housing, the ring including at least one first antenna element, and (3) a first radio transceiver communicatively coupled to the at least one first antenna element, such that the first radio transceiver and the at least one first antenna element collectively form a first radio assembly configured to support a first wireless communication link.

(G2) In the light fixture denoted as (G1), the housing may be configured to be recessed in a structure, and the ring may be configured to extend beyond the structure.

(G3) In the light fixture denoted as (G2), the structure may be selected from the group consisting of a ceiling and a wall.

(G4) In any one of the light fixtures denoted as (G1) through (G3), the housing and ring may be concentric.

(G5) In any one of the light fixtures denoted as (G1) through (G4), the at least one first antenna element may include an array of first antenna elements.

(G6) Any one of the light fixtures denoted as (G1) through (G5) may further include a second radio transceiver, and (1) the ring may further include at least one second antenna element, and (2) the second radio transceiver may be communicatively coupled to the at least one second antenna element, such that the second radio transceiver and the at least one second antenna element collectively form a second radio assembly configured to support a second wireless communication link.

(G7) In the light fixture denoted as (G6), the first radio assembly and the second radio assembly may be communicatively coupled via an internal communication link.

(G8) In the light fixture denoted as (G7), the first radio assembly, the internal communication link, and the second radio assembly may be collectively configured to receive a first encrypted data packet via the first wireless communication link and forward the first encrypted data packet via the second wireless communication link without decrypting the encrypted first data packet.

(G9) In the light fixture denoted as (G8), the first radio assembly may be configured to support the first wireless communication link in a first frequency range, the second radio assembly may be configured to support the second wireless communication link in a second frequency range, and the second frequency range may be different from the first frequency range.

(G10) In the light fixture denoted as (G9), the first frequency range may be a millimeter frequency range, and the second frequency range may be selected from the group consisting of a 2.4 Gigahertz (GHz) frequency range and a 5 GHz frequency range.

(G11) Any one of the light fixtures denoted as (G1) through (G10) may further include an energy storage subsystem configured to (a) store energy received via a primary electrical power source and (b) power at least the first radio assembly from energy stored therein when the primary electrical power source is unavailable.

(G12) Any one of the light fixtures denoted as (G1) through (G11) may further include a lighting element that is housed in the housing.

(G13) In the light fixture denoted as (G12), the lighting element may be configured to illuminate an area adjacent to the light fixture.

(G14) Any one of the light fixtures denoted as (G12) and (G13) may further include lighting control circuitry configure to control flow of electrical power to the lighting element.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present networks, devices, and methods, which, as a matter of language, might be said to fall therebetween.

What is claimed is:

1. A mesh wireless access point (WAP), comprising:
    a first radio assembly configured to support a first wireless communication link;
    a second radio assembly configured to support a second wireless communication link;
    an internal communication link between the first and second radio assemblies configured to transfer data packets between the first and second radio assemblies;
    an electrical interface configured to be electrically coupled with a lightbulb socket, such that the first and second radio assemblies may be at least partially powered from electrical power available via the lightbulb socket; and
    an energy storage subsystem configured to (a) store energy received from a lightbulb socket and (b) at least partially power at least one of the first radio assembly and the second radio assembly when electrical power is unavailable from the lightbulb socket.

2. The mesh WAP of claim 1, wherein the first radio assembly, the internal communication link, and the second radio assembly are collectively configured to receive a first encrypted data packet via the first wireless communication link and forward the first encrypted data packet via the second wireless communication link without decrypting the encrypted first data packet.

3. A light fixture capable of serving as a mesh wireless access point (WAP), comprising:
    a housing configured to house a lighting element, the housing being configured to be recessed, in a first direction, within one or more of a ceiling and a wall of a building;
    a ring at least partially surrounding the housing, the ring including at least one first antenna element; and
    a first radio transceiver communicatively coupled to the at least one first antenna element, such that the first radio transceiver and the at least one first antenna element collectively form a first radio assembly configured to support a first wireless communication link.

4. The light fixture of claim 3, wherein the ring is configured to extend, in a second direction opposite of the first direction, beyond the one or more of the ceiling and the wall of the building.

5. The light fixture of claim 4, wherein the ring is configured to help secure the light fixture to the one or more of the ceiling and the wall of the building.

6. The light fixture of claim 3, wherein the housing and ring are concentric.

7. The light fixture of claim 3, wherein the at least one first antenna element includes an array of first antenna elements.

* * * * *